(12) United States Patent
Yoshida et al.

(10) Patent No.: US 12,352,409 B2
(45) Date of Patent: Jul. 8, 2025

(54) LIGHT SOURCE DEVICE

(71) Applicant: NICHIA CORPORATION, Anan (JP)

(72) Inventors: Norimasa Yoshida, Komatsushima (JP); Tsuyoshi Okahisa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/740,900

(22) Filed: Jun. 12, 2024

(65) Prior Publication Data

US 2024/0328600 A1   Oct. 3, 2024

Related U.S. Application Data

(63) Continuation of application No. PCT/JP2022/042760, filed on Nov. 17, 2022.

(30) Foreign Application Priority Data

Dec. 14, 2021  (JP) .................................. 2021-202741
Jun. 16, 2022  (JP) .................................. 2022-097577

(51) Int. Cl.
*F21V 14/02* (2006.01)
*F21V 9/45* (2018.01)
(Continued)

(52) U.S. Cl.
CPC ................ *F21V 14/02* (2013.01); *F21V 9/45* (2018.02); *F21V 14/006* (2013.01); *F21V 14/08* (2013.01);
(Continued)

(58) Field of Classification Search
CPC ........ F21V 14/08; F21V 14/006; F21V 14/02; F21V 9/45; G03B 15/05; G03B 7/17
See application file for complete search history.

(56) References Cited

U.S. PATENT DOCUMENTS

| 5,485,201 A | 1/1996 | Aoki et al. |
| 2005/0062937 A1 | 3/2005 | Imade et al. |

(Continued)

FOREIGN PATENT DOCUMENTS

| JP | 2000-221570 A | 8/2000 |
| JP | 2003-346503 A | 12/2003 |

(Continued)

OTHER PUBLICATIONS

International Search Report and Written Opinion of the International Searching Authority with English language translations issued in the corresponding International Patent Application No. PCT/JP2022/042760, dated Feb. 7, 2023.

*Primary Examiner* — Abdulmajeed Aziz
*Assistant Examiner* — Nathaniel J Lee
(74) *Attorney, Agent, or Firm* — Foley & Lardner LLP

(57) ABSTRACT

A light source device includes: a plurality of light-emitting units, each including a light-emitting surface; an optical member configured to allow light emitted from the light-emitting units to be transmitted or passed therethrough, the optical member including: one or a plurality of first regions from which light of a first chromaticity is extracted upon operation of the light-emitting units, and one or a plurality of second regions from which light of a second chromaticity different from the first chromaticity is extracted upon operation of the light-emitting units; a first movement assembly configured to cause a relative movement between the plurality of light-emitting units and the optical member so that the light-emitting surface and the optical member face one another; and a control unit configured to: control light emission of each of the plurality of light-emitting units, and control operation of the first movement assembly.

23 Claims, 55 Drawing Sheets

(51) Int. Cl.
*F21V 14/00* (2018.01)
*F21V 14/08* (2006.01)
*G03B 7/17* (2021.01)
*G03B 15/05* (2021.01)
*F21Y 115/10* (2016.01)

(52) U.S. Cl.
CPC ............... *G03B 7/17* (2015.01); *G03B 15/05* (2013.01); *F21Y 2115/10* (2016.08); *G03B 2215/0567* (2013.01)

(56) References Cited

U.S. PATENT DOCUMENTS

| | | |
|---|---|---|
| 2008/0231162 A1 | 9/2008 | Kurihara et al. |
| 2009/0114799 A1 | 5/2009 | Maeda |
| 2009/0122152 A1 | 5/2009 | Yamaguchi et al. |
| 2009/0195730 A1* | 8/2009 | Park .................. G02F 1/133609 349/71 |
| 2015/0049458 A1 | 2/2015 | Van Bommel et al. |
| 2015/0211708 A1* | 7/2015 | Stavely ............... F21V 23/0464 362/231 |
| 2016/0169459 A1* | 6/2016 | Van Bommel ............ F21V 9/32 362/84 |

FOREIGN PATENT DOCUMENTS

| | | |
|---|---|---|
| JP | 2004-072308 A | 3/2004 |
| JP | 2008-186777 A | 8/2008 |
| JP | 2009-131616 A | 6/2009 |
| JP | 2009-131617 A | 6/2009 |
| JP | 2009-181955 A | 8/2009 |
| JP | 2012-009155 A | 1/2012 |
| JP | 2012-178319 A | 9/2012 |
| JP | 2015-513187 A | 4/2015 |
| JP | 2016-510159 A | 4/2016 |
| WO | WO-2016/021675 A1 | 2/2016 |

* cited by examiner

FIG.7
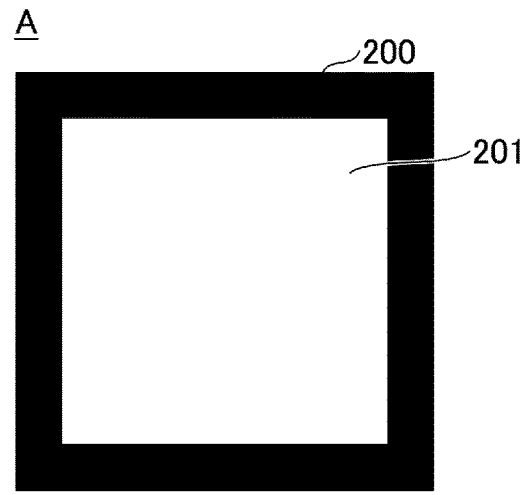
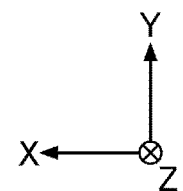
FIG.8
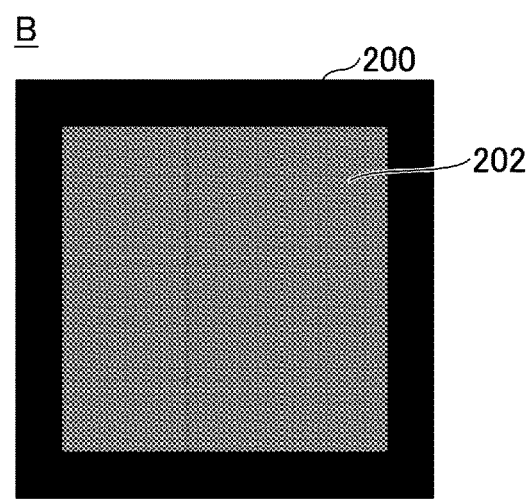
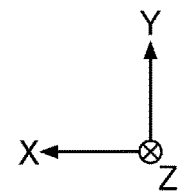

FIG.9
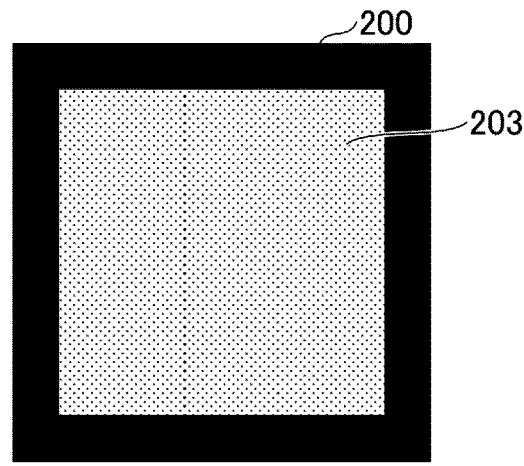
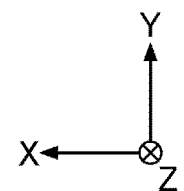
FIG.10
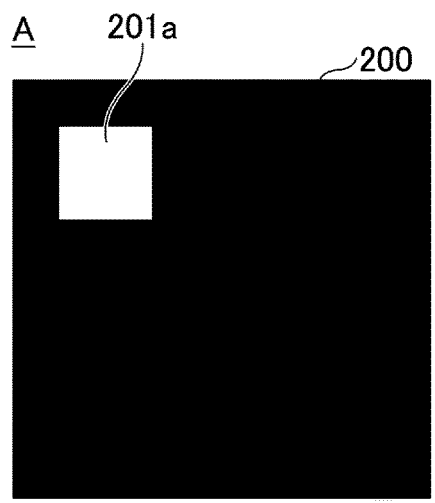
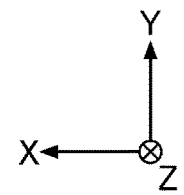

FIG.11
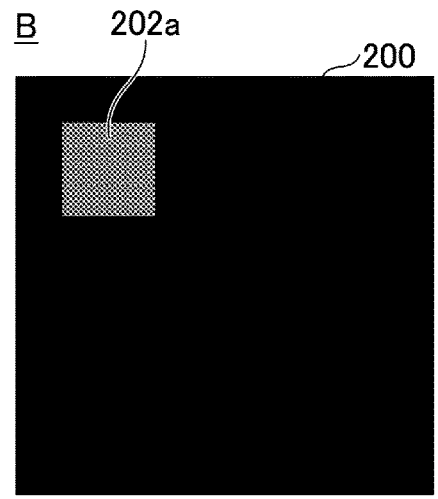
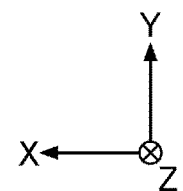
FIG.12
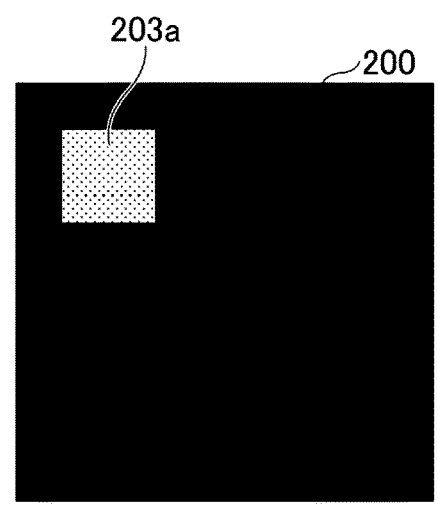
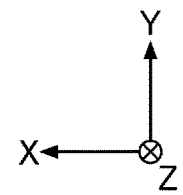

FIG.20
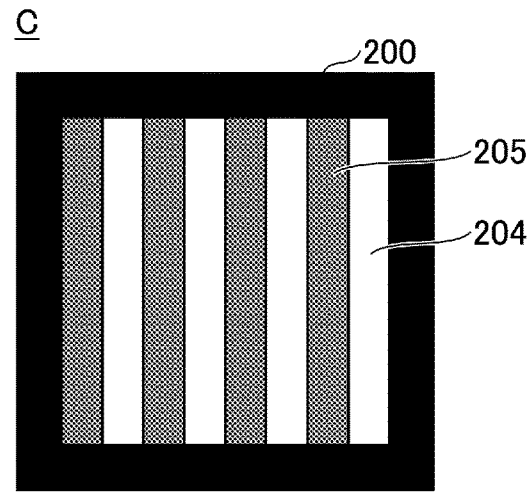
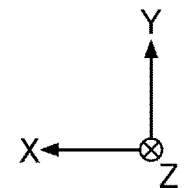
FIG.21
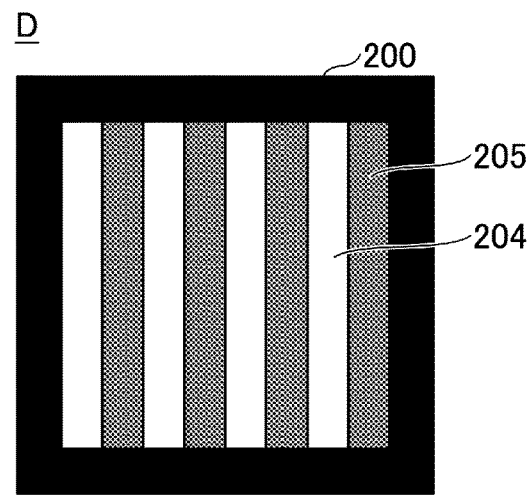
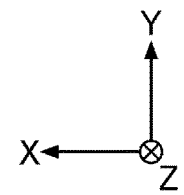

FIG.24
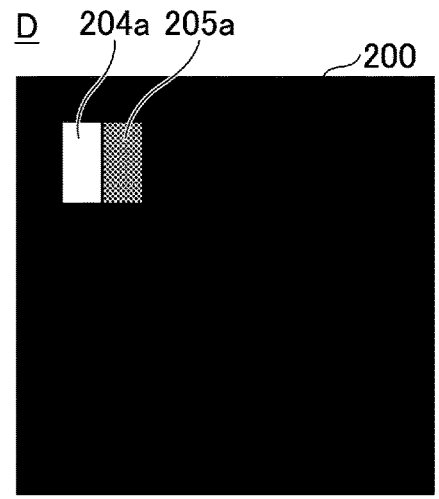
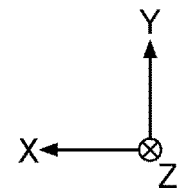
FIG.25
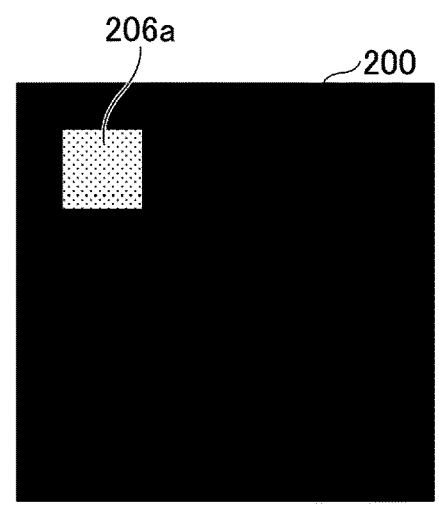
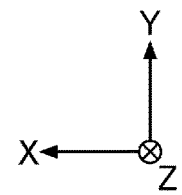

FIG.30
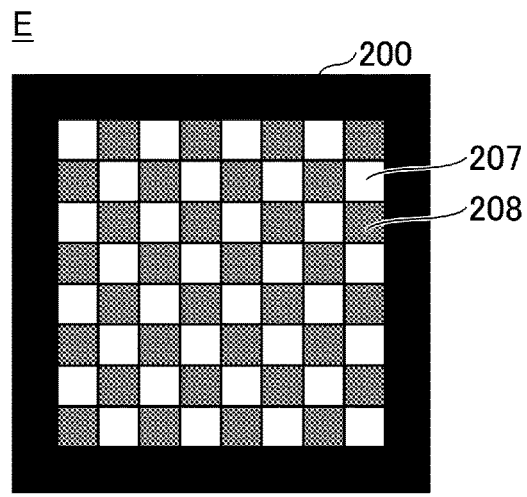
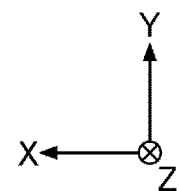
FIG.31
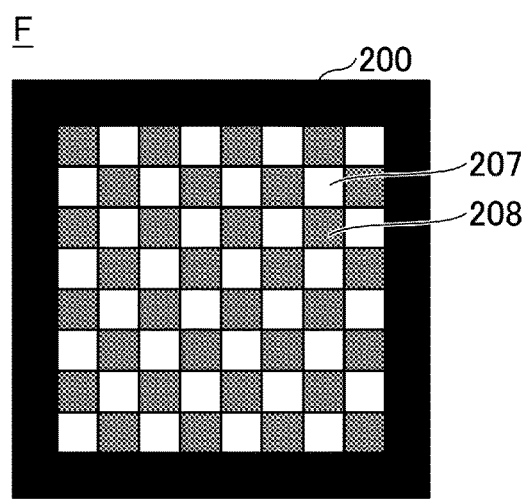
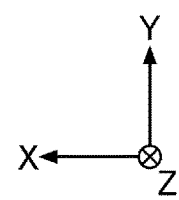

FIG.32
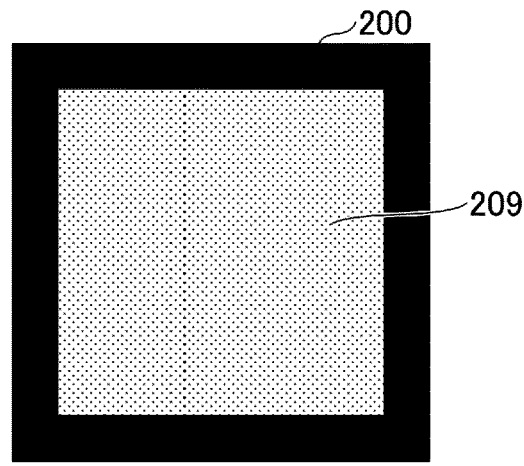
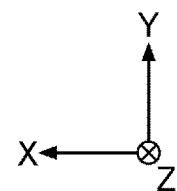
FIG.33
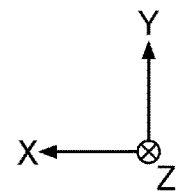

FIG.34
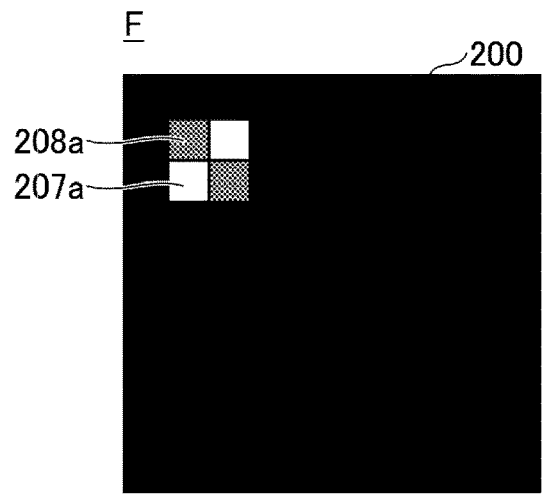
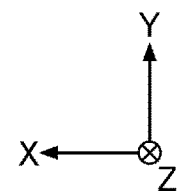
FIG.35
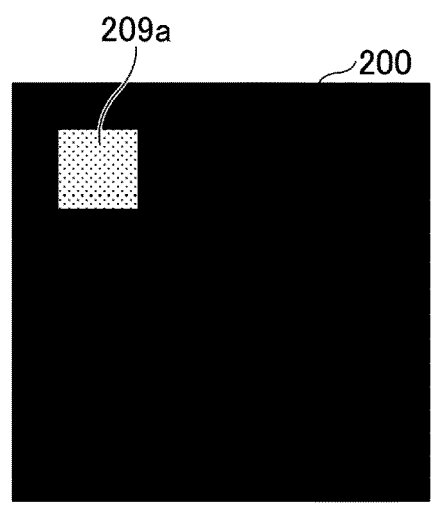
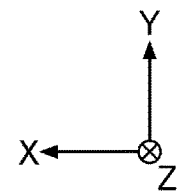

FIG.36
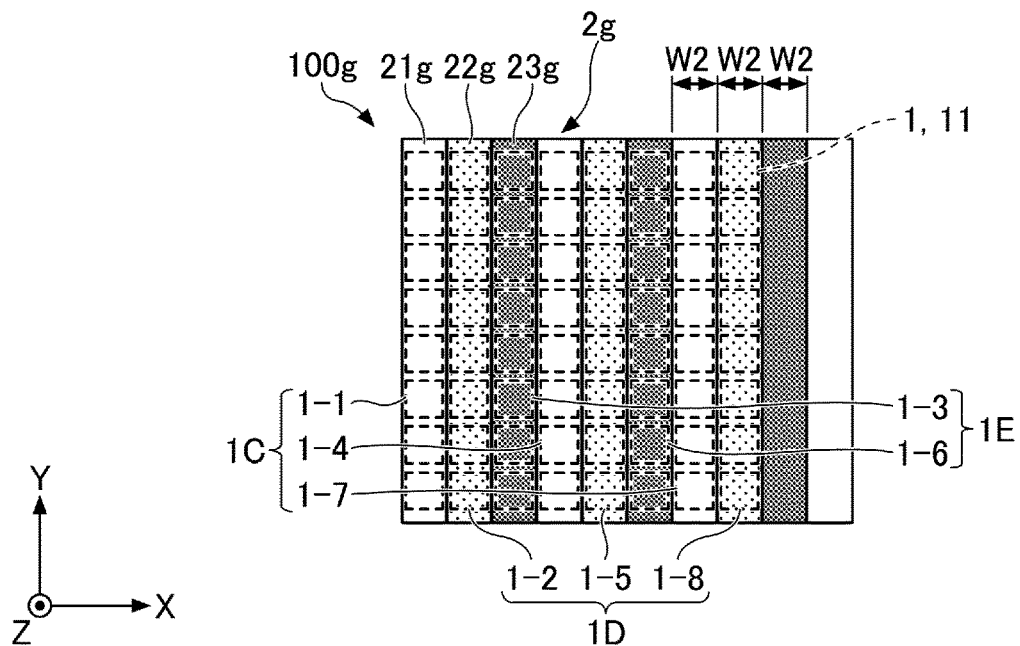
FIG.37
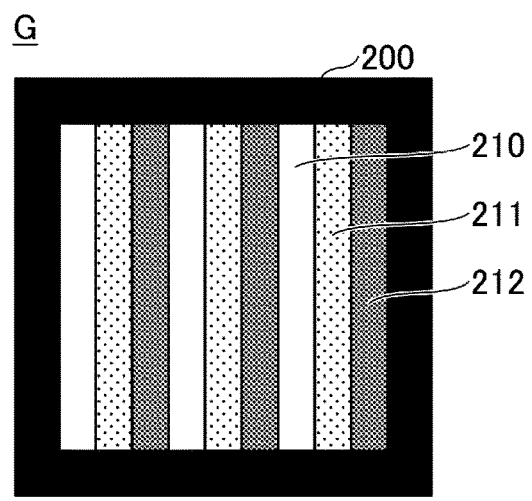
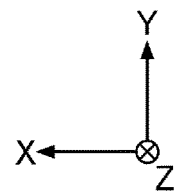

FIG.38
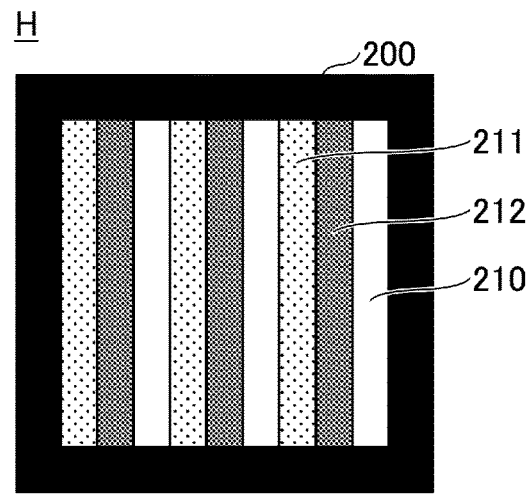
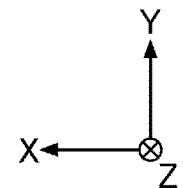
FIG.39
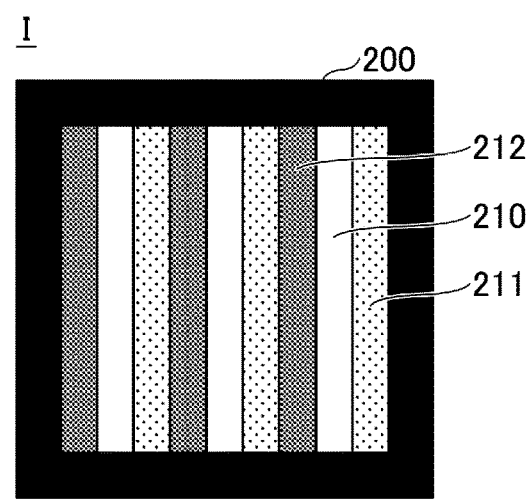
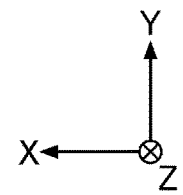

FIG.40
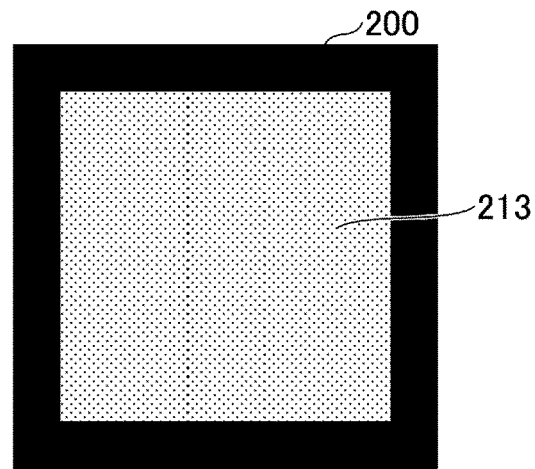
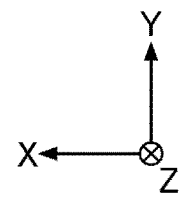
FIG.41
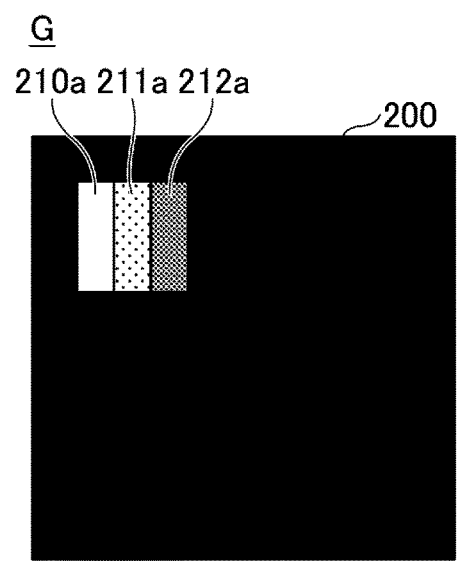
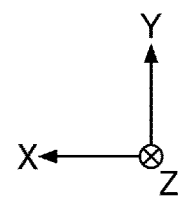

FIG.42
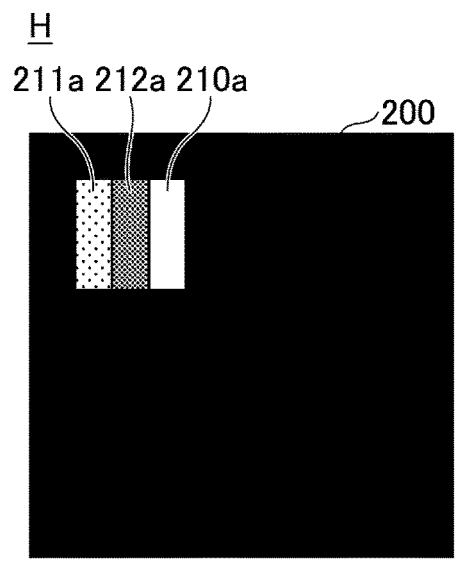
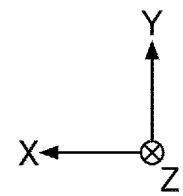
FIG.43
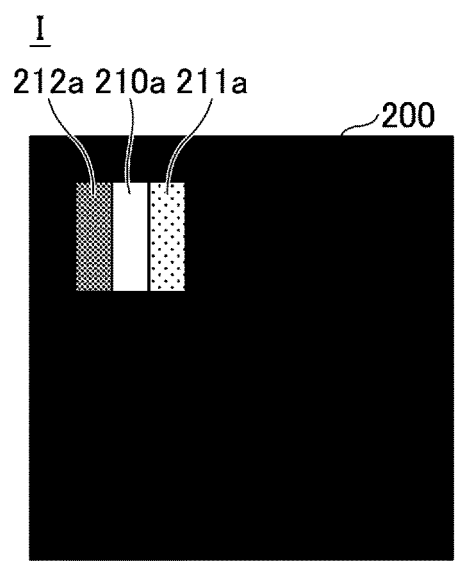
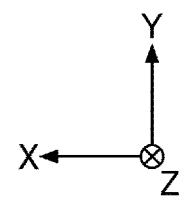

FIG.46
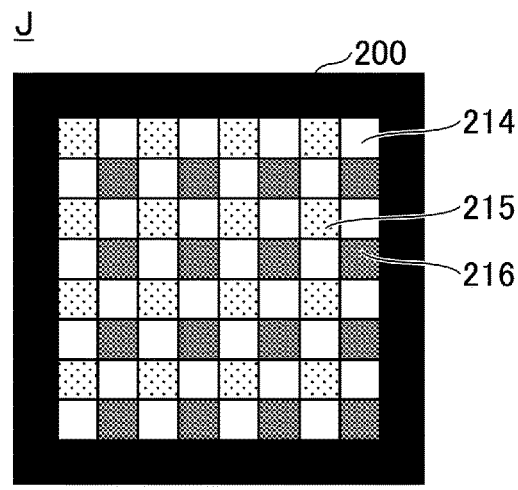
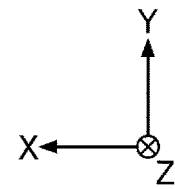
FIG.47
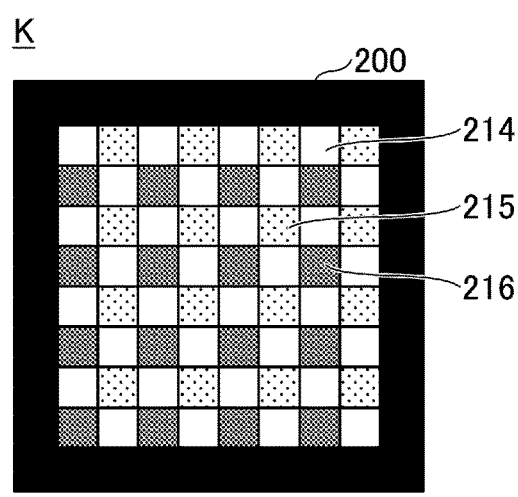
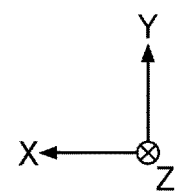

FIG.50
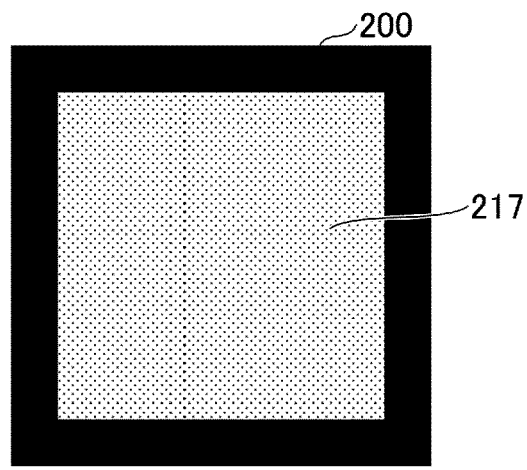
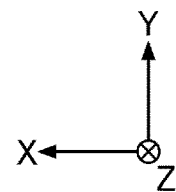
FIG.51
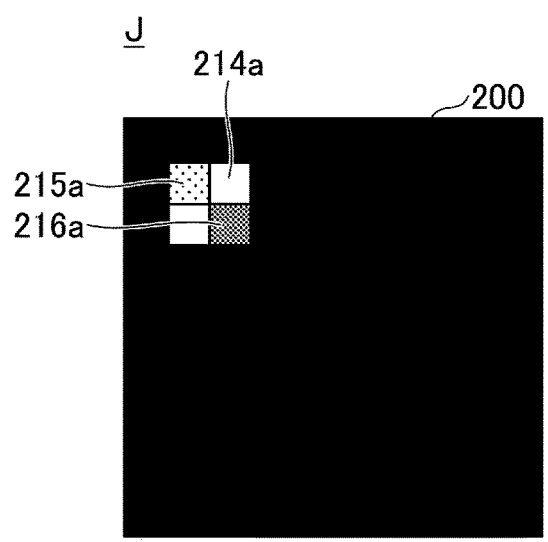
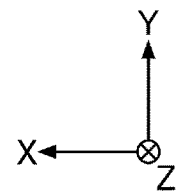

FIG.79
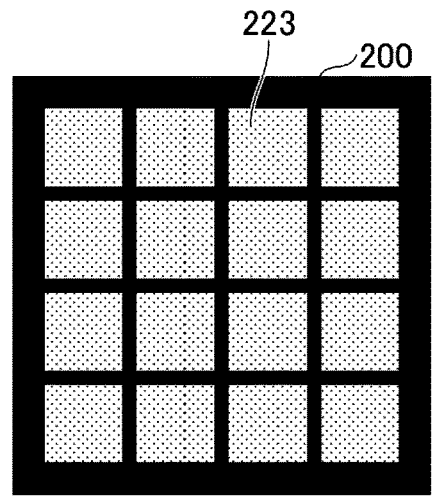
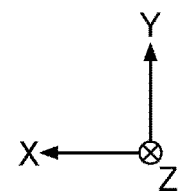
FIG.80
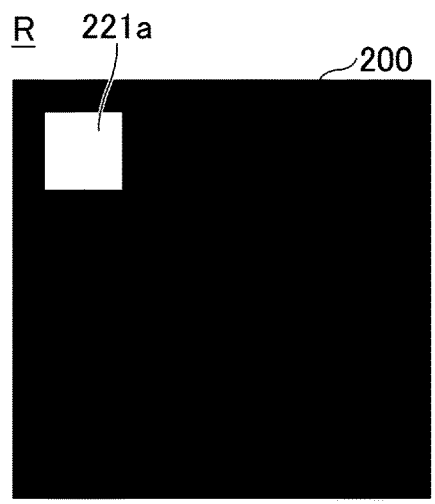
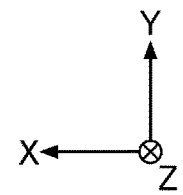

FIG.83
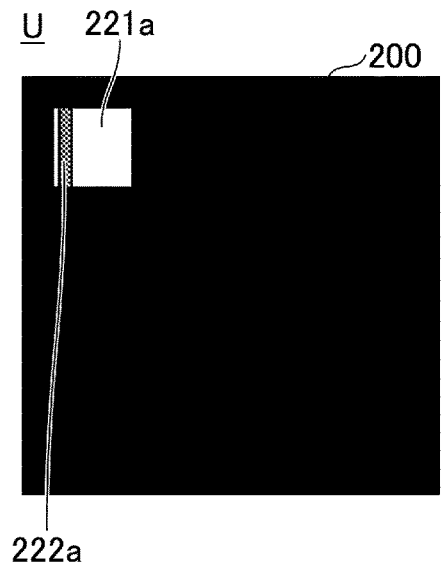
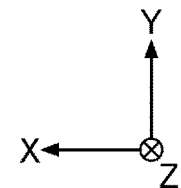
FIG.84
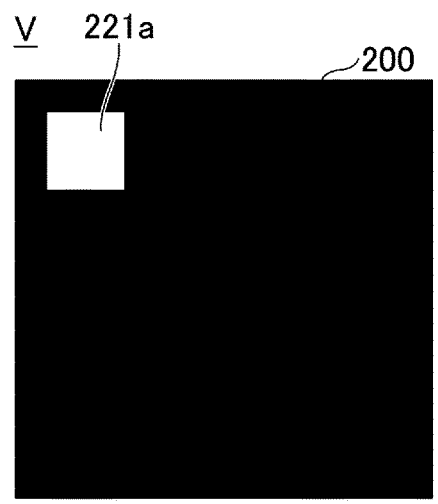
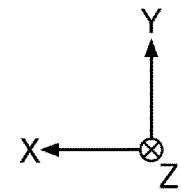

LIGHT SOURCE DEVICE

CROSS-REFERENCE TO RELATED APPLICATION

This is a bypass continuation of PCT Application No. JP2022/042760, filed on Nov. 17, 2022, which claims priority to Japanese Patent Application No. 2021-202741, filed on Dec. 14, 2021, and Japanese Patent Application No. 2022-097577, filed on Jun. 16, 2022. The disclosures of these applications are hereby incorporated by reference in their entireties.

TECHNICAL FIELD

The present disclosure relates to a light source device.

BACKGROUND

A light source device including a light-emitting diode or the like is widely used. For example, Japanese Patent Publication No. 2008-186777A discloses a configuration in which a plurality of phosphor members are disposed in an optical path of light emitted by a plurality of light-emitting elements.

SUMMARY

There is demand for light source devices to emit light color-adjusted to a predetermined color.

An object of certain embodiments of the present disclosure is to provide a light source device that can emit light color-adjusted to a predetermined color.

A light source device according to an embodiment of the present disclosure includes: a plurality of light-emitting units each including a light-emitting surface; an optical member including one or a plurality of first regions from which light of a first chromaticity can be extracted and one or a plurality of second regions from which light of a second chromaticity different from the first chromaticity can be extracted, the optical member allowing light emitted by the light-emitting units to be transmitted or passed through; a first movement assembly configured to cause a relative movement between the plurality of light-emitting units and the optical member so that the light-emitting surface and the optical member face one another; and a control unit including a light emission control unit configured to control light emission of each of the plurality of light-emitting units and a first movement control unit configured to control operation of the first movement assembly, wherein the light emission control unit performs control so that each of the plurality of light-emitting units emits the light in a predetermined period, and the first movement control unit performs control of the relative movement between the plurality of light-emitting units and the optical member in the predetermined period.

According to certain embodiments of the present disclosure, a light source device that can emit light color-adjusted to a predetermined color can be provided.

BRIEF DESCRIPTION OF DRAWINGS

FIG. 7 is a diagram illustrating an example of emission light by the light source device in FIG. 1 in a state A.

FIG. 8 is a diagram illustrating an example of emission light by the light source device in FIG. 1 in a state B.

FIG. 9 is a diagram illustrating an example of mixed color light obtained by mixing the emission lights of FIGS. 7 and 8.

FIG. 10 is a diagram illustrating an example of emission light from one or more light-emitting units of the light source device in FIG. 1 in the state A.

FIG. 11 is a diagram illustrating an example of emission light from one or more light-emitting units of the light source device in FIG. 1 in the state B.

FIG. 12 is a diagram illustrating an example of mixed color light obtained by mixing the emission lights of FIGS. 10 and 11.

FIG. 20 is a diagram illustrating an example of emission light by the light source device in FIG. 16 in a state C.

FIG. 21 is a diagram illustrating an example of emission light by the light source device in FIG. 16 in a state D.

FIG. 24 is a diagram illustrating an example of emission light from one or more light-emitting units of the light source device in FIG. 16 in the state D.

FIG. 25 is a diagram illustrating an example of mixed color light obtained by mixing the emission lights of FIGS. 23 and 24.

FIG. 30 is a diagram illustrating an example of emission light by the light source device in FIG. 29 in a state E.

FIG. 31 is a diagram illustrating an example of emission light by the light source device in FIG. 29 in a state F.

FIG. 32 is a diagram illustrating an example of mixed color light obtained by mixing the emission lights of FIGS. 30 and 31.

FIG. 33 is a diagram illustrating an example of emission light from one or more light-emitting units of the light source device in FIG. 29 in the state E.

FIG. 34 is a diagram illustrating an example of emission light from one or more light-emitting units of the light source device in FIG. 29 in the state F.

FIG. 35 is a diagram illustrating an example of mixed color light obtained by mixing the emission lights of FIGS. 33 and 34.

FIG. 36 is a plan view illustrating an example of a configuration of an optical member in a light source device according to a fourth modified example of the second embodiment.

FIG. 37 is a diagram illustrating an example of emission light by the light source device in FIG. 36 in a state G.

FIG. 38 is a diagram illustrating an example of emission light by the light source device in FIG. 36 in a state H.

FIG. 39 is a diagram illustrating an example of emission light by the light source device in FIG. 36 in a state I.

FIG. 40 is a diagram illustrating an example of mixed color light obtained by mixing the emission lights of FIGS. 37 to 39.

FIG. 41 is a diagram illustrating an example of emission light from one or more light-emitting units of the light source device in FIG. 36 in the state G.

FIG. 42 is a diagram illustrating an example of emission light from one or more light-emitting units of the light source device in FIG. 36 in the state H.

FIG. 43 is a diagram illustrating an example of emission light from one or more light-emitting units of the light source device in FIG. 36 in the state I.

FIG. 46 is a diagram illustrating an example of emission light by the light source device in FIG. 45 in a state J.

FIG. 47 is a diagram illustrating an example of emission light by the light source device in FIG. 45 in a state K.

FIG. 50 is a diagram illustrating an example of mixed color light obtained by mixing the emission lights of FIGS. 46 to 49.

FIG. 51 is a diagram illustrating an example of emission light from one or more light-emitting units of the light source device in FIG. 45 in the state J.

FIG. 79 is a diagram illustrating an example of mixed color light obtained by mixing the emission lights of FIGS. 74 to 78.

FIG. 80 is a diagram illustrating an example of emission light from one or more light-emitting units of the light source device in FIG. 67 in the state R.

FIG. 83 is a diagram illustrating an example of emission light from one or more light-emitting units of the light source device in FIG. 67 in the state U.

FIG. 84 is a diagram illustrating an example of emission light from one or more light-emitting units of the light source device in FIG. 67 in the state V.

DETAILED DESCRIPTION

Figure 1:
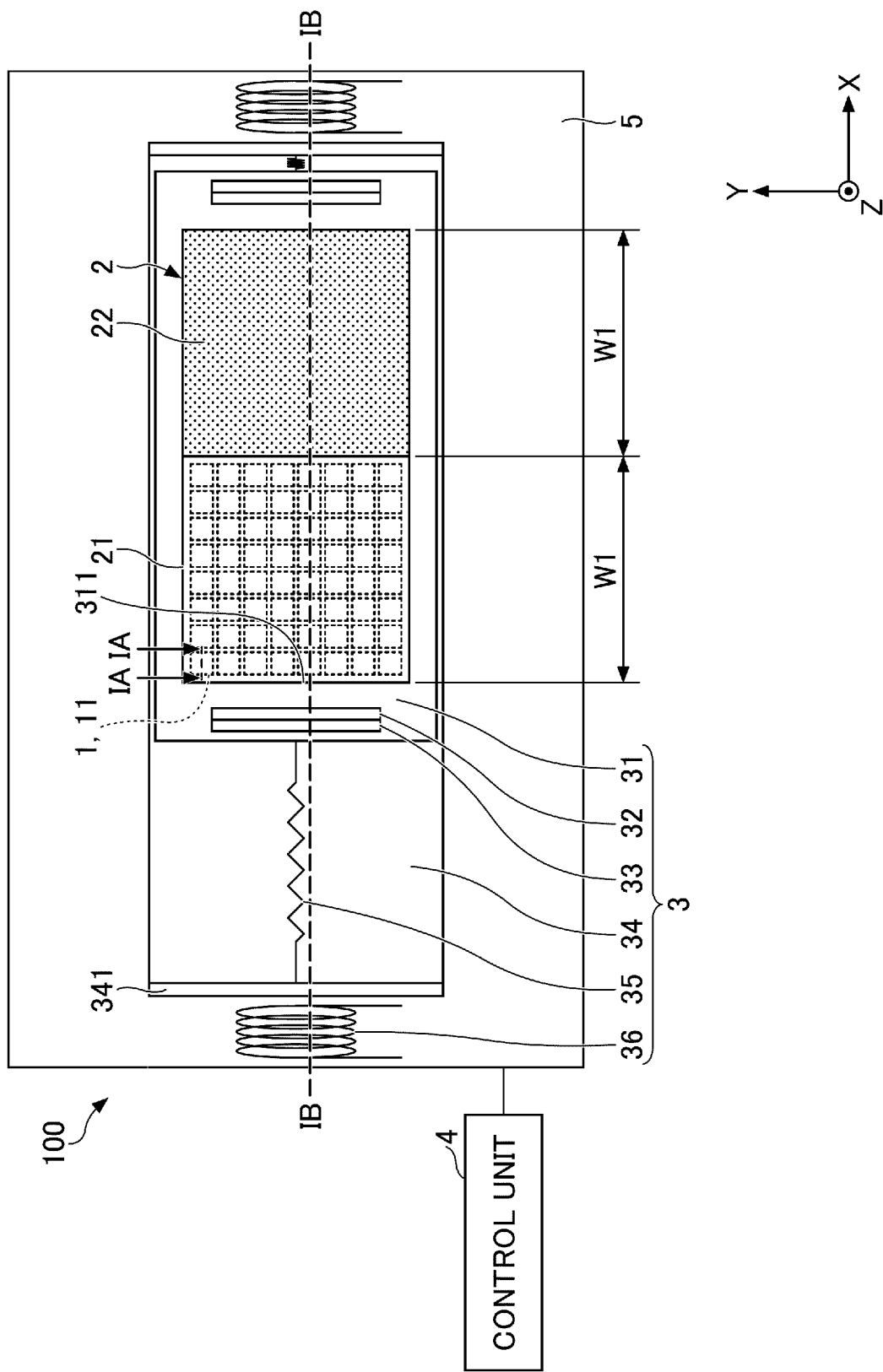
FIG. 1 is a plan view illustrating a configuration example of a light source device according to a first embodiment.

Light source devices according to embodiments of the present disclosure will be described in detail with reference to the drawings. The following embodiments illustrate light source devices for embodying the technical concepts of the present embodiment, but the invention is not limited to the embodiments described below. Further, dimensions, materials, shapes, relative arrangements, or the like of constituent members described in the embodiments are not intended to limit the scope of the present disclosure thereto, unless otherwise specified, and are merely exemplary. Note that the size, positional relationship, or the like of members illustrated in each of the drawings may be exaggerated for clarity of description. Further, in the following description, members having the same terms and reference characters represent the same or similar members, and a detailed description of these members will be omitted as appropriate. As a cross-sectional view, an end view illustrating only a cut surface may be used.

In the drawings described below, directions may be indicated by an X axis, a Y axis, and a Z axis. An X direction along the X axis indicates a movement direction by a first movement assembly included in the light source device according to an embodiment, a Y direction along the Y axis indicates a direction orthogonal to the X direction, and a Z direction along the Z axis indicates a direction orthogonal to both the X direction and the Y direction. The X direction is an example of a first direction, and the Y direction is an example of a second direction intersecting the first direction.

Further, the direction in the X direction in which the arrow faces is the +X direction or the +X side and the opposite direction to the +X direction is the −X direction or the −X side, the direction in the Y direction in which the arrow faces is the +Y direction or the +Y side and the opposite direction to the +Y direction is the −Y direction or the −Y side. The direction in the Z direction in which the arrow faces is the +Z direction or the +Z side and the opposite direction to the +Z direction is the −Z direction or the −Z side. In the present embodiment, a surface of a target object when viewed from the +Z direction or the +Z side is referred to as an "upper surface," and a surface of a target object when viewed from the −Z direction or the −Z side is referred to as a "lower surface."

In this embodiment, a plurality of light-emitting units included in the light source device emit light toward the +Z side as an example. In each drawing, the light emitted by the light-emitting unit may be indicated by a solid arrow, a dashed arrow, or the like. The light source device is configured to cause a relative movement between the plurality of light-emitting units and an optical member included in the light source device in the X direction or in both the X direction and the Y direction. The expression "in a plan view" used in the embodiments refers to viewing the object from the Z direction. However, these expressions do not limit the orientation of the light source device during use, and the orientation of the light source device may be any chosen orientation.

Further, an optical axis of the plurality of light-emitting units is aligned with the Z axis. In this specification, "being aligned with the X axis, Y axis, or Z axis" includes an object having an inclination within a range of ±10° relative to the axis.

A light source device according to an embodiment includes a plurality of light-emitting units each including a light-emitting surface and a first movement assembly for cause the relative movement between the plurality of light-emitting units and an optical member so that the light-emitting surfaces and the optical member face one another. The optical member includes one or a plurality of first regions in which light having a first chromaticity can be extracted and one or a plurality of second regions in which light having a second chromaticity different from the first chromaticity can be extracted, the optical member allowing the light emitted by the light-emitting units to be transmitted or pass through. Further, the light source device includes a control unit including a light emission control unit configured to control light emission of each of the plurality of light-emitting units and a first movement control unit configured to control the operation of the first movement assembly. The light emission control unit performs control such that each of the plurality of light-emitting units emits light within a predetermined period, and the first movement control unit performs control to cause the relative movement between the plurality of light-emitting units and the optical member within the predetermined period.

In the present specification, "light transmitting through an optical member" means that light emitted from the light-emitting unit is incident on the optical member, wavelength-converted, and then emitted from the optical member, and "light passing through an optical member" means that light emitted from the light-emitting unit is incident on the optical member and emitted from the optical member without wavelength conversion. "Light passing through an optical member" refers to light that is not intentionally wavelength-converted. Thus, the first region or the second region included in the optical member may be a pass-through portion where the light emitted by the light-emitting unit passes through. The pass-through portion may be a through hole.

The light source device controls the light emission of the plurality of light-emitting units and the relative movement of the plurality of light-emitting units and the optical member within the predetermined period to adjust a ratio within the predetermined period between an amount of light having the first chromaticity transmitted or passed through the first region and an amount of light having the second chromaticity transmitted or passed through the second region, from among the light emitted by the plurality of light-emitting units. In this manner, the light of the first chromaticity and the light of the second chromaticity are time-averaged and mixed within a predetermined period of time, and light color-adjusted to a predetermined color can be emitted. Here, the term "color adjustment" refers to adjusting the color of light.

The light source device is used as, for example, a flash light source of an imaging device, and the predetermined period is an exposure period (shutter open period) or the like of the imaging device installed with the light source device. By light color-adjusted to a predetermined color being emitted in the exposure period, the light source device can realize imaging under emission light of a predetermined color.

Hereinafter, the configuration and function of a light source device will be described in detail using a light source device installed in a smartphone and used as a flash light source for an imaging device provided in the smartphone as an example. Examples of an imaging device include a camera for capturing a still image and a video camera for capturing a video. In the embodiment described below, the exposure period of the imaging device is an example of the predetermined period, but the imaging cycle of the imaging device may be set as the predetermined period.

First Embodiment

Configuration Example of Light Source Device 100

Figure 2A:
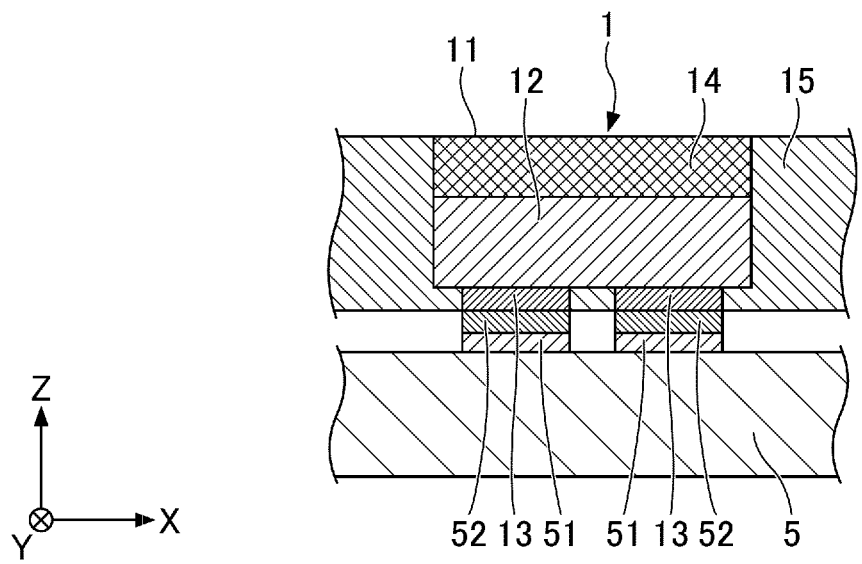
FIG. 2A is a cross-sectional view taken along line IA-IA in FIG. 1.
Figure 2B:
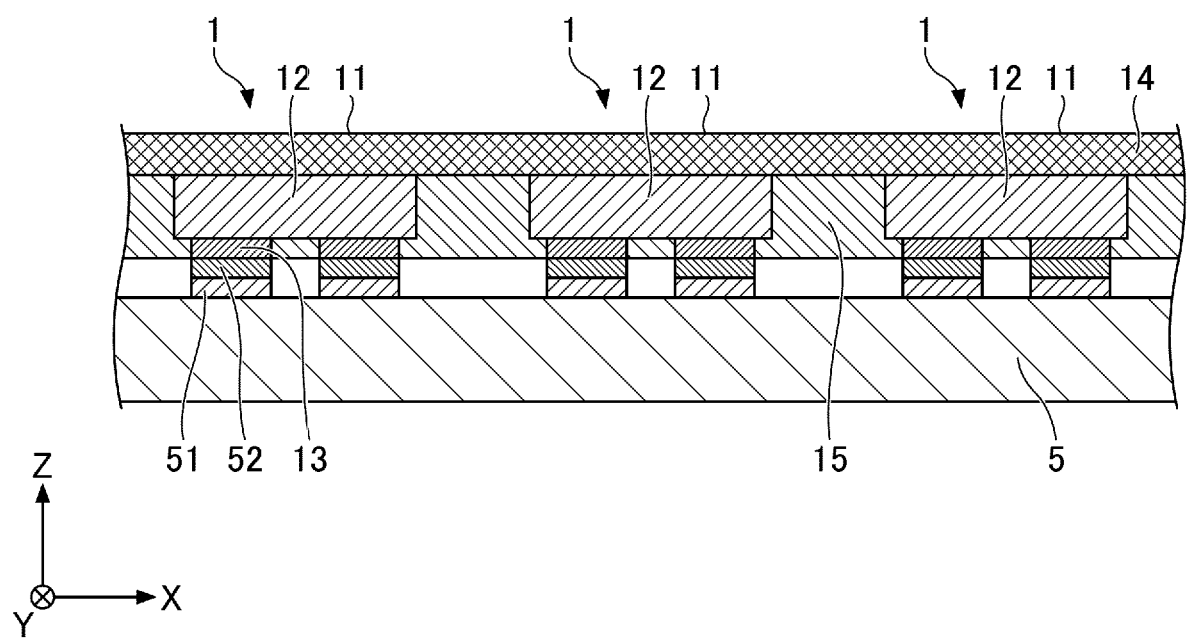
FIG. 2B is a cross-sectional view illustrating a modified example of a plurality of light-emitting units.
Figure 3:
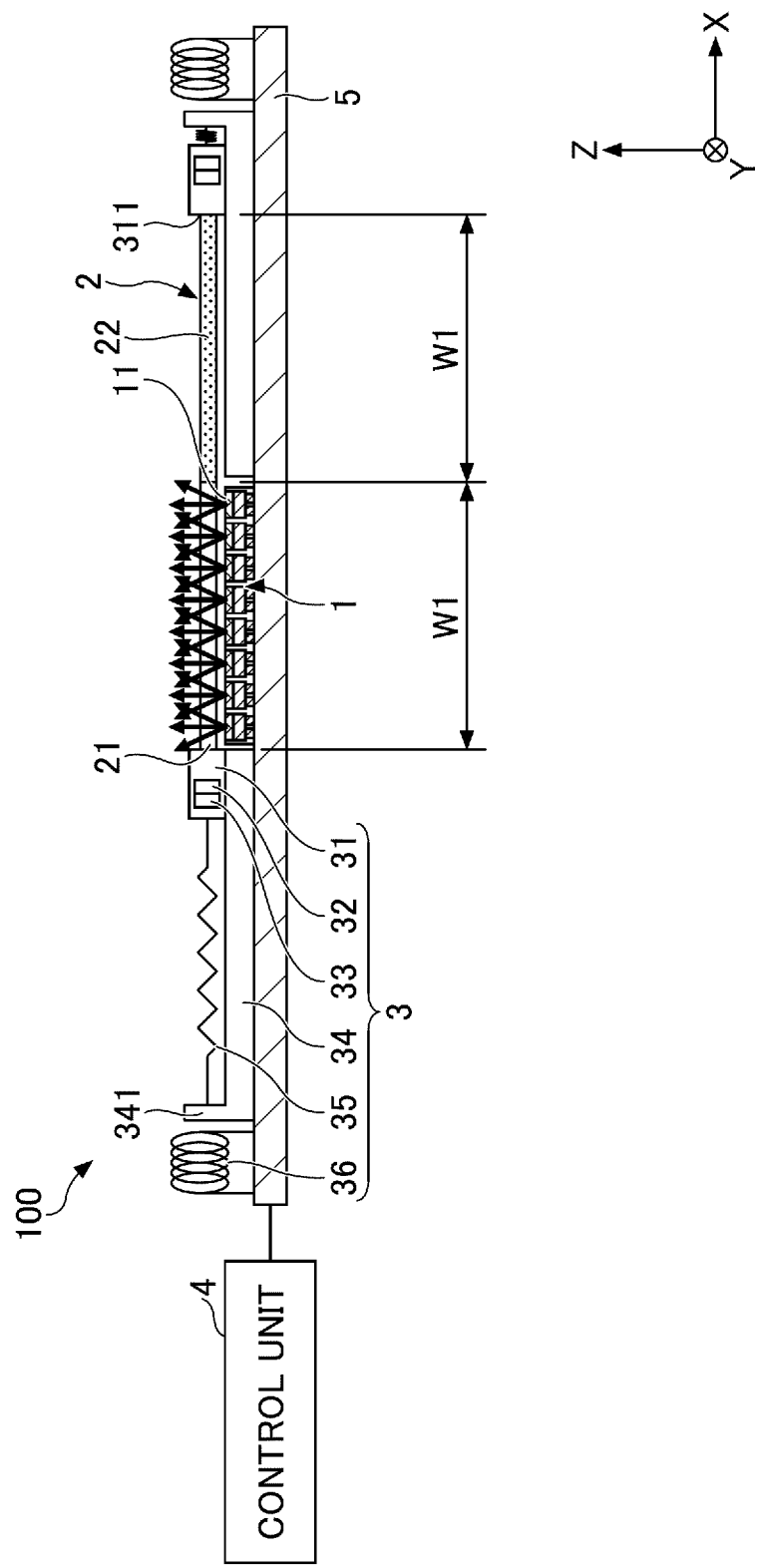
FIG. 3 is a cross-sectional view taken along line IB-IB in FIG. 1.
Figure 4:
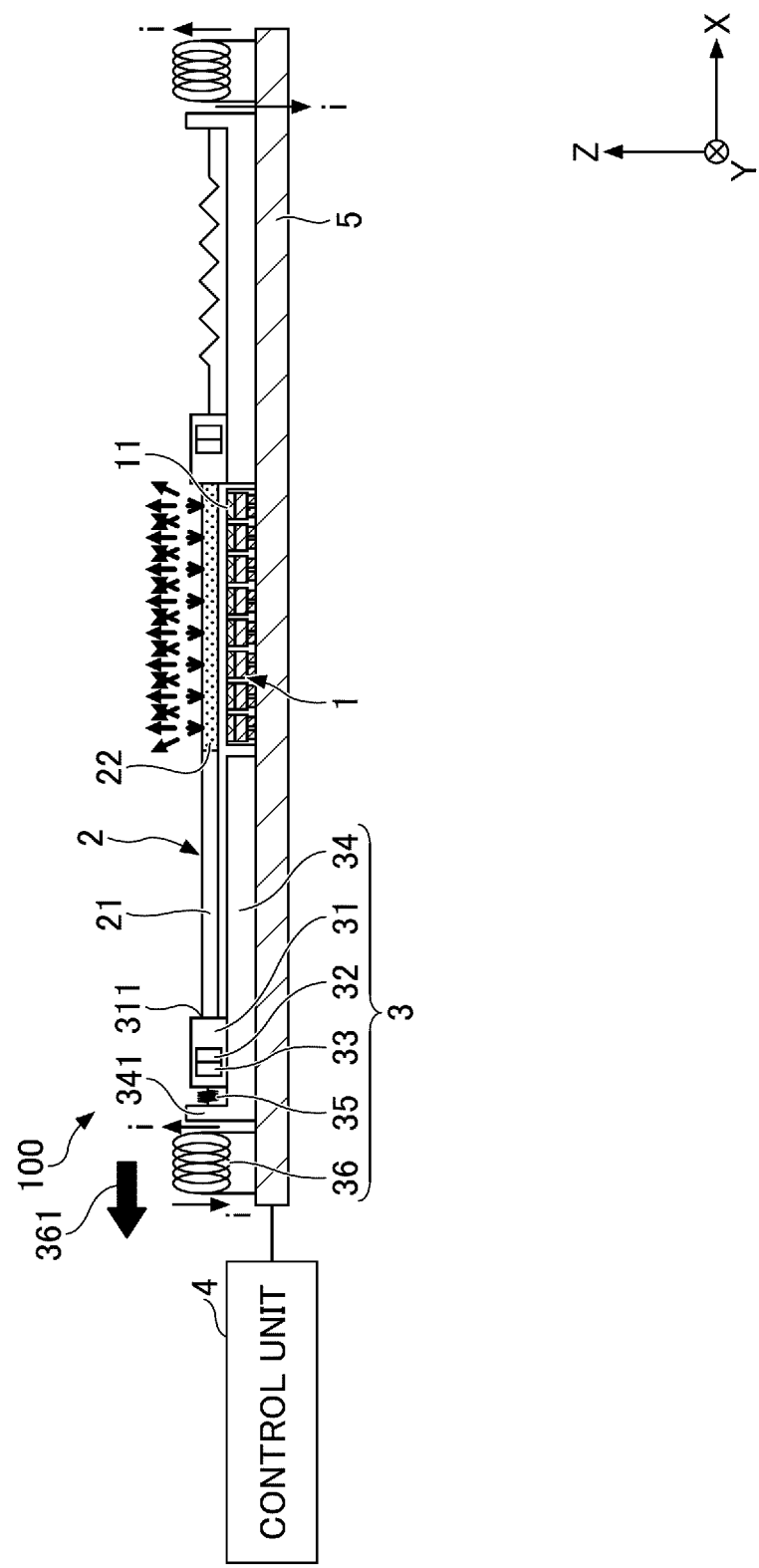
FIG. 4 is a cross-sectional view illustrating the light source device after an optical member is moved from the state illustrated in FIG. 3.
Figure 5:
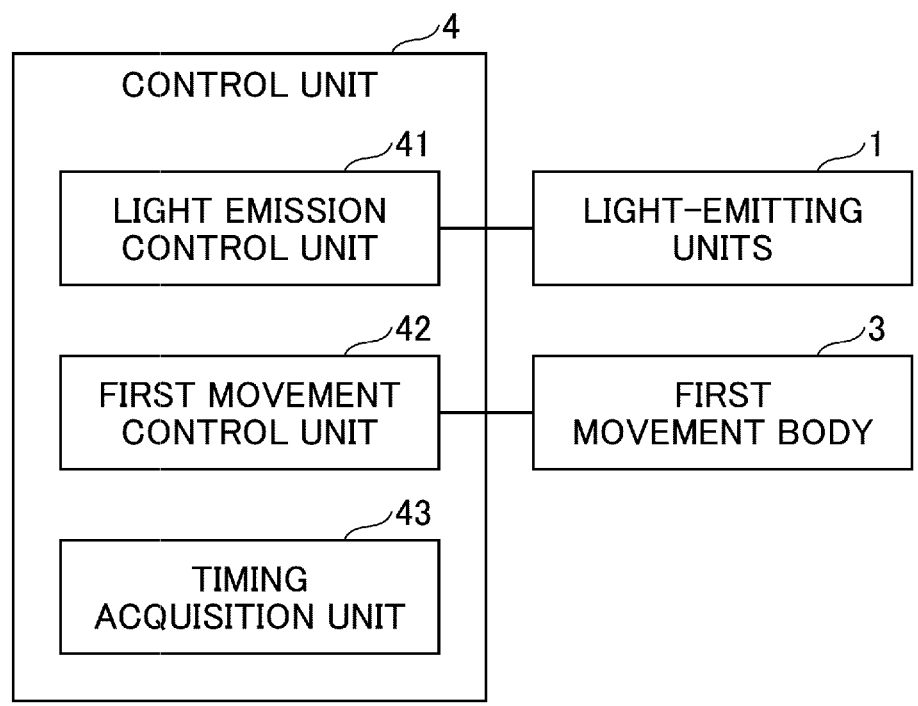
FIG. 5 is a block diagram illustrating an example of the functional configuration of a control unit in the light source device in FIG. 1.

The configuration of a light source device 100 according to a first embodiment will be described with reference to FIGS. 1 to 5. FIG. 1 is a plan view illustrating a configuration example of the light source device 100. FIG. 2A is a cross-sectional view taken along line IA-IA in FIG. 1. FIG. 2B is a cross-sectional view illustrating a modified example of a plurality of light-emitting units. FIG. 3 is a cross-sectional view taken along line IB-IB in FIG. 1. FIG. 4 is a cross-sectional view illustrating an example of a light source device after an optical member is moved from the state illustrated in FIG. 3. FIG. 5 is a block diagram illustrating an example of the functional configuration of a control unit 4 in the light source device 100.

As illustrated in FIGS. 1 and 3, the light source device 100 includes a plurality of light-emitting units 1, an optical member 2, a first movement assembly 3, and the control unit 4.

In addition, the light source device 100 may include a housing that houses the plurality of light-emitting units 1, the optical member 2, and the first movement assembly 3 therein, a transparent portion that is held in a state of being fitted into an opening formed in the housing, and the like.

Here, "transparent" means that the light transmittance is 80% or greater with respect to the light from the light-emitting units 1.

Light-Emitting Unit 1

The plurality of light-emitting units 1 each have a substantially rectangular shape in a plan view and are mounted on a +Z side surface (in other words, the upper surface) of a light-emitting unit mounting substrate 5. In the present embodiment, the light source device 100 includes a total of 64 light-emitting units 1 provided in an array of eight light-emitting units 1 aligned in the X direction and eight light-emitting units 1 aligned in the Y direction. However, the arrangement and number of the light-emitting units 1 is not limited to this. It is sufficient to provide at least two light-emitting units 1, and the arrangement and the number of the light-emitting units 1 can be changed as appropriate depending on the application of the light source device 100 or the like. The length of the light-emitting unit 1 in the X direction or the Y direction, in other words, the length of one side of the light-emitting unit 1 is, for example, in a range from 200 μm to 1000 μm.

The plurality of light-emitting units 1 each include a light-emitting surface 11 and emit light toward the optical member 2 provided on the +Z side of the light-emitting unit 1.

The light-emitting surface 11 refers to a main light extraction surface of the light-emitting unit 1. A light-emitting diode (LED) or the like can be used for the light-emitting unit 1. The light emitted by the light-emitting unit 1 is preferably white light, but may be monochromatic light. By selecting the light-emitting unit 1 in accordance with the application of the light source device 100, the light emitted by the light-emitting unit 1 can be appropriately selected. Because the light-emitting unit 1 and the light-emitting surface 11 overlap one another in a plan view, the reference numeral of the light-emitting unit 1 and the reference numeral of the light-emitting surface 11 are grouped together in FIG. 1. Also, hereinafter, when two or more components substantially coincide with one another or overlap one another, the reference numerals may be grouped together.

All of the light-emitting units 1 are preferably disposed on the inner side of the optical member 2 in a plan view (inward from the outer shape of the optical member 2). From the perspective of the light-emitting characteristics of the light source device 100, a narrower interval between the light-emitting units 1 is preferable. However, because there is a limit to the interval at which the plurality of light-emitting units 1 can be mounted, the interval between the light-emitting units 1 is in a range from 10 μm to 200 μm and preferably in a range from 20 μm to 50 μm in order to achieve both good light-emitting characteristics and the interval at which the plurality of light-emitting units 1 can be mounted.

As illustrated in FIG. 2A, the light-emitting unit 1 is mounted on the +Z side surface of the light-emitting unit mounting substrate 5, with the +Z side surface corresponding to the light-emitting surface 11 and the surface opposite the light-emitting surface 11 corresponding to the mounting surface.

The light-emitting unit 1 includes a light-emitting element 12, a light-transmissive member 14 provided on the +Z side surface of the light-emitting element 12, and a covering member 15 that covers lateral surfaces of the light-emitting element 12 and lateral surfaces of the light-transmissive member 14 without covering the +Z side surface of the light-transmissive member 14.

At least a pair of positive and negative electrodes 13 (for example, a p-side electrode and an n-side electrode) are preferably provided on a surface of the light-emitting element 12 opposite the light-emitting surface 11. In the present embodiment, the shape of the light-emitting surface 11 in a plan view is substantially rectangular, but may be substantially circular, substantially elliptical, substantially triangular, substantially hexagonal or another polygonal shape.

The light-emitting element 12 is preferably formed of various semiconductors such as a III-V compound semiconductor or a II-VI compound semiconductor. As the semiconductor, preferably, a nitride-based semiconductor such as $In_YAl_YGa_{1-X-Y}N$ ($0 \leq X$, $0 \leq Y$, $X+Y \leq 1$) or the like is used, and InN, AlN, GaN, InGaN, AlGaN, InGaAlN, and the like can also be used. An emission peak wavelength of the light-emitting element 12 is preferably in a range from 400 nm to 530 nm, more preferably in a range from 420 nm to 490 nm, and even more preferably in a range from 450 nm to 475 nm from the viewpoints of light emission efficiency, excitation of the wavelength conversion substance, a color mixing relationship with the light emission thereof, and the like.

The light-transmissive member 14 is, for example, a plate-like member having a substantially rectangular shape in a plan view and is provided covering the upper surface of the light-emitting element 12. The light-transmissive member 14 can be formed using a light-transmissive resin material or an inorganic material such as ceramic or glass. As the resin material, a thermosetting resin, such as a silicone resin, a modified silicone resin, an epoxy resin, a modified epoxy resin, a phenol resin, and the like can be used. Particularly, a silicone resin or a modified resin thereof with good light resistance and heat resistance is used. In the present disclosure, light transmissivity corresponds to preferably 60% or more of the light from the light-emitting element 12 being transmitted.

Furthermore, a thermoplastic resin such as a polycarbonate resin, an acrylic resin, a methyl pentene resin, or a polynorbornene resin can be used for the light-transmissive member 14.

Furthermore, the light-transmissive member 14 may include, in the resin described above, a wavelength conversion substance that converts the wavelength of at least a portion of light from a light diffusion member or the light-emitting element 12. Examples of the light-transmissive member 14 including a resin and a wavelength conversion substance include a member containing a wavelength conversion substance in the resin material, ceramic, glass, or the like, and a sintered body of a wavelength conversion substance. The light-transmissive member 14 may include multiple layers including a resin layer containing a wavelength conversion substance or a light diffusion member on a +Z side surface of a sintered body such as a resin, ceramic, glass, or the like.

Examples of the wavelength conversion substance included in the light-transmissive member 14 include a yttrium aluminum garnet phosphor (for example, $Y_3(Al, Ga)_5O_{12}$:Ce), a lutetium aluminum garnet phosphor (for example, $Lu_3(Al, Ga)_5O_{12}$: Ce), a terbium aluminum garnet phosphor (for example, $Tb_3(Al, Ga)_5O_{12}$:Ce), a CCA phosphor (for example, $Ca_{10}(PO_4)_6Cl_2$:Eu), an SAE phosphor (for example, $Sr_4Al_{14}O_{25}$:Eu), a chlorosilicate phosphor (for example, $Ca_8MgSi_4O_{16}Cl_2$:Eu), a nitride phosphor, a fluoride phosphor, a phosphor having a perovskite structure (for example, $CsPb(F, Cl, Br, I)_3$), a quantum dot phosphor (for example, CdSe, InP, $AgInS_2$, $AgInSe_2$), and the like. Examples of a nitride phosphor include a β-sialon phosphor (for example, $(Si, Al)_3(O, N)_4$:Eu), an α-sialon phosphor (for example, $Ca(Si, Al)_{12}(O, N)_{16}$:Eu), an SLA phosphor (for example, $SrLiAl_3N_4$:Eu), a CASN phosphor (for example, $CaAlSiN_3$:Eu), a SCASN phosphor (for example, $(Sr, Ca)AlSiN_3$:Eu), and the like; and examples of a fluoride phosphor include a KSF phosphor (for example, $K_2SiF_6$:Mn), a KSAF phosphor (for example, $K_2(Si,Al)F_6$:Mn), and an MGF phosphor (for example, 3.5 MgO 0.5 $MgF_2GeO_2$:Mn). The phosphors described above are particles. Further, one type of these wavelength conversion substances can be used alone, or two or more types of these wavelength conversion substances can be used in combination.

The KSAF based phosphor may have a composition represented by Formula (I).

$$M_2[Si_pAl_qMn_rF_s] \qquad (I)$$

In Formula (I), M represents an alkali metal and may include at least K. Mn may be a tetravalent Mn ion. p, q, r, and s may satisfy $0.9 \leq p+q+r \leq 1.1$, $0 < q \leq 0.1$, $0 < r \leq 0.2$, $5.9 \leq s \leq 6.1$. Preferably $0.95 \leq p+q+r \leq 1.05$ or $0.97 \leq p+q+r \leq 1.03$, $0 < q \leq 0.03$, $0.002 \leq q \leq 0.02$ or $0.003 \leq q \leq 0.015$, $0.005 \leq r \leq 0.15$, $0.01 \leq r \leq 0.12$ or $0.015 \leq r \leq 0.1$, $5.92 \leq s \leq 6.05$ or $5.95 \leq s \leq 6.025$. Examples of the composition represented by Formula (I) include compositions represented by $K_2[Si_{0.946}Al_{0.005}Mn_{0.049}F_{5.995}]$, $K_2[Si_{0.942}Al_{0.008}Mn_{0.050}F_{5.992}]$, $K_2[Si_{0.939}Al_{0.014}Mn_{0.047}F_{5.986}]$. Such a KSAF based phosphor enables red light emission having a high luminance and a narrow half-value width of the light emission peak wavelength.

In this embodiment, the light source device 100 uses a blue light-emitting element as the light-emitting element 12, and a white light is emitted by the light-transmissive member 14 being provided with a wavelength conversion substance for wavelength-converting the light emitted from the light-emitting element 12 to yellow.

Examples of the light diffusion member included in the light-transmissive member 14 include titanium oxide, barium titanate, aluminum oxide, and silicon oxide.

The covering member 15 is a member that covers the lateral surfaces of the light-emitting element 12 and the light-transmissive member 14 and covers the lateral surfaces of the light-emitting element 12 and the light-transmissive member 14 directly or indirectly. The upper surface of the light-transmissive member 14 is exposed from the covering member 15 and corresponds to the light-emitting surface 11 of the light-emitting unit 1. The covering member 15 may be separated between the adjacent light-emitting units 1.

The covering member 15 is preferably constituted by a member having a high light reflectivity in order to improve light extraction efficiency. A resin material containing a light-reflective material such as white pigment, for example, can be used as the covering member 15.

Examples of light reflective materials include titanium oxide, zinc oxide, magnesium oxide, magnesium carbonate, magnesium hydroxide, calcium carbonate, calcium hydroxide, calcium silicate, magnesium silicate, barium titanate, barium sulfate, aluminum hydroxide, aluminum oxide, zirconium oxide, and silicon oxide. One of these is preferably used alone, or a combination of two or more types thereof are preferably used.

The resin material is preferably a material in which a resin material including a thermosetting resin, such as an epoxy resin, an epoxy-modified resin, a silicone resin, a silicone modified resin, a phenol resin, or the like as a main component is used as a base material. Note that the covering member 15 may be constituted by a member having light transmissivity with respect to visible light as necessary.

As illustrated in FIG. 2B, the plurality of light-emitting units 1 may include the light-transmissive member 14 that is shared by two or more light-emitting elements 12 of the plurality of light-emitting elements 12. The light-emitting unit 1 includes the light-emitting element 12, the light-transmissive member 14 provided on the +Z side surface of the light-emitting element 12, and the covering member 15 that covers lateral surfaces of the light-emitting element 12 and a lower surface of the light-transmissive member 14 without covering the +Z side surface of the light-transmissive member 14. In this case, the light-emitting surface 11 is a region substantially equal to the light-emitting element 12 in a plan view and refers to a main light extraction surface of the light-emitting unit 1 (in other words, the light-transmissive member 14).

The light-emitting unit mounting substrate 5, for example, is a plate-like member with a substantially rectangular shape in a plan view and is a substrate provided with wiring on which a light-emitting element or various electrical elements can be mounted. The light-emitting unit mounting substrate 5 is preferably provided with a wiring 51 disposed on at least one of the surface or the interior. In the light-emitting unit mounting substrate 5, the light-emitting unit mounting substrate 5 and the light-emitting unit 1 are electrically connected by connecting the wiring 51 and at least the positive and negative pair of electrodes 13 of the light-emitting unit 1 via an electrical conductive adhesive member 52. Note that the configuration, size, and the like of the wiring 51 of the light-emitting unit mounting substrate 5 is set according to the configuration, size, and the like of the electrodes 13 of the light-emitting unit 1.

For the light-emitting unit mounting substrate 5, an insulating material is preferably used as the base material, a material that does not easily transmit the light emitted from the light-emitting unit 1 or outside light is preferably used, or a material with a certain amount of strength is preferably used. Specifically, the light-emitting unit mounting substrate 5 can use, as the base material, a ceramic such as alumina, aluminum nitride, mullite, or silicon nitride, or a resin such as phenol resin, epoxy resin, polyimide resin, BT resin (bismaleimide triazine resin), polyphthalamide, or the like.

As the wiring 51, at least one of copper, iron, nickel, tungsten, chromium, aluminum, silver, gold, titanium, palladium, rhodium, or alloys thereof can be used. Furthermore, a layer of silver, platinum, aluminum, rhodium, gold, alloys thereof, or the like may be provided on the surface layer of the wiring 51 to increase the wettability and light reflectivity of the electrical conductive adhesive member 52.

Optical Member 2

As illustrated in FIGS. 1 and 3, the optical member 2 includes: a first region 21 in which light having the first chromaticity can be extracted; and a second region 22 in which light having the second chromaticity different from the first chromaticity can be extracted. The optical member 2 allows the light emitted by the plurality of light-emitting units 1 to be transmitted or pass through. The optical member 2 is, for example, a plate-like member having a substantially rectangular outer shape in a plan view. However, the shape of the optical member 2 in a plan view is not limited to being substantially rectangular and may be substantially circular, substantially elliptical, substantially triangular, substantially hexagonal or another polygonal shape. The thickness of the optical member 2 in the Z direction is in a range from 100 μm to 1000 μm, for example.

As illustrated in FIG. 1, the first region 21 and the second region 22 are provided side by side in the optical member 2 in the X direction, and each region has a substantially rectangular outer shape in a plan view. In the optical member 2, one first region 21 and one second region 22 are arranged facing the light-emitting surface 11. The distance in the Z direction between the optical member 2 and the light-emitting surface 11 is, for example, in a range from 100 μm to 1000 μm. In FIGS. 1 and 3, the first region 21 of the optical member 2 overlaps the light-emitting surfaces 11 of the plurality of light-emitting units 1 in a plan view. A width W1 is the width of the first region 21 and the second region 22 in the X direction. The width W1 of the first region 21 and the width W1 of the second region 22 in the X direction are preferably substantially equal to one another.

In the present embodiment, the first region 21 includes a light-transmissive member that allows the light emitted by the light-emitting element 12 to pass through. Herein, transmissivity corresponds to preferably 60% or more of the light from the light-emitting unit 1 being transmitted. In the first region 21, the light of a first wavelength passing through the light-transmissive member at the first region 21 can be extracted as light having the first chromaticity. Light having the first chromaticity is white light, for example.

The second region 22 includes a wavelength conversion substance that converts the light emitted by the light-emitting unit 1 into light having the second chromaticity. From the second region 22, the light converted by the wavelength conversion substance can be extracted as light having the second chromaticity.

The second region 22 may be a member containing a resin, such as silicone, glass, ceramics, or the like as a base material containing a wavelength conversion substance, may be a member in which the wavelength conversion substance is printed on a front surface of a formed body such as glass, or may be a sintered body of the wavelength conversion substance. The wavelength conversion substance is a member that absorbs at least a portion of primary light emitted by the light-emitting element, and emits secondary light of a wavelength different from that of the primary light. In the second region 22 of the optical member 2, as the wavelength conversion substance, one type of these wavelength conversion substances the same as or similar to that used in the light-transmissive member 14 described above can be used alone, or two or more types of these wavelength conversion substances can be used in combination.

First Movement Assembly 3

As illustrated in FIGS. 1, 3, and 4, the first movement assembly 3 is provided on the +Z side surface of the light-emitting unit mounting substrate 5 and is an electromagnetic actuator causing a relative movement between the optical member 2 and the plurality of light-emitting units 1 in the X direction. The X direction is a direction substantially parallel with the light-emitting surface 11 and is a direction substantially parallel with the +Z side surface of the light-emitting unit mounting substrate 5.

The first movement assembly 3 includes a frame portion 31, an N pole magnet 32, an S pole magnet 33, a platform portion 34, a spring 35, and a coil 36.

The frame portion 31 is a member having a substantially rectangular frame-like shape in a plan view. The frame portion 31 supports the optical member 2 by disposing the optical member 2 on the inner side in a plan view and bonding together the outer surface of the optical member 2 and the inner surface 311 of the frame portion 31 with an adhesive member or the like.

The frame portion 31 includes a resin material, a metal material, or the like. The frame portion 31 preferably includes, inside or on the surface thereof, a color material such as a black material that can absorb light emitted by the light-emitting unit 1. With this configuration, light that escapes to the frame portion 31 side through the optical member 2 can be absorbed by the frame portion 31, and the frame portion 31 can suppress the return of the reflected light toward the optical member 2 side.

The N pole magnet 32 and the S pole magnet 33 are quadrangular columnar members that include a metal material or the like. The N pole magnet 32 is magnetized to be an N pole magnet, and the S pole magnet 33 is magnetized to be an S pole magnet. The N pole magnet 32 and the S pole magnet 33 form a pair, and two pairs of the N pole magnet 32 and the S pole magnet 33 are fixed inside the two sides of the frame portion 31 that are substantially orthogonal to the X direction. It is sufficient that the N pole magnet 32 and the S pole magnet 33 are fixed to the frame portion 31, and the N pole magnet 32 and the S pole magnet 33 may be fixed to a surface such as an outer surface of the frame portion 31 by an adhesive member or the like or may be housed in a recess portion provided in the frame portion 31 and fixed by an adhesive member or the like.

The N pole magnet 32 is a generic name for two N pole magnets, and the S pole magnet 33 is a generic name for two S pole magnets. The number of the N pole magnets 32 and the S pole magnets 33 is not limited to two, and may be any number.

The platform portion 34 is a member having a substantially rectangular frame-like shape in a plan view. The platform portion 34 is fixed on the +Z side surface of the light-emitting unit mounting substrate 5 such that the optical member 2 is disposed inside in a plan view. The frame portion 31 is movably mounted on the +Z side surface of the platform portion 34. A wall portion 341 is provided on the outer portion of the platform portion 34, that is, on the side opposite to the side facing the optical member 2, of the platform portion 34.

The spring 35 is an elastic member that can extend and contract in the X direction. The material of the spring 35 is not particularly limited, and a metal material, resin material, or the like can be used. The spring 35 includes two springs, and the springs are provided at positions symmetrical with respect to the optical member 2. The spring 35 is a generic name for two springs. The number of the springs 35 is not limited to two, and may be any number.

One end of the spring 35 is connected to the outer surface of the frame portion 31, and the other end is connected to the wall portion 341 of the platform portion 34. The frame portion 31 is configured to be movable on the placement surface of the platform portion 34 together with the optical member 2. The spring 35 limits movement so that the frame portion 31 does not move too far, and imparts a restoring force to the frame portion 31 that returns the frame portion 31 to its initial position.

The coil 36 is a member that can conduct a current and is configured by winding wire or the like in a spiral or coil shape. The coil 36 includes two coils, and the coil 36 is a generic name for two coils. The two coils are paired with the two sets of the N pole magnet 32 and the S pole magnet 33. The one of the two coils is disposed on the opposite side of the wall portion 341 and the spring 35 from one of the two sets of the N pole magnet 32 and the S pole magnet 33, the other one of the two coils is disposed on the opposite side of the wall portion 341 and the spring 35 from the other one of the two sets of the N pole magnet 32 and the S pole magnet 33, and the two coils are fixed on the +Z side surface of the light-emitting unit mounting substrate 5. The number of the coils 36 is not limited to two and may be any number in accordance with the number of the N pole magnets 32 and S pole magnets 33.

As illustrated in FIG. 4, for example, when a drive current i flows from the control unit 4 to the coil 36, an electromagnetic force 361 is generated according to the right-hand rule by the action of the N pole magnet 32, the S pole magnet 33, and the coil 36. When the electromagnetic force 361 acts on the frame portion 31, the frame portion 31 moves to the −X side where the electromagnetic force 361 acts.

In the present embodiment, the first movement assembly 3 moves the optical member 2 to the −X side by a distance substantially equal to the width W1, switching between a state A in which the plurality of light-emitting units 1 are included in one first region 21 in a plan view as in FIG. 3 and a state B in which the plurality of light-emitting units 1 are included in one second region 22 in a plan view as in FIG. 4.

The magnitude of the electromagnetic force 361 changes in accordance with the amount of the drive current i flowing through the coil 36, and this likewise changes the amount of movement of the frame portion 31. Furthermore, the direction of the electromagnetic force 361 changes in accordance with the direction of the drive current i flowing in the coil 36, and this likewise changes the direction of movement of the frame portion 31. For example, when the drive current i flows in a direction opposite to the direction in which the drive current i flows in FIG. 4, the frame portion 31 moves in the +X direction. The first movement assembly 3 can switch the state from the state B to the state A by moving the optical member 2 in the +X direction by a distance substantially equal to the width W1.

In the present embodiment, the first movement assembly 3 is exemplified as an electromagnetic actuator. However, the driving method of the first movement assembly 3 is not limited thereto, and other driving methods such as using a piezoelectric actuator or ultrasonic actuator can be used.

Control Unit 4

The control unit 4 is an electrical circuit that is electrically connected to the plurality of light-emitting units 1 and the first movement assembly 3 in a wired or wireless manner and controls the operations of the plurality of light-emitting units 1 and the first movement assembly 3. The control unit 4 supplies a drive signal to the plurality of light-emitting units 1 and the first movement assembly 3 via the light-emitting unit mounting substrate 5. There is no particular limitation on the installation position of the control unit 4, and in the case of wireless connection, the control unit 4 may be disposed remotely from the plurality of light-emitting units 1 and the first movement assembly 3.

As illustrated in FIG. 5, the control unit 4 includes a light emission control unit 41, a first movement control unit 42, and a timing acquisition unit 43. In addition to realizing the functions of the light emission control unit 41, the first movement control unit 42, and the timing acquisition unit 43 by an electrical circuit, the control unit 4 can also realize some or all of these functions by a Central Processing Unit (CPU). The control unit 4 may realize these functions by a plurality of circuits or a plurality of processors.

The light emission control unit 41 controls the light emission of each of the plurality of light-emitting units 1. In this embodiment, the light emission control unit 41 performs control to select a light-emitting unit 1 to emit light from among the plurality of light-emitting units 1. The light emission control unit 41 controls the amount of light emitted by each of the plurality of light-emitting units 1 by controlling at least one of the drive current, the drive voltage, or the light emission period of each of the plurality of light-emitting units 1.

The first movement control unit 42 controls the operation of the first movement assembly 3. For example, the first movement control unit 42 controls the operation of the first movement assembly 3 by controlling the amount and direction of the drive current i applied to the coil 36. In the present embodiment, the first movement control unit performs control to set the state A and the state B within the exposure period of the imaging device.

The timing acquisition unit 43 acquires timing information such as a signal indicating the start and the end of the exposure period in the imaging device, from a smartphone. The light emission control unit 41 and the first movement control unit 42 can perform control in accordance with the timing information acquired by the timing acquisition unit 43.

Operation Example of Light Source Device 100

Figure 6:
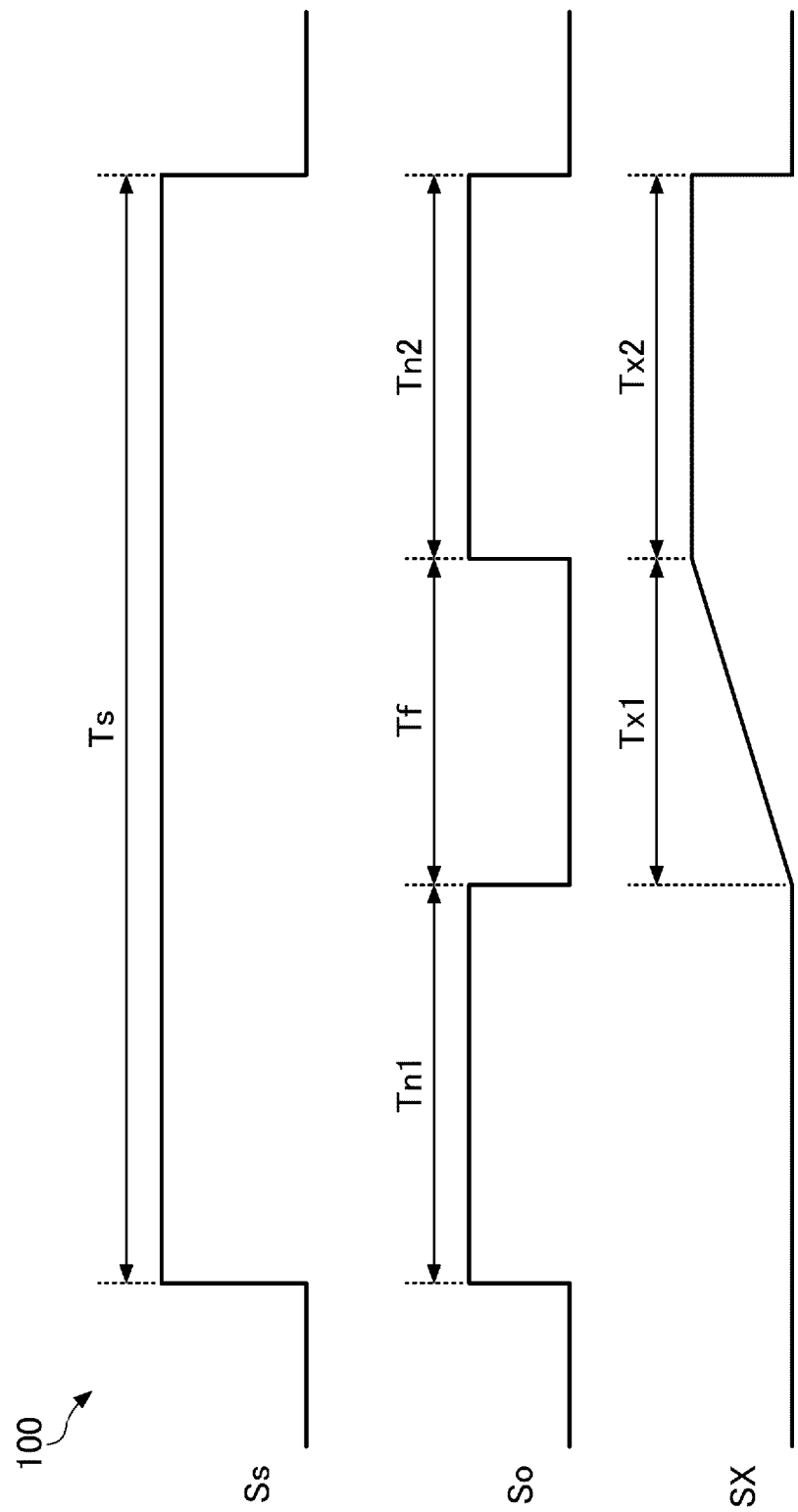
FIG. 6 is a timing chart illustrating a first example of operations of the light source device in FIG. 1.

FIG. 6 is a timing chart illustrating the operations of the light source device 100. FIG. 6 illustrates an exposure signal Ss indicating the exposure timing of the imaging device installed with the light source device 100, a light emission signal So indicating the light emission timing of the light-emitting unit 1, and an X position signal SX indicating the position of the optical member 2 in the X direction. The vertical axis of So in FIG. 6 is the current value.

In FIG. 6, it is assumed that all of the 64 light-emitting units 1 perform the same operation. However, the 64 light-emitting units 1 do not necessarily have to perform the same operation, and can operate independently.

An exposure period Ts is a period during which the electronic shutter of the imaging device is opened. The exposure period Ts is, for example, 1/30 (sec) or 1/60 (sec). The electronic shutter is opened at the timing when the exposure signal Ss is turned on, and the electronic shutter is closed at the timing when the exposure signal Ss is turned off.

Light emission periods Tn1 and Tn2 are periods (in other words, time) during which the light-emitting unit 1 emits light (in other words, turned up). The non-light emission period Tf is a period during which the light-emitting unit 1 does not emit light (in other words, is turned off). The light-emitting unit 1 emits light at the timing when the light emission signal So is turned on, and the light-emitting unit 1 does not emit light at the timing when the light emission signal So is turned off.

In a movement period Tx1, the X position signal SX changes with time. The movement period Tx1 is a period during which the optical member 2 is moved in the −X direction by the first movement assembly 3. In the stopping period Tx2, the X position signal SX is constant and the optical member 2 is stopped. The movement in the movement period Tx1 corresponds to the movement of the optical member 2 from the state A to the state B.

When the exposure period Ts is started in response to the timing acquisition unit 43 acquiring the timing information from the smartphone, first, the light emission control unit 41 of the light source device 100 turns the light-emitting unit 1 to emit light in the light emission period Tn1. In this period, the state of the optical member 2 is the state A in which the plurality of light-emitting units 1 are included in one first region 21 in a plan view, and the optical member 2 is stopped.

Subsequently, in the movement period Tx1, the first movement control unit 42 of the light source device 100 controls the optical member 2 to move in the −X direction by a distance substantially equal to the width W1. In the non-light emission period Tf parallel to the movement period Tx1, the light emission control unit 41 of the light source device 100 turns the light-emitting unit 1 to emit no light. The optical member 2 stops after moving in the −X direction by a distance substantially equal to the width W1.

Subsequently, in the light emission period Tn2, the light emission control unit 41 of the light source device 100 turns the light-emitting unit 1 to emit light. In this period, the state of the optical member 2 is the state B in which the plurality of light-emitting units 1 are included in one second region 22 in a plan view, and the optical member 2 is stopped.

In this manner, the light source device 100 can switch, within the exposure period Ts, between the state A in which the plurality of light-emitting units 1 are included in one first region 21 in a plan view and the state B in which the plurality of light-emitting units 1 are included in one second region 22 in a plan view.

Example of Emission Light by Light Source Device 100

FIGS. 7 to 12 are diagrams for describing emission light emitted from the light source device 100 to an irradiated region 200. FIG. 7 is a diagram illustrating an example of emission light when the optical member 2 is in the state A before movement. FIG. 8 is a diagram illustrating an example of emission light when the optical member 2 is in the state B after movement. FIG. 9 is a diagram illustrating an example of mixed color light obtained by mixing the emission lights of FIGS. 7 and 8.

FIG. 10 is a diagram illustrating an example of emission light from one or more of the plurality of light-emitting units 1 when the optical member 2 is in the state A before movement. FIG. 11 is a diagram illustrating an example of emission light from one or more of the plurality of light-emitting units 1 when the optical member 2 is in the state B after movement. FIG. 12 is a diagram illustrating an example of mixed color light obtained by mixing the emission lights of FIGS. 10 and 11. FIGS. 7 to 12 illustrate the emission light when the irradiated region 200 is viewed from the light source device 100 side.

Mixed color light refers to light in which light of a plurality of chromaticities is mixed. The mixed color light in the present embodiment is light in which the light of the first chromaticity and the light of the second chromaticity are mixed.

As illustrated in FIG. 7, in the state A, the color of an emission light 201 is the first chromaticity because the light of the first chromaticity emitted by the light-emitting unit 1 and passing through the first region 21 is emitted to the irradiated region 200.

As illustrated in FIG. 8, in the state B, the color of an emission light 202 is the second chromaticity because the light of the second chromaticity emitted by the light-emitting unit 1 and wavelength-converted by and transmitted through the second region 22 is emitted to the irradiated region 200.

A mixed color light 203 illustrated in FIG. 9 is light obtained by time-averaging and mixing the lights of the first chromaticity that has passed through the first region 21 and the light of the second chromaticity that has been wavelength-converted by and transmitted through the second region 22 within the exposure period Ts. The color of the mixed color light 203 can be adjusted by adjusting the ratio between the amount of the emission light 201 and the amount of the emission light 202 in the exposure period Ts.

For example, if the emission time of the emission light 201 is made longer than the emission time of the emission light 202 within the exposure period Ts, the light source device 100 can emit the mixed color light 203 having a chromaticity closer to the first chromaticity than the second chromaticity. On the other hand, if the emission time of the emission light 202 is made longer than the emission time of the emission light 201, the light source device 100 can emit the mixed color light 203 having a chromaticity closer to the second chromaticity than the first chromaticity.

Alternatively, if the drive current of the light-emitting unit 1 for emitting the emission light 201 is made greater than the drive current of the light-emitting unit 1 for emitting the emission light 202 within the exposure period Ts, the light source device 100 can emit the mixed color light 203 having a chromaticity closer to the first chromaticity than the second chromaticity. If the drive current of the light-emitting unit 1 for emitting the emission light 202 is made greater than the drive current of the light-emitting unit 1 for emitting the emission light 201, the light source device 100 can emit the mixed color light 203 having a chromaticity closer to the second chromaticity than the first chromaticity. The light source device 100 may adjust the drive power of the light-emitting units 1 within the exposure period Ts.

Accordingly, the light source device 100 can emit any one of light of the first chromaticity, light of the second chromaticity, and mixed color light of the first chromaticity and the second chromaticity by controlling the relative movement between the plurality of light-emitting units 1 and the optical member 2 and the light emission of the plurality of light-emitting units 1 in the exposure period Ts. In addition, the light source device 100 can discretionally change the mixed color light of the first chromaticity and the second chromaticity to a color close to the first chromaticity or to a color close to the second chromaticity. The color of the mixed color light of the first chromaticity and the second chromaticity is an example of a predetermined color.

In addition, the light emission control unit 41 of the light source device 100 can control selection of the light-emitting unit 1 to emit light from among the plurality of light-emitting units 1 and control at least one of the drive current and the light emission period of each of the plurality of light-emitting units 1. Thus, as illustrated in FIGS. 10 to 12, the light source device 100 can partially irradiate the irradiated region 200 with a mixed color light 203a based on color-adjusted emission light 201a and 202a. Furthermore, "partial irradiation" refers to partially emitting light from the light source device 100 to a part of the irradiated region 200. The light source device 100 can discretionally change the position that is partially irradiated in the irradiated region 200.

The light emitted by each of the plurality of light-emitting units 1 is not limited to being emitted to a rectangular region in the irradiated region 200 and may be emitted to a region having a circular shape, an elliptical shape, or the like. That is, FIGS. 7 to 12 illustrate an example in which each of the emission lights 201, 202, 201a, and 202a and the mixed color light 203 and 203a are rectangular regions in the irradiated region 200, but no such limitation is intended. In addition, the light emitted by each of the plurality of light-emitting units 1 may partially overlap with the adjacent light-emitting unit 1.

Effects of Light Source Device 100

There is demand for a light source device that emits light color-adjusted to a predetermined color in a predetermined period. As a configuration for color adjustment, for example, a light-emitting unit that emits light of a first chromaticity and a light-emitting unit that emits light of a second chromaticity may be separately provided. However, when two types of light-emitting units are provided, the size of the light-emitting unit at least doubles, increasing the size of the light source device, and the number of components also increases. In addition, because it is difficult to make the optical axes of the two types of light-emitting units align with one another, color unevenness may occur in the emission light.

In addition, for example, there may be a case in which the irradiated region is divided into a plurality of regions to be partially irradiated, and the light source device includes a light-emitting unit that emits light of the first chromaticity and a light-emitting unit that emits light of the second chromaticity, the light-emitting units being alternately arranged. In that case, the light-emitting unit that emits light of the first chromaticity and the light-emitting unit that emits light of the second chromaticity are combined into one divided portion, and thus twice as many light-emitting units as the number of divided portions are required. Therefore, the size of the light source device increases, and the number of components increases.

In the present embodiment, the light source device 100 includes the plurality of light-emitting units 1 each including the light-emitting surface 11. The light source device 100 includes the optical member 2 that includes the first region 21 in which light having the first chromaticity can be extracted and the second region 22 in which light having the second chromaticity different from the first chromaticity can be extracted, with the optical member 2 allowing the light emitted by the light-emitting units 1 to be transmitted or pass through. The light source device 100 includes the first movement assembly 3 and the control unit 4. The first movement assembly 3 causes a relative movement between the plurality of light-emitting units 1 and the optical member 2 so that the light-emitting surface 11 and the optical member 2 face one another. The control unit 4 includes the light emission control unit 41 configured to control light emission of each of the plurality of light-emitting units 1, and the first movement control unit 42 configured to control the operation of the first movement assembly 3.

The light emission control unit 41 performs control such that each light-emitting unit emits light within the exposure period Ts (predetermined period), and the first movement control unit 42 performs control of the relative movement between the plurality of light-emitting units 1 and the optical member 2 within the exposure period Ts.

The light source device 100 controls the light emission of the plurality of light-emitting units 1 and the relative movement between the plurality of light-emitting units 1 and the optical member 2 within the exposure period Ts, and adjust a ratio within the exposure period Ts between an amount of light having the first chromaticity transmitted or passed through the first region 21 and an amount of light having the second chromaticity transmitted or passed through the second region 22, from among the light emitted by the plurality of light-emitting units 1. In this manner, the light of the first chromaticity and the light of the second chromaticity are time-averaged and mixed within the exposure period Ts, and light color-adjusted to a predetermined color obtained by mixing the first chromaticity and the second chromaticity can be emitted. In other words, the light source device 100 can provide the light source device 100 that can emit light adjusted to a predetermined color within the exposure period Ts using only one type of light-emitting unit.

As described above, because the light source device 100 does not include two types of light-emitting units including light-emitting units that emit light of the first chromaticity and light-emitting units that emit light of the second chromaticity, it is possible to avoid an increase in size and cost of the light source device.

The light source device 100 can emit not only the mixed color light of the first chromaticity and the second chromaticity but also the light of the first chromaticity and the light of the second chromaticity. Although the optical member 2 including a wavelength conversion substance has been used as an example, the optical member 2 may include a color filter instead of a wavelength conversion substance. In addition, although a configuration in which the optical member 2 is moved by the first movement assembly 3 has been used as an example, a configuration in which the plurality of light-emitting units 1 are moved may be employed.

Also, in the present embodiment, the light emission control unit 41 controls the amount of light emitted from each of the plurality of light-emitting units 1 by selecting the light-emitting unit 1 to emit light from among the plurality of light-emitting units 1, and by controlling at least one of the drive current, the drive voltage, and the light emission period of each of the plurality of light-emitting units 1. Thus, the light source device 100 can partially emit color-adjusted light.

In the present embodiment, the optical member 2 includes one first region 21 and one second region 22, and these regions are arranged so as to face the light-emitting surface 11. The first movement control unit 42 can perform control to set, within the exposure period Ts, the state in the state A in which the plurality of light-emitting units 1 are included in one first region 21 in a plan view and the state B in which the plurality of light-emitting units 1 are included in one second region 22 in a plan view. Thus, the light source device 100 can emit at least one of the light of the first chromaticity, the light of the second chromaticity, and the mixed color light of the first chromaticity and the second chromaticity.

In the present embodiment, a configuration in which the light of the first chromaticity is extracted from the first region 21 and the light of the second chromaticity is extracted from the second region 22 has been used as an example. However, the optical member 2 may be configured so that the light of the second chromaticity is extracted from the first region 21 and the light of the first chromaticity is extracted from the second region 22.

Modified Example of First Embodiment

A modified example of the first embodiment will now be described. Note that members having the same terms and reference characters as the first embodiment represent the same or similar members, and a detailed description of these members will be omitted as appropriate. A description and illustration of the same constituent members as those of the light source device 100 will be omitted as appropriate, and differences from the light source device 100 will be mainly described. This is also true for each of the following embodiments and modified examples.

Figure 13:
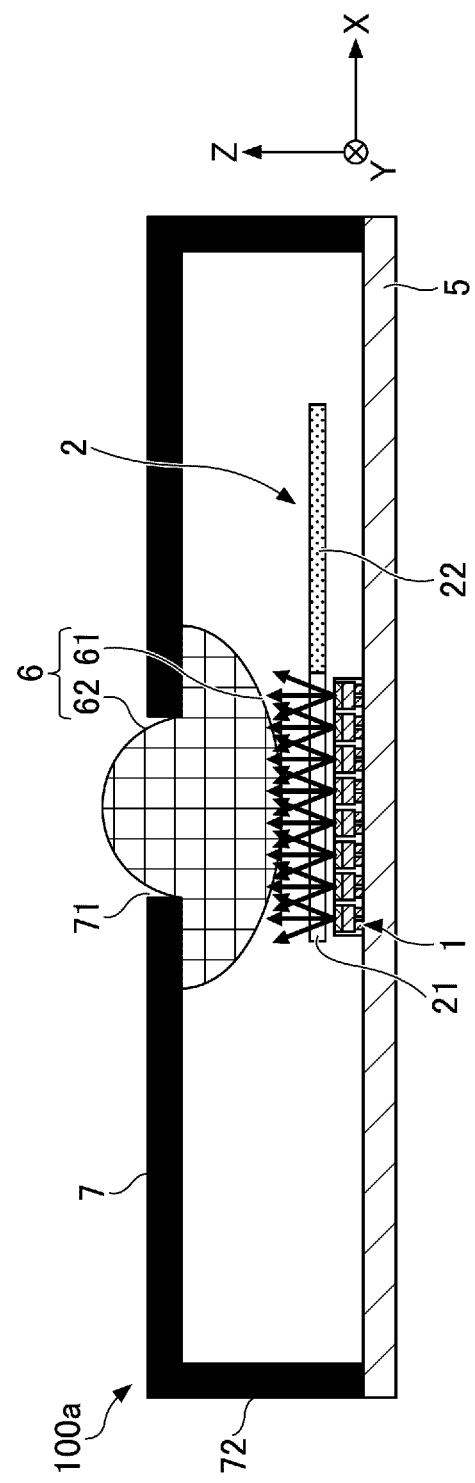
FIG. 13 is a cross-sectional view illustrating a configuration example of a light source device according to a first modified example of the first embodiment.

FIG. 13 is a cross-sectional view illustrating an example of a configuration of a light source device 100a according to a first modified example of the first embodiment. The light source device 100a includes a first lens 6 and a housing 7 in addition to the configuration of the light source device 100.

The first lens 6 is an example of a lens that emits light that has been emitted by the plurality of light-emitting units 1 and transmitted or passed through the optical member 2. The first lens 6 irradiates the irradiated region 200 on the +Z side of the light source device 100 with the light transmitted or passed through the optical member 2.

In the present modified example, the first lens 6 is a biconvex single lens including a first convex surface 61 protruding to the light-emitting unit 1 side (−Z side) and a second convex surface 62 protruding to the side opposite (+Z side) the light-emitting unit 1. The radius of curvature of the first convex surface 61 is larger than the radius of curvature of the second convex surface 62. The first lens 6 is formed into a substantially circular shape in a plan view. The first lens 6 is held in a state in which the second convex surface 62 fits into an opening 71 formed in the housing 7. The shortest distance in the Z direction between the first lens 6 and the optical member 2 is, for example, in a range from 100 μm to 1500 μm.

However, the first lens 6 is not limited to this configuration, and may be a concave lens or a meniscus lens, or may be a combined lens including a plurality of lenses. The radius of curvature of the first convex surface 61 is preferably larger than the radius of curvature of the second convex surface 62, but the radius of curvature of the first lens 6, the thickness of the lens, and the like can be changed as appropriate. The shape of the first lens 6 in a plan view is not limited to being substantially circular and may be substantially elliptical or substantially rectangular, substantially triangular, or another polygonal shape.

The light-emitting surfaces 11 of all of the light-emitting units 1 are preferably disposed on the inner side of the first lens 6 in a plan view (inward from the outer shape of the first lens 6).

The first lens 6 is optically transmissive to light emitted by the light-emitting unit 1 and includes at least one of a resin material, such as polycarbonate resin, acrylic resin, silicone resin, epoxy resin, and the like or a glass material. Note that "optically transmissive" refers to a property that allows 60% or more of the light from the light-emitting unit 1 to be transmitted.

The housing 7 is a member with a substantially rectangular box-shape in a plan view that can house the light-emitting units 1, the optical member 2, and the first movement assembly 3 therein. A portion of a housing of a smartphone installed with the light source device 100 may be the housing 7. The housing 7 includes the opening 71 and a first lens holding portion 72.

The opening 71 is formed into a substantially circular shape in a plan view. The opening 71 is preferably formed to be larger than the second convex surface 62 in a plan view so that the second convex surface 62 is exposed. The −Z side surface of the first lens holding portion 72 is fixed to the +Z side surface of the light-emitting unit mounting substrate 5 by an adhesive member or the like.

The housing 7 is preferably formed of a member having light-shielding properties and preferably includes a resin material or the like containing a filler, such as a light-reflecting member, or a light-absorbing member so that the distribution direction of the light emitted from the plurality of light-emitting units 1 can be restricted.

As described above, the light source device 100a further includes the first lens 6 that emits light transmitted or passed through the optical member 2. The first movement assembly 3 moves the optical member 2 relative to the plurality of light-emitting units 1 and the first lens 6 so that the light-emitting surface 11 and the optical member 2 face one another. Accordingly, the light source device 100a can collect the light from the plurality of light-emitting units 1 via the first lens 6 and efficiently irradiate the irradiated region 200 with the light.

Figure 14:
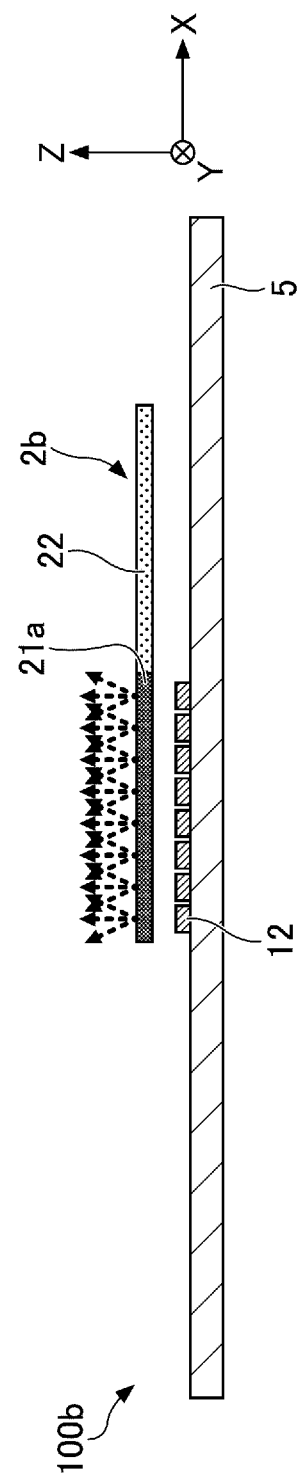
FIG. 14 is a cross-sectional view illustrating a configuration example of a light source device according to a second modified example of the first embodiment.

FIG. 14 is a cross-sectional view illustrating an example of a configuration of a light source device 100b according to a second modified example of the first embodiment. The light source device 100b includes the plurality of light-emitting elements 12 and an optical member 2b. The light-emitting element 12 is an example of a light-emitting unit.

The light-emitting elements 12 are mounted on the +Z side surface of the light-emitting unit mounting substrate 5. The light-emitting elements 12 emit blue light, for example.

The optical member 2b includes one first region 21a and one second region 22. The first region 21a includes a wavelength conversion substance and can extract light having a chromaticity different from the second chromaticity.

The light source device 100b can efficiently excite the wavelength conversion substance contained in the optical member 2 by including the light-emitting elements 12 that emit short-wavelength light, for example.

Figure 15:
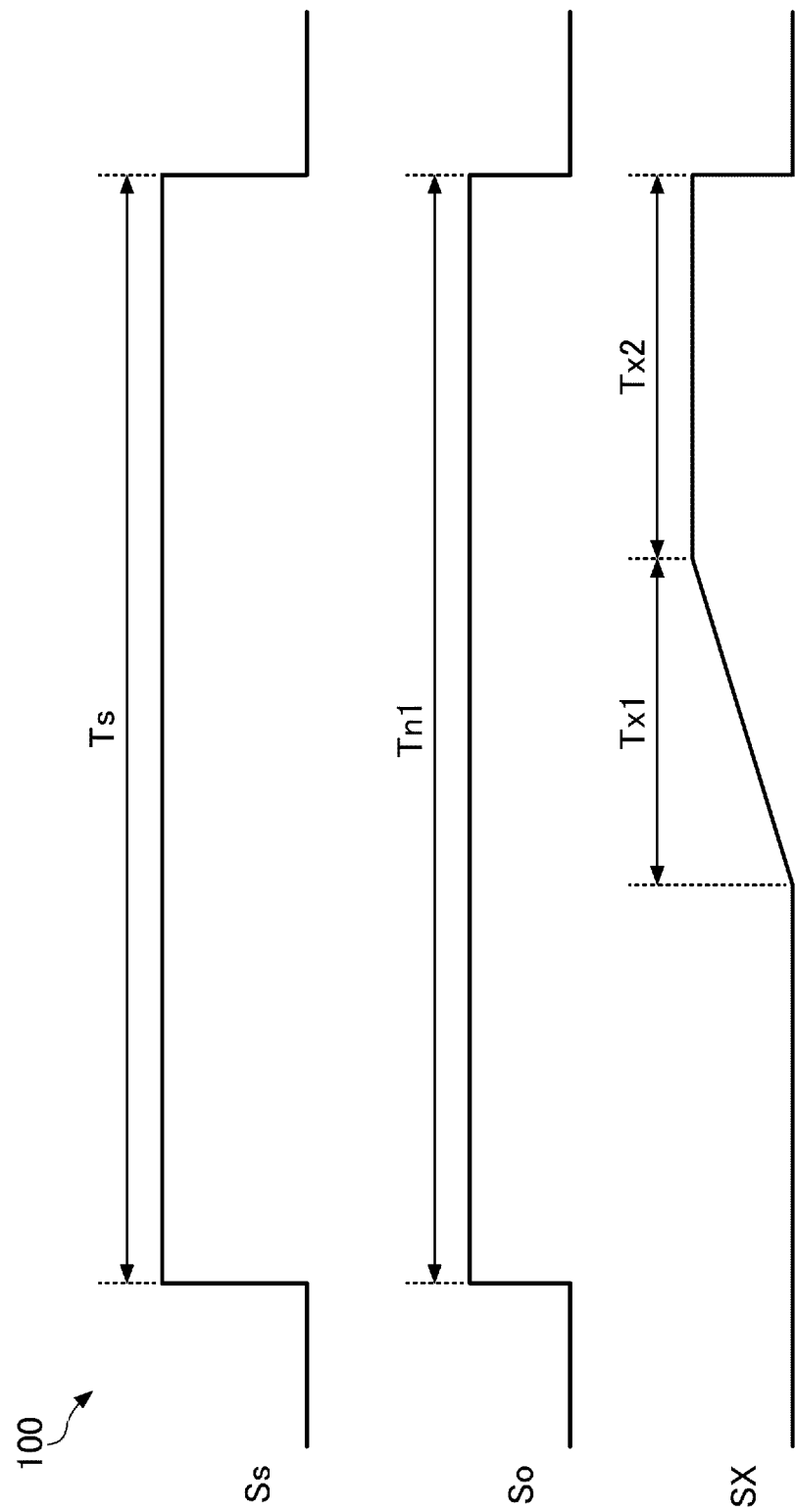
FIG. 15 is a timing chart illustrating a second example of the operations of the light source device in FIG. 1.

FIG. 15 is a timing chart illustrating a second example of the operations of the light source device 100. As illustrated in FIG. 15, the light emission signal So continues to be in the on state even in the movement period Tx1, and the plurality of light-emitting units 1 continue to emit light without turning to non-light emission.

In this manner, the light-emitting units 1 of the light source device 100 can emit light during the movement period Tx1. By not providing a period during which the light-emitting units 1 do not emit light in the movement period Tx1, it is possible to increase the amount of light emitted by the light source device 100. However, from the viewpoint of suppressing the color change of the emission light during the movement of the optical member 2 and more accurately adjusting the color, it is preferable for the light-emitting units 1 of the light source device 100 not to emit light in the movement period Tx1.

Second Embodiment

Configuration Example of Light Source Device 100c

Figure 16:
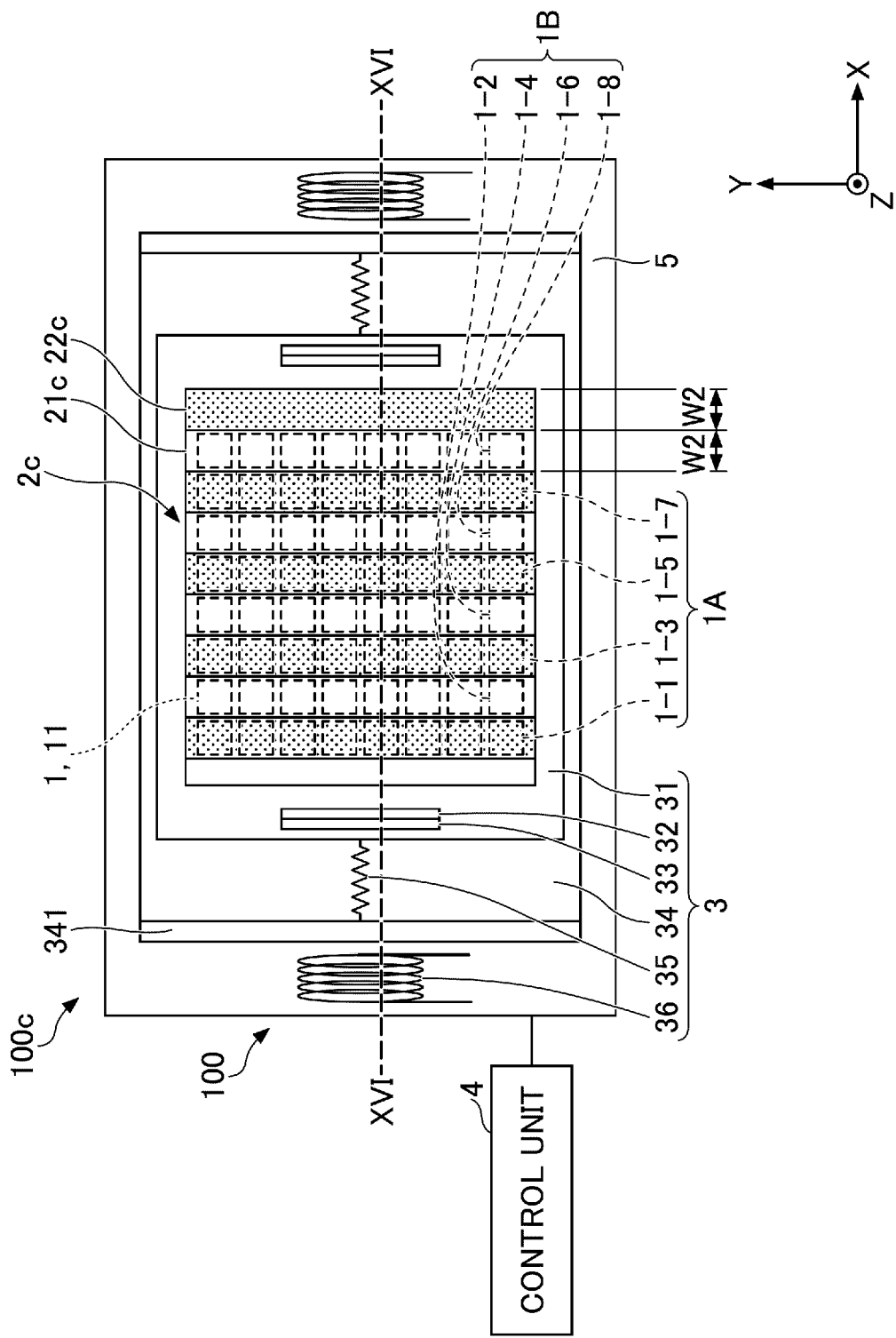
FIG. 16 is a plan view illustrating a configuration example of a light source device according to a second embodiment.
Figure 17:
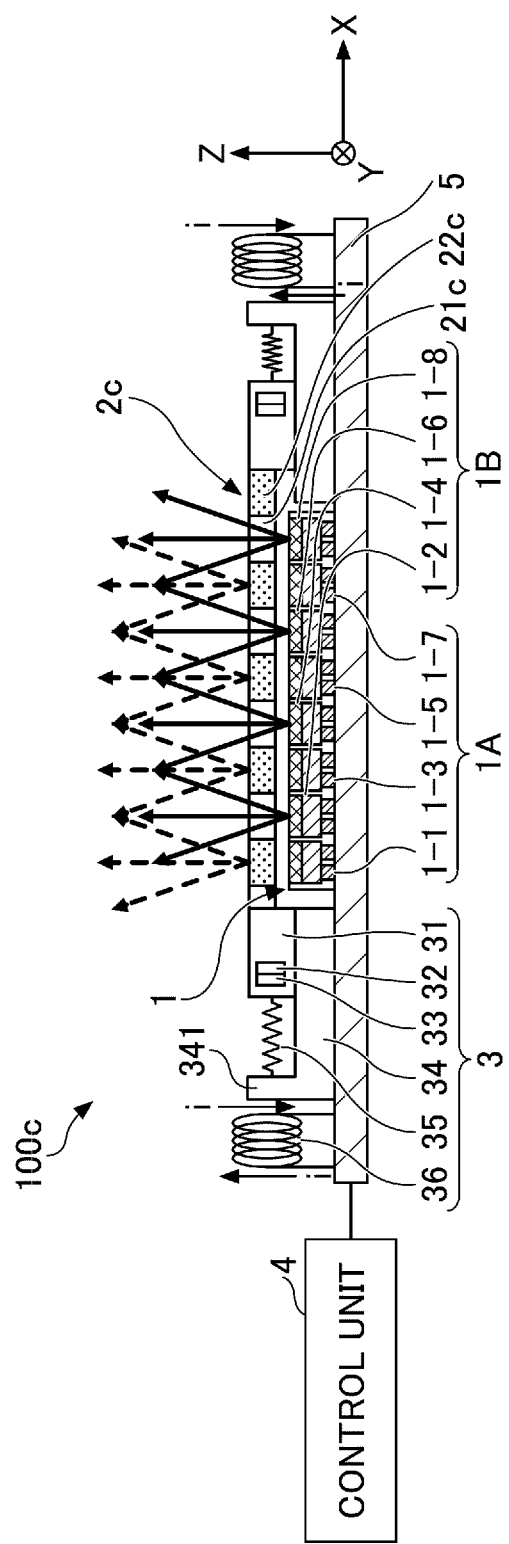
FIG. 17 is a cross-sectional view taken along line XVI-XVI in FIG. 16.
Figure 18:
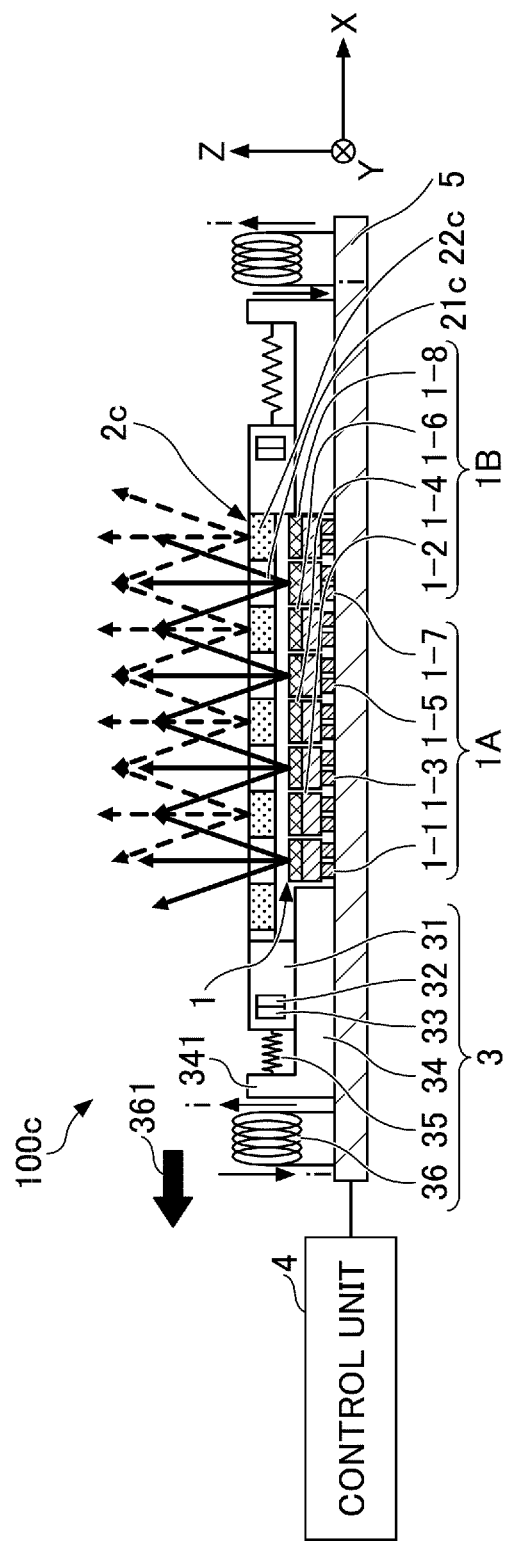
FIG. 18 is a cross-sectional view illustrating the light source device after the optical member is moved from the state illustrated in FIG. 17.

FIG. 16 is a plan view illustrating a configuration example of a light source device 100c according to the second embodiment. FIG. 17 is a cross-sectional view taken along line XVI-XVI in FIG. 16. FIG. 18 is a cross-sectional view illustrating the light source device 100c after an optical member 2c is moved from the state illustrated in FIG. 17.

As illustrated in FIGS. 16 to 18, the light source device 100c includes the optical member 2c.

The optical member 2c includes a plurality of first regions 21c from which light of the first chromaticity can be extracted and a plurality of second regions 22c from which light of the second chromaticity can be extracted. The plurality of first regions 21c and the plurality of second regions 22c are alternately arranged in the X direction so as to face the plurality of light-emitting surfaces 11. The plurality of second regions 22c of the optical member 2c may include a wavelength conversion substance. The width of the plurality of first regions 21c in the X direction and the width of the plurality of second regions 22c in the X direction are equal and are all a width W2. The configuration of the first region 21c is the same as or similar to that of the first region 21 described above, and the configuration of the second region 22c is the same as or similar to that of the second region 22 described above.

Because the plurality of first regions 21c and the plurality of second regions 22c are alternately arranged in the X direction, the width W2 is narrower than the width W1 of the example in which one first region 21 and one second region 22 are arranged. The width W2 is substantially equal to 1/N of the width W1, where N is the total number of the plurality of first regions 21c and the plurality of second regions 22c alternately arranged in the X direction. In the present embodiment, N=9.

In a state C before the optical member 2c is moved, as illustrated in FIGS. 16 and 17, from among the plurality of light-emitting units 1, the plurality of light-emitting units 1 included in a first light-emitting unit row group 1A including a light-emitting unit row 1-1, a light-emitting unit row 1-3, a light-emitting unit row 1-5, and a light-emitting unit row 1-7, which are rows of the light-emitting units 1 arranged in the Y direction, respectively face the second regions 22c. From among the plurality of light-emitting units 1, the plurality of light-emitting units 1 included in a second light-emitting unit row group 1B including a light-emitting unit row 1-2, a light-emitting unit row 1-4, a light-emitting unit row 1-6, and a light-emitting unit row 1-8 respectively face the first regions 21c.

On the other hand, in a state D which is a state after the optical member 2c is moved from the state illustrated in FIG. 17 in the −X direction by a distance substantially equal to the width W2, as illustrated in FIG. 18, from among the plurality of light-emitting units 1, the plurality of light-emitting units 1 included in the first light-emitting unit row group 1A respectively face the first regions 21c. From among the plurality of light-emitting units 1, the light-emitting units 1 included in the second light-emitting unit row group 1B respectively face the second regions 22c.

As described above, in the present embodiment, the first movement assembly 3 moves the optical member 2c to the −X side by a distance substantially equal to the width W2, causing a switch between the state C in which predetermined light-emitting units of the plurality of light-emitting units 1 are included in the second regions 22c in a plan view and the state D in which the predetermined light-emitting units are included in the first regions 21c in a plan view. The first movement control unit 42 of the control unit 4 performs control to set the state C and the state D within the exposure period Ts. The plurality of light-emitting units 1 included in the first light-emitting unit row group 1A are an example of predetermined light-emitting units.

The light source device 100c includes a total of 64 light-emitting units 1 provided in an array of eight light-emitting units 1 aligned in the X direction and eight light-emitting units 1 aligned in the Y direction, but the arrangement and number of the light-emitting units 1 are not limited thereto. It is sufficient that the light-emitting units 1 number at least two at least in the X direction, and the arrangement and the number of the light-emitting units 1 can be changed as appropriate depending on the application of the light source device 100c or the like.

In the present embodiment, as the optical member 2c, a configuration in which a total of nine regions including four first regions 21c and five second regions 22c are arranged in the X direction is used as an example, but the number of the first regions 21c and the second regions 22c in the optical member 2c can be appropriately changed in accordance with the number of the light-emitting units 1.

Operation Example of Light Source Device 100c

Figure 19:
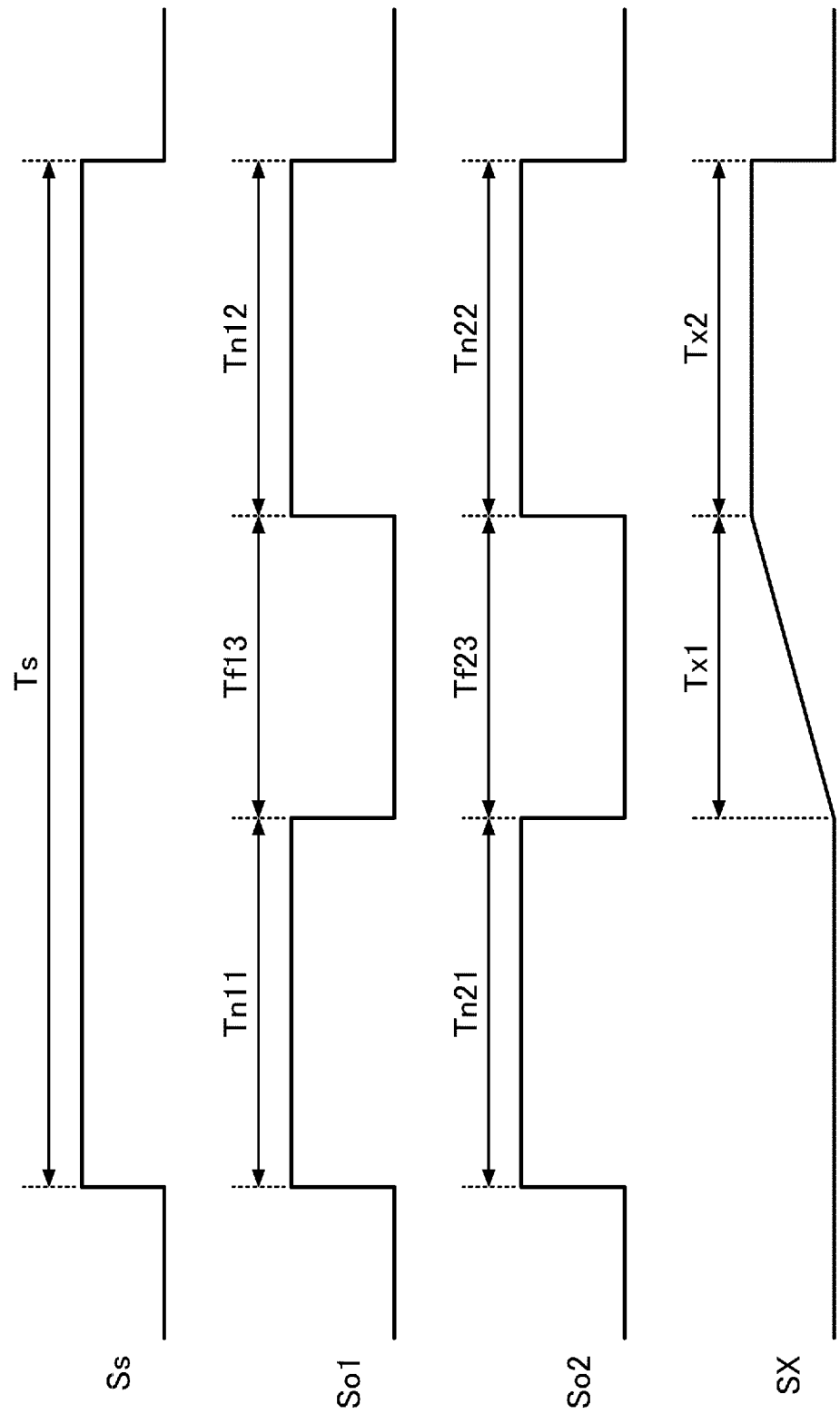
FIG. 19 is a timing chart illustrating a first example of the operations of the light source device in FIG. 16.

FIG. 19 is a timing chart illustrating a first example of the operations of the light source device 100c.

In FIG. 19, a first light emission signal So1 is a signal indicating the light emission timing of the light-emitting units 1 included in the first light-emitting unit row group 1A. Light emission periods Tn11 and Tn12 are periods during which the light-emitting units 1 included in the first light-emitting unit row group 1A emit light (in other words, are turned on). A non-light emission period Tf13 is a period during which the light-emitting units 1 included in the first light-emitting unit row group 1A does not emit light (in other words, are turned off).

A second light emission signal So2 is a signal indicating the light emission timing of the light-emitting units 1 included in the second light-emitting unit row group 1B. Light emission periods Tn21 and Tn22 are periods during which the light-emitting units 1 included in the second light-emitting unit row group 1B emit light (in other words, are turned on). A non-light emission period Tf23 is a period during which the light-emitting units 1 included in the second light-emitting unit row group 1B does not emit light (in other words, are turned off).

When the exposure period Ts is started in response to the timing acquisition unit 43 acquiring the timing information from the smartphone, in the light source device 100c, the light emission control unit 41 controls the light-emitting units 1 included in the first light-emitting unit row group 1A and the second light-emitting unit row group 1B to emit light in the light emission period Tn11 and the light emission period Tn21. In this period, the state of the optical member 2c is the state C in which the light-emitting units 1 included in the first light-emitting unit row group 1A among the plurality of light-emitting units 1 are included in the plurality of second regions 22c in a plan view. In the state C, the light-emitting units 1 included in the second light-emitting unit row group 1B among the plurality of light-emitting units 1 are included in the plurality of first regions 21c in a plan view. The optical member 2c is stopped.

Subsequently, in the movement period Tx1, the first movement control unit 42 of the light source device 100c controls the optical member 2c to move in the −X direction by a distance substantially equal to the width W1. In the non-light emission period Tf13 and the non-light emission period Tf23 parallel to the movement period Tx1, in the light source device 100c, the light emission control unit 41 controls the light-emitting units 1 included in the first light-emitting unit row group 1A and the second light-emitting unit row group 1B to emit no light. The optical member 2c stops after moving in the −X direction by a distance substantially equal to the width W1.

Subsequently, in the light emission period Tn12 and the light emission period Tn22, the light emission control unit 41 of the light source device 100c controls the light-emitting units 1 included in the first light-emitting unit row group 1A and the second light-emitting unit row group 1B to emit light. In this period, the state of the optical member 2c is the state D in which the light-emitting units 1 included in the first light-emitting unit row group 1A among the plurality of light-emitting units 1 are included in the plurality of first regions 21c in a plan view. In the state D, the light-emitting units 1 included in the second light-emitting unit row group 1B among the plurality of light-emitting units 1 are included in the plurality of second regions 22c in a plan view. The optical member 2c is stopped.

In this manner, in the exposure period Ts, the light source device 100c can switch between the state C in which the light-emitting units 1 included in the first light-emitting unit row group 1A among the plurality of light-emitting units 1 are included in the plurality of second regions 22c in a plan view and the state D in which the light-emitting units 1 included in the first light-emitting unit row group 1A are included in the plurality of first regions 21c in a plan view. Also, in the exposure period Ts, the light source device 100c can switch between the state C in which the light-emitting units 1 included in the second light-emitting unit row group 1B among the plurality of light-emitting units 1 are included in the plurality of first regions 21c in a plan view and the state D in which the light-emitting units 1 included in the second light-emitting unit row group 1B are included in the plurality of second regions 22c in a plan view.

Example of Emission Light by Light Source Device 100c

Figure 22:
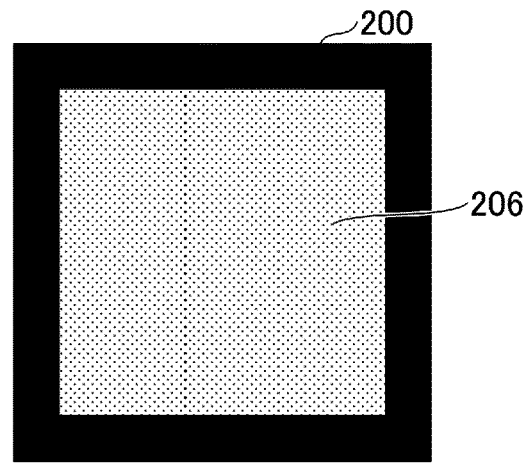
FIG. 22 is a diagram illustrating an example of mixed color light obtained by mixing the emission lights of FIGS. 20 and 21.

FIGS. 20 to 25 are diagrams for describing emission light emitted from the light source device 100c to the irradiated region 200. FIG. 20 is a diagram illustrating an example of emission light when the optical member 2c is in the state C before movement. FIG. 21 is a diagram illustrating an example of emission light when the optical member 2c is in the state D after movement. FIG. 22 is a diagram illustrating an example of mixed color light obtained by mixing the emission lights of FIGS. 20 and 21.

Figure 23:
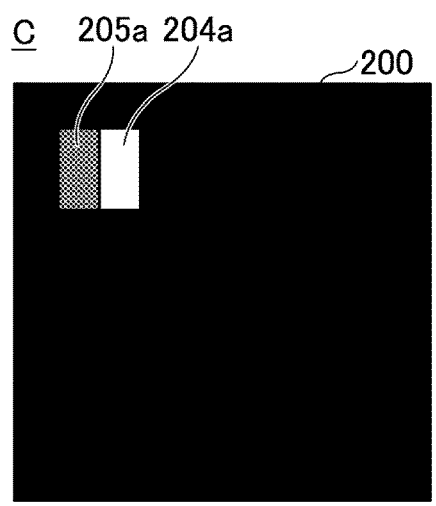
FIG. 23 is a diagram illustrating an example of emission light from one or more light-emitting units of the light source device in FIG. 16 in the state C.

FIG. 23 is a diagram illustrating an example of emission light from one or more of the plurality of light-emitting units 1 when the optical member 2c is in the state C before movement. FIG. 24 is a diagram illustrating an example of emission light from one or more of the plurality of light-emitting units 1 when the optical member 2c is in the state D after movement. FIG. 25 is a diagram illustrating an example of mixed color light obtained by mixing the emission lights of FIGS. 23 and 24.

In the state C, as illustrated in FIG. 20, the irradiated region 200 is irradiated with emission light 204 of the first chromaticity and emission light 205 of the second chromaticity.

In the state D, as illustrated in FIG. 21, the irradiated region 200 is irradiated with the emission light 204 of the first chromaticity and the emission light 205 of the second chromaticity.

A mixed color light 206 illustrated in FIG. 22 is light obtained by time-averaging and mixing the lights of the first chromaticity that has passed through the first regions 21c and the light of the second chromaticity that has been wavelength-converted by and transmitted through the second regions 22c within the exposure period Ts. The color of the mixed color light 206 can be adjusted by adjusting the ratio between the amount of the emission light 204 and the amount of the emission light 205 in the exposure period Ts.

For example, if the emission time of the emission light 204 is made longer than the emission time of the emission light 205 within the exposure period Ts, the light source device 100c can emit the mixed color light 206 having a chromaticity closer to the first chromaticity than the second chromaticity. On the other hand, if the emission time of the emission light 205 is made longer than the emission time of the emission light 204, the light source device 100c can emit the mixed color light 206 having a chromaticity closer to the second chromaticity than the first chromaticity.

Alternatively, if the drive current of the light-emitting units 1 for emitting the emission light 204 is made greater than the drive current of the light-emitting units 1 for emitting the emission light 205 within the exposure period Ts, the light source device 100c can emit the mixed color light 206 having a chromaticity closer to the first chromaticity than the second chromaticity. If the drive current of the light-emitting units 1 for emitting the emission light 205 is made greater than the drive current of the light-emitting units 1 for emitting the emission light 204, the light source device 100c can emit the mixed color light 206 having a chromaticity closer to the second chromaticity than the first chromaticity. The light source device 100c may adjust the drive power of the light-emitting units 1 within the exposure period Ts.

Accordingly, the light source device 100c can emit any one of light of the first chromaticity, light of the second chromaticity, and mixed color light of the first chromaticity and the second chromaticity by controlling the relative movement between the plurality of light-emitting units 1 and the optical member 2c and the light emission of the plurality of light-emitting units 1 in the exposure period Ts. In addition, the light source device 100c can discretionally change the mixed color light of the first chromaticity and the second chromaticity to a color close to the first chromaticity or to a color close to the second chromaticity.

In addition, the light source device 100c can control, via the light emission control unit 41, selection of the light-emitting unit 1 to emit light from among the plurality of light-emitting units 1 and control at least one of the drive current and the light emission period of each of the plurality of light-emitting units 1. Thus, as illustrated in FIGS. 23 to 25, the light source device 100c can partially irradiate the irradiated region 200 with a mixed color light 206a based on color-adjusted emission lights 204a and 205a. The light source device 100c can discretionally change the position that is partially irradiated in the irradiated region 200.

Effects of Light Source Device 100c

As described above, in the present embodiment, the optical member 2c includes the plurality of first regions 21c and the plurality of second regions 22c. The plurality of first regions 21c and the plurality of second regions 22c are alternately arranged in the X direction (first direction) so as to face the plurality of light-emitting surfaces 11. The plurality of light-emitting units 1 are arranged at least in the X direction.

In the exposure period Ts, the first movement control unit 42 can perform control to set the state C in which the light-emitting units 1 (predetermined light-emitting units) included in the first light-emitting unit row group 1A of the plurality of light-emitting units 1 are included in the plurality of second regions 22c in a plan view and the state D in which the light-emitting units 1 included in the first light-emitting unit row group 1A are included in the plurality of first regions 21c in a plan view.

Because the plurality of first regions 21c and the plurality of second regions 22c are alternately arranged in the X direction, the width W2 can be made narrower than the width W1. As a result, the relative movement distance of the optical member 2c by the first movement assembly 3 can be decreased.

The size of the light source device 100c can be reduced by decreasing the relative movement distance of the optical member 2c, and fluctuation in the emission light can be reduced by suppressing disturbance or the like during the relative movement of the light source device 100c to stabilize the operation. In addition, the light source device 100c can avoid an increase in the exposure period Ts. Other effects are the same as or similar to the effects in the first embodiment.

Modified Example of Second Embodiment

Figure 26:
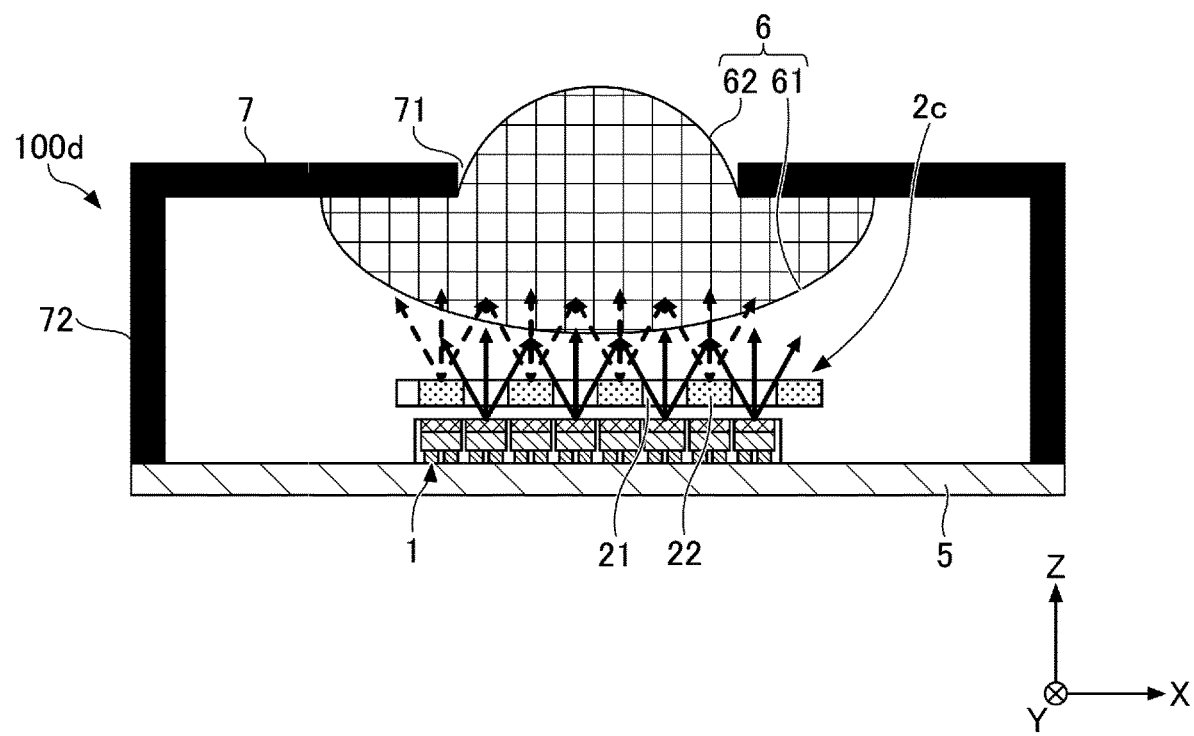
FIG. 26 is a cross-sectional view illustrating a configuration example of a light source device according to a first modified example of the second embodiment.

FIG. 26 is a cross-sectional view illustrating an example of a configuration of a light source device 100d according to a first modified example of the second embodiment. The light source device 100d includes the first lens 6 and the housing 7 in addition to the configuration of the light source device 100.

The first lens 6 emits light transmitted or passed through the optical member 2c. The first movement assembly 3 moves the optical member 2c relative to the plurality of light-emitting units 1 and the first lens 6 so that the light-emitting surface 11 and the optical member 2c face one another. The light-emitting surfaces 11 of all of the light-emitting units 1 are preferably disposed on the inner side of the first lens 6 in a plan view (inward from the outer shape of the first lens 6).

Because the light source device 100d includes the first lens 6, it is possible to collect light from the plurality of light-emitting units 1 and efficiently irradiate the irradiated region 200 with the light.

Figure 27:
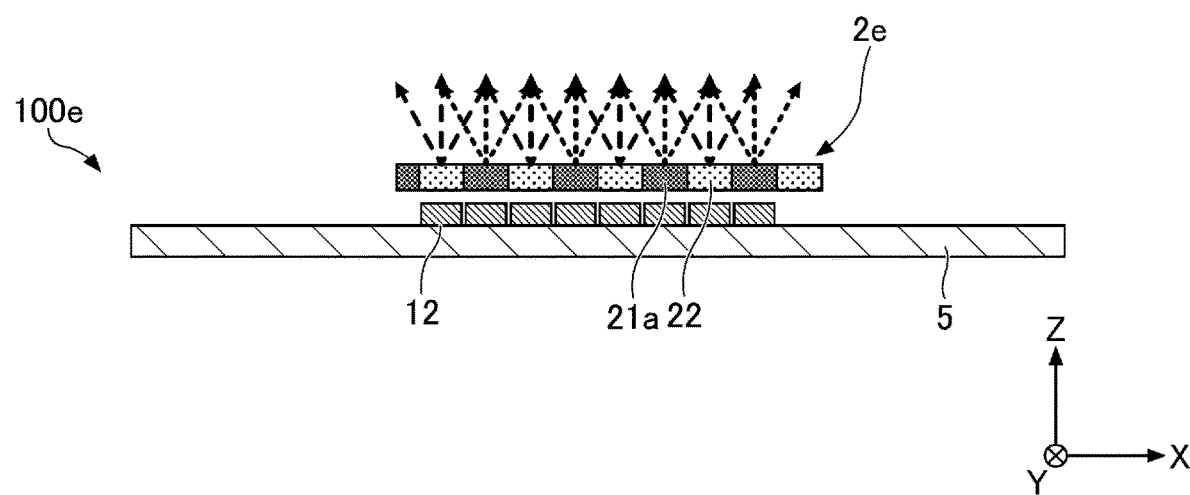
FIG. 27 is a cross-sectional view illustrating a configuration example of a light source device according to a second modified example of the second embodiment.

FIG. 27 is a cross-sectional view illustrating an example of a configuration of a light source device 100e according to a second modified example of the second embodiment. The light source device 100e includes the plurality of light-emitting elements 12 and an optical member 2e.

The optical member 2e includes the plurality of first regions 21a and the plurality of second regions 22. The first region 21a includes a wavelength conversion substance and can extract light having a chromaticity different from the second chromaticity.

The light source device 100e can efficiently excite the wavelength conversion substance contained in the optical member 2 by including the light-emitting elements 12 that emit short-wavelength light, for example.

Figure 28:
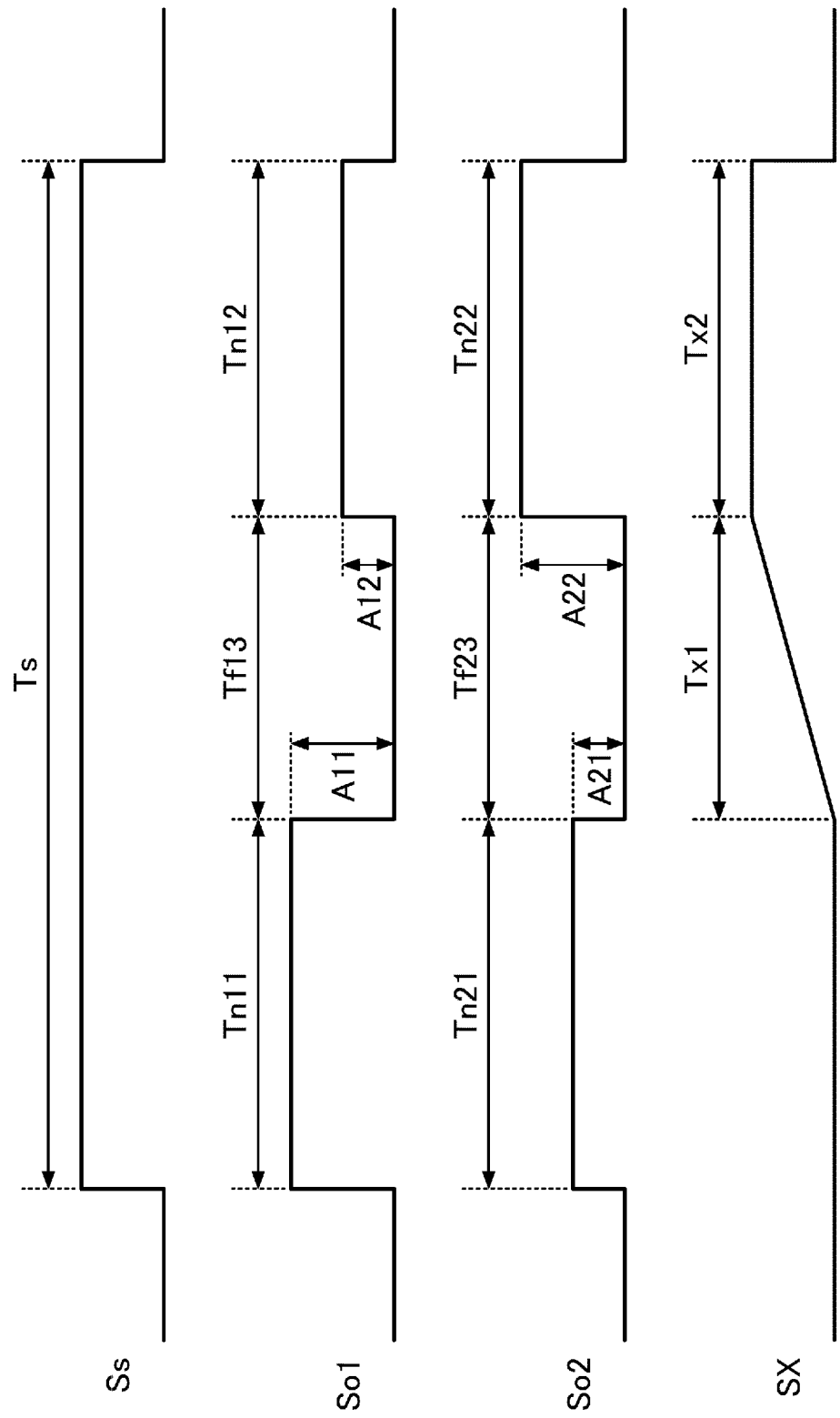
FIG. 28 is a timing chart illustrating a second example of the operations of the light source device in FIG. 16.

FIG. 28 is a timing chart illustrating a second example of the operations of the light source device 100c. As illustrated in FIG. 28, a current value A12 of the first light emission signal So1 in the light emission period Tn12 is less than a current value A11 of the first light emission signal So1 in the light emission period Tn11. Accordingly, in the first light-emitting unit row group 1A, the amount of light of the second chromaticity in the state C is greater than the amount of light of the first chromaticity in the state D.

Also, a current value A21 of the second light emission signal So2 in the light emission period Tn21 is less than a current value A22 of the second light emission signal So2 in the light emission period Tn22. Accordingly, in the second light-emitting unit row group 1B, the amount of light of the second chromaticity in the state D is greater than the amount of light of the first chromaticity in the state C.

As a result, the mixed color light 206 has chromaticity closer to the second chromaticity than to the first chromaticity. In this manner, the light source device 100c can emit color-adjusted light by controlling the drive currents of the plurality of light-emitting units 1. The light source device 100c may control the power values of the plurality of light-emitting units 1.

Figure 29:
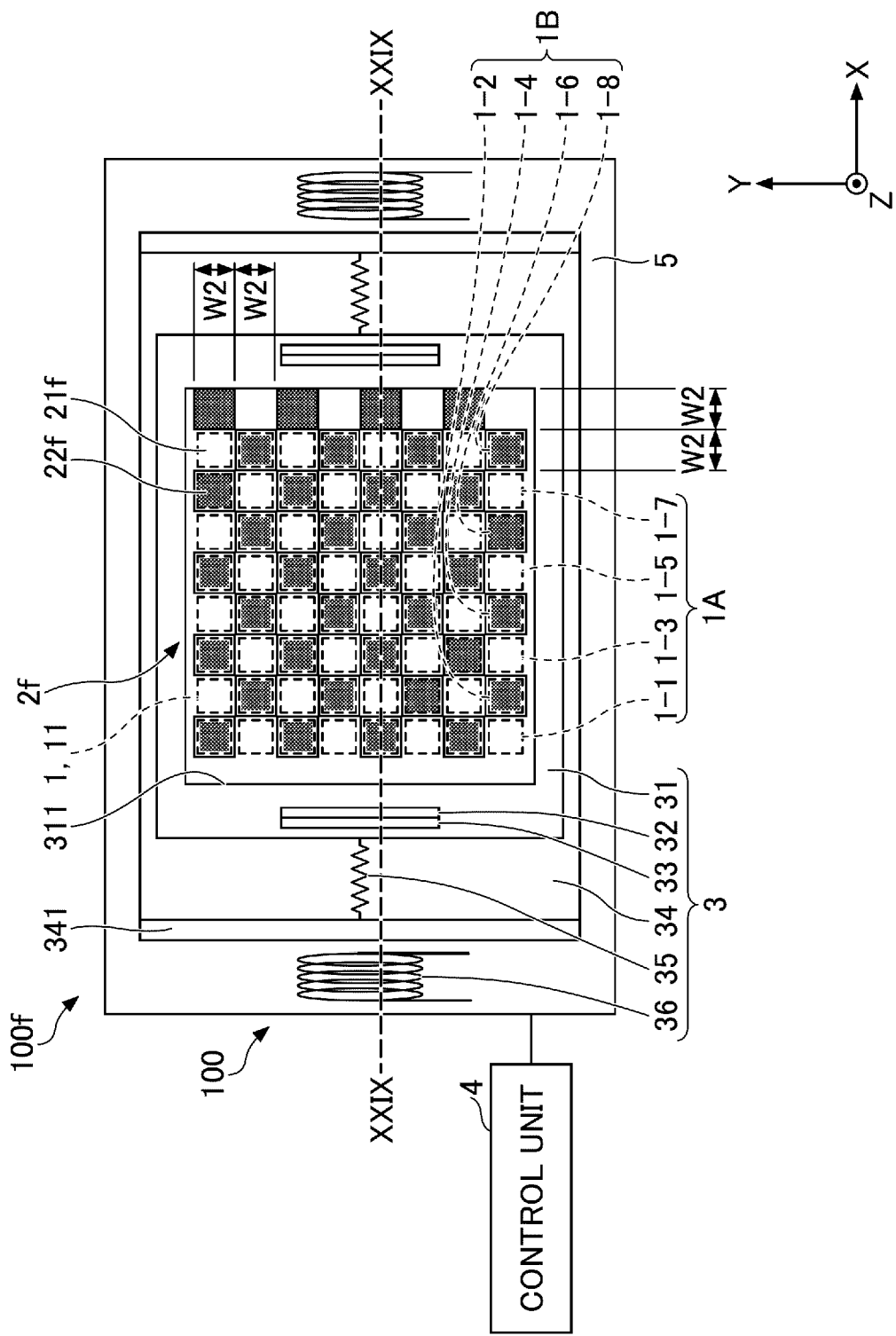
FIG. 29 is a plan view illustrating a configuration example of a light source device according to a third modified example of the second embodiment.

FIG. 29 is a plan view illustrating an example of a configuration of a light source device 100f according to a third modified example of the second embodiment. The light source device 100f includes an optical member 2f.

The optical member 2f includes a plurality of first regions 21f from which light of the first chromaticity can be extracted and a plurality of second regions 22f from which light of the second chromaticity can be extracted. The plurality of first regions 21f and the plurality of second regions 22f are alternately arranged in the X direction and the Y direction so as to face the light-emitting surfaces 11.

The plurality of first regions 21f and the plurality of second regions 22f are arranged so as to be adjacent to one another in the X direction and the Y direction. Four or five first regions 21f are arranged in the X direction, and four or five first regions 21f are arranged in the Y direction, with the first regions 21f totaling 36 regions. Four or five second regions 22f are arranged in the X direction, and four or five second regions 22f are arranged in the Y direction, with the second regions 22f totaling 36 regions. The configuration of the first region 21f is the same as or similar to that of the first region 21 described above, and the configuration of the second region 22f is the same as or similar to that of the second region 22 described above.

The width of the plurality of first regions 21f in the X direction and the width of the plurality of second regions 22f in the X direction are equal and are all the width W2. Also, the width of the plurality of first regions 21f in the Y direction and the width of the plurality of second regions 22f in the Y direction are equal and are all the width W2. However, the width of the plurality of first regions 21f and the plurality of second regions 22f in the X direction and the width thereof in the Y direction may be different from one another. In addition, "width W2" is used in a unified manner for the sake of simplicity, and the same widths are not intended in each embodiment.

Because the plurality of first regions 21f and the plurality of second regions 22f are alternately arranged in the X direction, the width W2 is narrower than the width W1 described above of the example in which one first region 21 and one second region 22 are arranged.

In the present embodiment, the first movement assembly 3 can switch between a state E and a state F by moving the optical member 2f in the X direction by a distance substantially equal to the width W2.

The state E is a state in which one or more of the light-emitting units 1 included in the first light-emitting unit row group 1A arranged in the Y direction among the plurality of light-emitting units 1 are included in the plurality of first regions 21f in a plan view and in which the other light-emitting units 1 included in the first light-emitting unit row group 1A are included in the plurality of second regions 22f in a plan view. The one or more of the light-emitting units 1 included in the first light-emitting unit row group 1A correspond to the second, fourth, sixth, and eighth light-emitting units 1 counted from the +Y direction side, and the other light-emitting units 1 included in the first light-emitting unit row group 1A correspond to the first, third, fifth, and seventh light-emitting units 1 counted from the +Y direction side.

Also, the state E is a state in which one or more of the light-emitting units 1 included in the second light-emitting unit row group 1B arranged in the Y direction of the plurality of light-emitting units 1 are included in the plurality of second regions 22f in a plan view and in which the other light-emitting units 1 included in the second light-emitting unit row group 1B are included in the plurality of first regions 21f in a plan view. The one or more of the light-emitting units 1 included in the second light-emitting unit row group 1B correspond to the second, fourth, sixth, and eighth light-emitting units 1 counted from the +Y direction side, and the other light-emitting units 1 included in the second light-emitting unit row group 1B correspond to the first, third, fifth, and seventh light-emitting units 1 counted from the +Y direction side.

The state F is a state in which one or more of the light-emitting units 1 included in the first light-emitting unit row group 1A arranged in the Y direction are included in the plurality of second regions 22f in a plan view and in which the other light-emitting units 1 included in the first light-emitting unit row group 1A are included in the plurality of first regions 21f in a plan view. Also, the state F is a state in which one or more of the light-emitting units 1 included in the second light-emitting unit row group 1B arranged in the Y direction are included in the plurality of first regions 21f in a plan view and in which the other light-emitting units 1 included in the second light-emitting unit row group 1B are included in the plurality of second regions 22f in a plan view.

The first movement control unit 42 of the control unit 4 performs control to set the state E and the state F within the exposure period Ts. The one or more of the light-emitting units 1 included in the first light-emitting unit row group 1A among the plurality of light-emitting units 1 are an example of predetermined light-emitting units.

The light source device 100f includes a total of 64 light-emitting units 1 provided in an array of eight light-emitting units 1 aligned in the X direction and eight light-emitting units 1 aligned in the Y direction, but the arrangement and number of the light-emitting units 1 are not limited thereto. It is sufficient that the light-emitting units 1 number at least two in the X direction and at least two in the Y direction, and the arrangement and the number of the light-emitting units 1 can be changed as appropriate depending on the application of the light source device 100f or the like.

The number of the first regions 21f and the second regions 22f in the optical member 2f can also be appropriately changed depending on the number of the light-emitting units 1.

FIGS. 30 to 35 are diagrams for describing emission light emitted from the light source device 100f to the irradiated region 200. FIG. 30 is a diagram illustrating an example of emission light when the optical member 2f is in the state E before movement. FIG. 31 is a diagram illustrating an example of emission light when the optical member 2f is in the state F after movement. FIG. 32 is a diagram illustrating an example of mixed color light obtained by mixing the emission lights of FIGS. 30 and 31.

FIG. 33 is a diagram illustrating an example of emission light from one or more of the plurality of light-emitting units 1 when the optical member 2f is in the state E before movement. FIG. 34 is a diagram illustrating an example of emission light from one or more of the plurality of light-emitting units 1 when the optical member 2f is in the state F after movement. FIG. 35 is a diagram illustrating an example of mixed color light obtained by mixing the emission lights of FIGS. 33 and 34.

In the state E, as illustrated in FIG. 30, the irradiated region 200 is irradiated with emission light 207 of the first chromaticity and emission light 208 of the second chromaticity so as to be adjacent to one another in the X direction and the Y direction.

In the state F, as illustrated in FIG. 31, the irradiated region 200 is irradiated with emission light 207 of the first chromaticity and emission light 208 of the second chromaticity so as to be adjacent to one another in the X direction and the Y direction and have the positions inverted from the positions in the state E.

A mixed color light 209 illustrated in FIG. 32 is light obtained by time-averaging and mixing the lights of the first chromaticity that has passed through the first regions 21c and the light of the second chromaticity that has been wavelength-converted by and transmitted through the second regions 22c within the exposure period Ts. The color of the mixed color light 209 can be adjusted by adjusting the ratio between the amount of the emission light 207 and the amount of the emission light 208 in the exposure period Ts.

For example, if the emission time of the emission light 207 is made longer than the emission time of the emission light 208 within the exposure period Ts, the light source device 100f can emit the mixed color light 209 having a chromaticity closer to the first chromaticity than the second chromaticity. On the other hand, if the emission time of the emission light 208 is made longer than the emission time of the emission light 207, the light source device 100f can emit the mixed color light 209 having a chromaticity closer to the second chromaticity than the first chromaticity.

Alternatively, if the drive current of the light-emitting units 1 for emitting the emission light 207 is made greater than the drive current of the light-emitting units 1 for emitting the emission light 208 within the exposure period Ts, the light source device 100f can emit the mixed color light 209 having a chromaticity closer to the first chromaticity than the second chromaticity. If the drive current of the light-emitting units 1 for emitting the emission light 208 is made greater than the drive current of the light-emitting units 1 for emitting the emission light 207, the light source device 100f can emit the mixed color light 209 having a chromaticity closer to the second chromaticity than the first chromaticity. The light source device 100f may control the power values of the plurality of light-emitting units 1.

Accordingly, the light source device 100f can emit any one of light of the first chromaticity, light of the second chromaticity, and mixed color light of the first chromaticity and the second chromaticity by controlling the relative movement between the plurality of light-emitting units 1 and the optical member 2f and the light emission of the plurality of light-emitting units 1 in the exposure period Ts. In addition, the light source device 100f can discretionally change the mixed color light of the first chromaticity and the second chromaticity to a color close to the first chromaticity or to a color close to the second chromaticity.

In addition, the light emission control unit 41 of the light source device 100f can control, selection of the light-emitting unit 1 to emit light from among the plurality of light-emitting units 1 and control at least one of the drive current and the light emission period of each of the plurality of light-emitting units 1. Thus, as illustrated in FIGS. 33 to 35, the light source device 100f can partially irradiate the irradiated region 200 with a mixed color light 209a based on color-adjusted emission light 207a and 208a. The light source device 100f can discretionally change the position that is partially irradiated in the irradiated region 200.

In the light source device 100f, the plurality of first regions 21c and the plurality of second regions 22c are alternately arranged in the X direction and the Y direction so as to face the light-emitting surfaces 11. Thus, in switching from the state E to the state F, the relative movement of the optical member 2f by the first movement assembly 3 may be in either the X direction or the Y direction. Further, the relative movement distance can be made less than the width W1.

FIG. 36 is a plan view illustrating an example of a configuration of an optical member 2g in a light source device 100g according to a fourth modified example of the second embodiment. The light source device 100g includes 8×8=64 light-emitting units 1.

The optical member 2g includes a plurality of first regions 21g from which light of the first chromaticity can be extracted, a plurality of second regions 22g from which light of the second chromaticity can be extracted, and a plurality of third regions 23g from which light of a third chromaticity can be extracted. The plurality of first regions 21g, the plurality of second regions 22g, and the plurality of third regions 23g are alternately arranged in the X direction and the Y direction so as to face the light-emitting surfaces 11.

The configuration of the first region 21g is the same as or similar to that of the first region 21 described above, and the configuration of the second region 22g is the same as or similar to that of the second region 22 described above. The third region 23 includes a wavelength conversion substance and can extract light of the third chromaticity different from both the first chromaticity and the second chromaticity.

The width of the plurality of first regions 21g in the X direction, the width of the plurality of second regions 22g in the X direction, and the width of the plurality of third regions 23g in the X direction are equal and are all the width W2. The optical member 2g can be moved in the X direction by the first movement assembly 3.

In a state G before the optical member 2g is moved, from among the plurality of light-emitting units 1, the plurality of light-emitting units 1 included in a third light-emitting unit row group 1C including a light-emitting unit row 1-1, a light-emitting unit row 1-4, and a light-emitting unit row 1-7, which are rows of the light-emitting units 1 arranged in the Y direction, respectively face the first regions 21g. From among the plurality of light-emitting units 1, the plurality of light-emitting units 1 included in a fourth light-emitting unit row group 1D including a light-emitting unit row 1-2, a light-emitting unit row 1-5, and a light-emitting unit row 1-8 respectively face the second regions 22g. From among the plurality of light-emitting units 1, the plurality of light-emitting units 1 included in a fifth light-emitting unit row group 1E including a light-emitting unit row 1-3 and a light-emitting unit row 1-6 respectively face the third regions 23g.

On the other hand, in a state H which is a state after the first movement in which the optical member 2g is moved from the state illustrated in FIG. 36 in the −X direction by a distance substantially equal to the width W2, from among the plurality of light-emitting units 1, the plurality of light-emitting units 1 included in the third light-emitting unit row group 1C respectively face the second regions 22g. From among the plurality of light-emitting units 1, the light-emitting units 1 included in the fourth light-emitting unit row group 1D respectively face the third regions 23g. From among the plurality of light-emitting units 1, the light-emitting units 1 included in the fifth light-emitting unit row group 1E respectively face the first regions 21g.

Also, in a state I which is a state after a second movement in which the optical member 2g is further moved, after the first movement, in the −X direction by a distance substantially equal to the width W2, from among the plurality of light-emitting units 1, the plurality of light-emitting units 1 included in the third light-emitting unit row group 1C respectively face the third regions 23g. From among the plurality of light-emitting units 1, the light-emitting units 1 included in the fourth light-emitting unit row group 1D respectively face the first regions 21g. From among the plurality of light-emitting units 1, the light-emitting units 1 included in the fifth light-emitting unit row group 1E respectively face the second regions 22g.

In this manner, in the present modified example, the first movement assembly 3 can switch between the state G, the state H, and the state I by moving the optical member 2g two times in the −X direction by a distance substantially equal to the width W2. The state G is a state in which one or more of the light-emitting units 1 included in the third light-emitting unit row group 1C among the plurality of light-emitting units 1 are included in the plurality of first regions 21g in a plan view. The state H is a state in which one or more of the light-emitting units 1 included in the third light-emitting unit row group 1C among the plurality of light-emitting units 1 are included in the plurality of second regions 22g in a plan view. The state I is a state in which one or more of the light-emitting units 1 included in the third light-emitting unit row group 1C among the plurality of light-emitting units 1 are included in the plurality of third regions 23g in a plan view.

The first movement control unit 42 of the control unit 4 performs control to set the state G, the state H, and the state I within the exposure period Ts. The plurality of light-emitting units 1 included in the third light-emitting unit row group 1C are an example of predetermined light-emitting units.

FIGS. 37 to 44 are diagrams for describing emission light emitted from the light source device 100g to an irradiated region 200. FIG. 37 is a diagram illustrating an example of emission light when the optical member 2g is in the state G before movement. FIG. 38 is a diagram illustrating an example of emission light when the optical member 2g is in the state H after the first movement. FIG. 39 is a diagram illustrating an example of emission light when the optical member 2g is in the state I after the second movement. FIG. 40 is a diagram illustrating an example of mixed color light obtained by mixing the emission lights of FIGS. 37 to 39.

Figure 44:
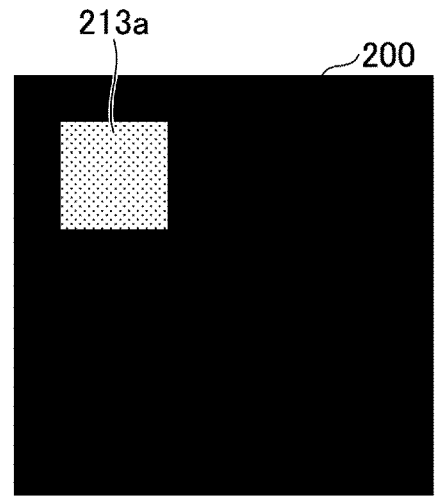
FIG. 44 is a diagram illustrating an example of mixed color light obtained by mixing the emission lights of FIGS. 41 to 43.

FIG. 41 is a diagram illustrating an example of emission light from one or more of the plurality of light-emitting units 1 when the optical member 2g is in the state G before movement. FIG. 42 is a diagram illustrating an example of emission light from one or more of the plurality of light-emitting units 1 in the state H after the first movement of the optical member 2g. FIG. 43 is a diagram illustrating an example of emission light from one or more of the plurality of light-emitting units 1 in the state I after the second movement of the optical member 2g. FIG. 44 is a diagram illustrating an example of mixed color light obtained by mixing the emission lights of FIGS. 41 to 43.

In the state G, as illustrated in FIG. 37, emission light 210 having the first chromaticity, emission light 211 having the second chromaticity, and emission light 212 having the third chromaticity are arranged repeating in this order from the +X direction to the −X direction and are emitted to the irradiated region 200.

In the state H, as illustrated in FIG. 38, the emission light 211 having the second chromaticity, emission light 212 having the third chromaticity, and emission light 210 having the first chromaticity are arranged repeating in this order from the +X direction to the −X direction and are emitted to the irradiated region 200.

In the state I, as illustrated in FIG. 39, the emission light 212 having the third chromaticity, emission light 210 having the first chromaticity, and emission light 211 having the second chromaticity are arranged repeating in this order from the +X direction to the −X direction and are emitted to the irradiated region 200.

A mixed color light 213 illustrated in FIG. 40 is light obtained by time-averaging and mixing the light of the first chromaticity transmitted through the first regions 21g, the light of the second chromaticity wavelength-converted by the second regions 22g, and the light of the third chromaticity wavelength-converted by the third regions 23g within the exposure period Ts. The color of the mixed color light 213 can be adjusted by adjusting the ratio between the amount of the emission light 210, the amount of the emission light 211, and the amount of the emission light 212 in the exposure period Ts.

The light source device 100g can emit any one of light of the first chromaticity, light of the second chromaticity, light of the third chromaticity, and mixed color light of the first chromaticity, the second chromaticity, and the third chromaticity by controlling the relative movement between the plurality of light-emitting units 1 and the optical member 2g and the light emission of the plurality of light-emitting units 1 in the exposure period Ts. Further, the light source device 100g can discretionally change the color of the mixed color light to a color close to the first chromaticity, a color close to the second chromaticity, and a color close to the third chromaticity.

In addition, the light emission control unit 41 of the light source device 100g can control selection of the light-emitting unit 1 to emit light from among the plurality of light-emitting units 1 and control at least one of the drive current and the light emission period of each of the plurality of light-emitting units 1. Thus, as illustrated in FIGS. 41 to 44, the light source device 100g can partially irradiate the irradiated region 200 with a mixed color light 213a based on color-adjusted emission light 210a, 211a, and 212a. The light source device 100g can discretionally change the position that is partially irradiated in the irradiated region 200.

The light source device 100g can emit a combination of the light of three chromaticities, further increasing the flexibility relating to the color adjustment.

Figure 45:
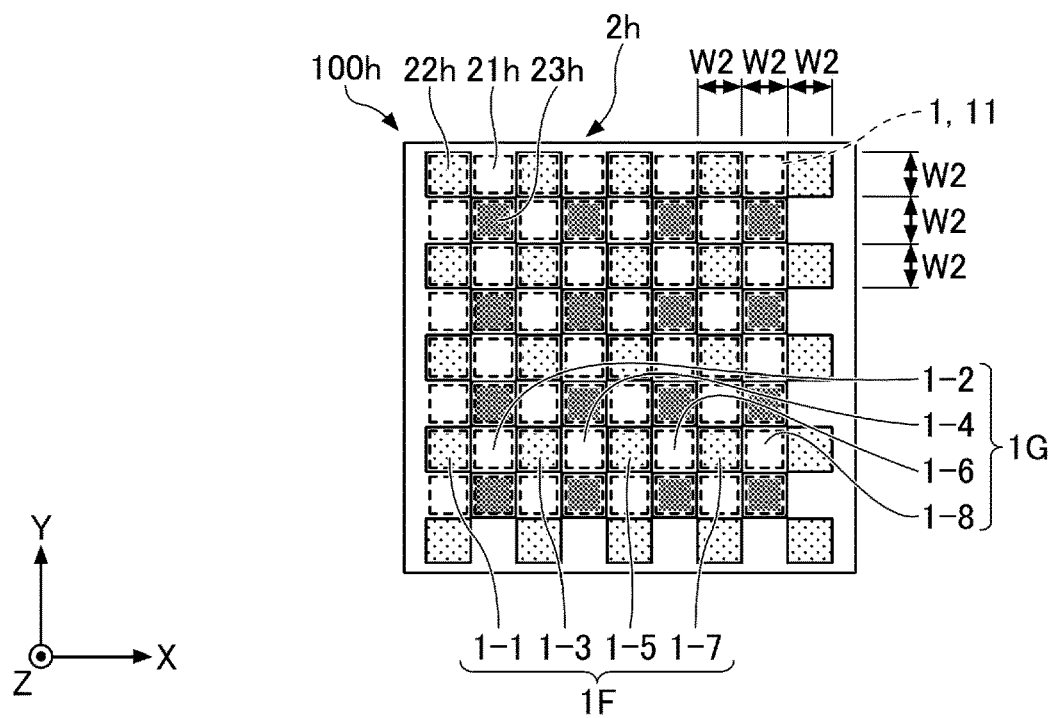
FIG. 45 is a plan view illustrating an example of a configuration of an optical member in a light source device according to a fifth modified example of the second embodiment.

FIG. 45 is a plan view illustrating an example of a configuration of an optical member 2h in a light source device 100h according to a fifth modified example of the second embodiment. The light source device 100h includes 8×8=64 light-emitting units 1. The plurality of light-emitting units 1 and the optical member 2h are subjected to a relative movement to one another in both the X direction and the Y direction by the first movement assembly 3. The first movement control unit 42 can control the relative movement between the optical member 2h and the plurality of light-emitting units 1 in the X direction and the Y direction.

The optical member 2h includes a plurality of first regions 21h from which light of the first chromaticity can be extracted, a plurality of second regions 22h from which light of the second chromaticity can be extracted, and a plurality of third regions 23h from which light of a third chromaticity can be extracted. The plurality of first regions 21h, the plurality of second regions 22h, and the plurality of third regions 23h are alternately arranged in the X direction and the Y direction so as to face the light-emitting surfaces 11.

The configuration of the first region 21h is the same as or similar to that of the first region 21 described above, the configuration of the second region 22h is the same as or similar to that of the second region 22 described above, and the configuration of the third region 23h is the same as or similar to that of the third region 23g described above.

The width of the plurality of first regions 21h in the X direction, the width of the plurality of second regions 22h in the X direction, and the width of the plurality of third regions 23h in the X direction are equal and are all the width W2. The width of the plurality of first regions 21h in the Y direction, the width of the plurality of second regions 22h in the Y direction, and the width of the plurality of third regions 23h in the Y direction are also equal and are all the width W2, equal to the width in the X direction described above. The optical member 2h can be moved in the X direction and the Y direction by the first movement assembly 3.

In a state J before the optical member 2h is moved, from among the plurality of light-emitting units 1, the plurality of light-emitting units 1 included in a sixth light-emitting unit row group 1F including a light-emitting unit row 1-1, a light-emitting unit row 1-3, a light-emitting unit row 1-5, and a light-emitting unit row 1-7, which are rows of the light-emitting units 1 arranged in the Y direction, respectively face the second regions 22h, and the other light-emitting units 1 included in the sixth light-emitting unit row group 1F respectively face the first regions 21h. The one or more of the light-emitting units 1 included in the sixth light-emitting unit row group 1F correspond to the first, third, fifth, and seventh light-emitting units 1 counted from the +Y direction side, and the other light-emitting units 1 included in the sixth light-emitting unit row group 1F correspond to the second, fourth, sixth, and eighth light-emitting units 1 counted from the +Y direction side.

Also, in the state J, from among the plurality of light-emitting units 1, the plurality of light-emitting units 1 included in a seventh light-emitting unit row group 1G including a light-emitting unit row 1-2, a light-emitting unit row 1-4, a light-emitting unit row 1-6, and a light-emitting unit row 1-8 respectively face the first regions 21h, and the other light-emitting units 1 included in the seventh light-emitting unit row group 1G respectively face the third regions 23h. The one or more of the light-emitting units 1 included in the seventh light-emitting unit row group 1G correspond to the first, third, fifth, and seventh light-emitting units 1 counted from the +Y direction side, and the other light-emitting units 1 included in the seventh light-emitting unit row group 1G correspond to the second, fourth, sixth, and eighth light-emitting units 1 counted from the +Y direction side.

On the other hand, in a state K which is a state after the first movement in which the optical member 2h is moved from the state illustrated in FIG. 45 in the –X direction by a distance substantially equal to the width W2, from among the plurality of light-emitting units 1, one or more of the light-emitting units 1 included in the sixth light-emitting unit row group 1F respectively face the first regions 21h, and the other light-emitting units 1 included in the sixth light-emitting unit row group 1F respectively face the third regions 23h. Also, from among the plurality of light-emitting units 1, one or more of light-emitting units 1 included in a seventh light-emitting unit row group 1G respectively face the second regions 22h, and the other light-emitting units 1 included in the seventh light-emitting unit row group 1G respectively face the first regions 21h.

Further, in a state L which is a state after the second movement in which optical member 2h is moved, after the first movement, in the +Y direction by a distance substantially equal to the width W2, from among the plurality of light-emitting units 1, one or more of the light-emitting units 1 included in the sixth light-emitting unit row group 1F respectively face the third regions 23h, and the other light-emitting units 1 included in the sixth light-emitting unit row group 1F respectively face the first regions 21h. Also, from among the plurality of light-emitting units 1, one or more of light-emitting units 1 included in a seventh light-emitting unit row group 1G respectively face the first regions 21h, and the other light-emitting units 1 included in the seventh light-emitting unit row group 1G respectively face the second regions 22h.

Further, in a state M which is a state after the third movement in which the optical member 2h is moved, after the second movement, in the +X direction by a distance substantially equal to the width W2, from among the plurality of light-emitting units 1, one or more of the light-emitting units 1 included in the sixth light-emitting unit row group 1F respectively face the first regions 21h, and the other light-emitting units 1 included in the sixth light-emitting unit row group 1F respectively face the second regions 22h. Also, from among the plurality of light-emitting units 1, one or more of light-emitting units 1 included in a seventh light-emitting unit row group 1G respectively face the third regions 23h, and the other light-emitting units 1 included in the seventh light-emitting unit row group 1G respectively face the first regions 21h.

In this manner, in the present modified example, the first movement assembly 3 can switch between the state J, the state K, the state L, and the state M by moving the optical member 2h a total of three times in the –X direction, the +Y direction, and the +X direction by a distance substantially equal to the width W2.

The state J is a state in which one or more of the light-emitting units 1 included in the sixth light-emitting unit row group 1F of the plurality of light-emitting units 1 are included in the plurality of second regions 22h in a plan view. The state K is a state in which one or more of the light-emitting units 1 included in the sixth light-emitting unit row group 1F of the plurality of light-emitting units 1 are included in the plurality of first regions 21h in a plan view. The state L is a state in which one or more of the light-emitting units 1 included in the sixth light-emitting unit row group 1F of the plurality of light-emitting units 1 are included in the plurality of third regions 23h in a plan view. The state M is a state in which one or more of the light-emitting units 1 included in the sixth light-emitting unit row group 1F of the plurality of light-emitting units 1 are included in the plurality of first regions 21h in a plan view.

The first movement control unit 42 of the control unit 4 performs control to set the state J, the state K, the state L, and the state M within the exposure period Ts. The one or more of the light-emitting units 1 included in the sixth light-emitting unit row group 1F are an example of predetermined light-emitting units.

Figure 48:
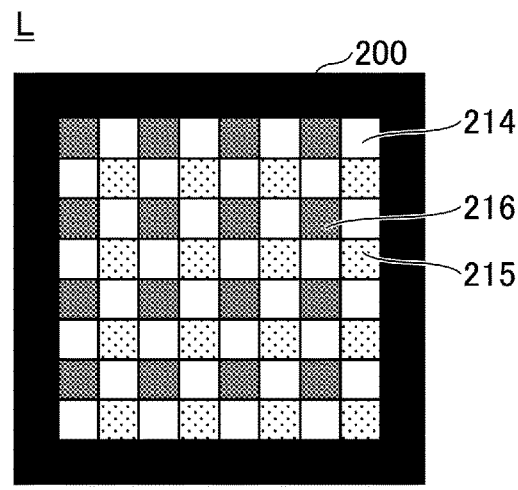
FIG. 48 is a diagram illustrating an example of emission light by the light source device in FIG. 45 in a state L.
Figure 49:
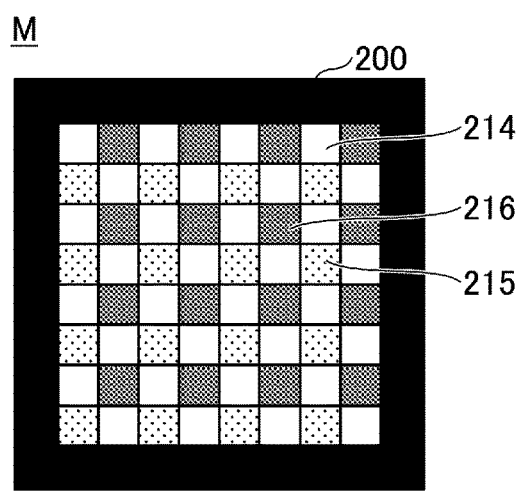
FIG. 49 is a diagram illustrating an example of emission light by the light source device in FIG. 45 in a state M.

FIGS. 46 to 55 are diagrams for describing emission light emitted from the light source device 100h to the irradiated region 200. FIG. 46 is a diagram illustrating an example of emission light when the optical member 2h is in the state J before movement. FIG. 47 is a diagram illustrating an example of emission light when the optical member 2h is in the state K after the first movement. FIG. 48 is a diagram illustrating an example of emission light when the optical member 2h is in the state L after the second movement. FIG. 49 is a diagram illustrating an example of emission light when the optical member 2h is in the state M after the third movement. FIG. 50 is a diagram illustrating an example of mixed color light obtained by mixing the emission lights of FIGS. 46 to 49.

Figure 52:
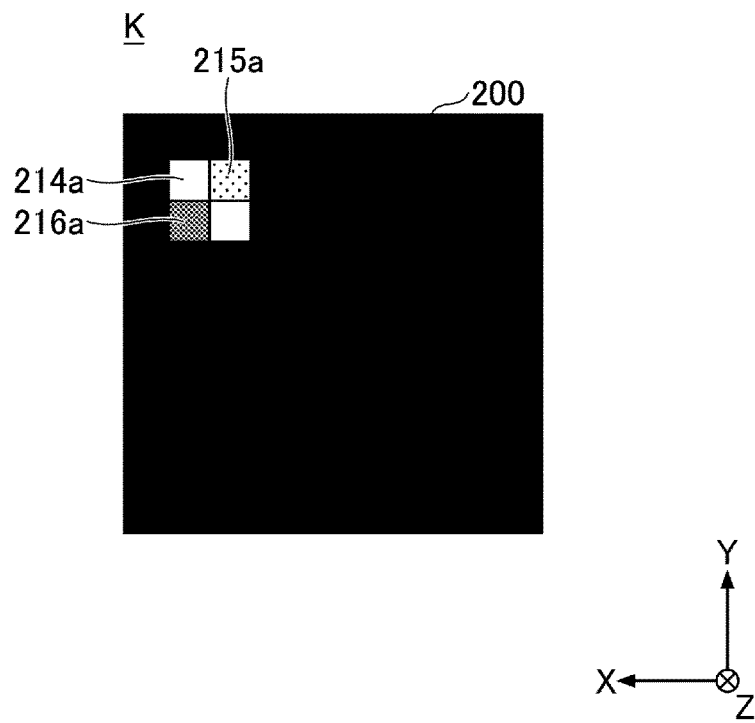
FIG. 52 is a diagram illustrating an example of emission light from one or more light-emitting units of the light source device in FIG. 45 in the state K.
Figure 53:
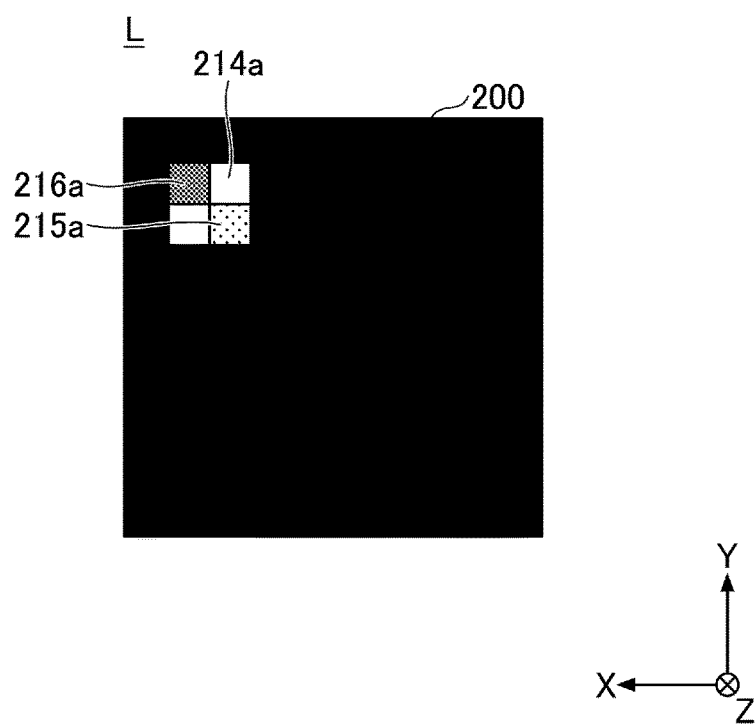
FIG. 53 is a diagram illustrating an example of emission light from one or more light-emitting units of the light source device in FIG. 45 in the state L.
Figure 54:
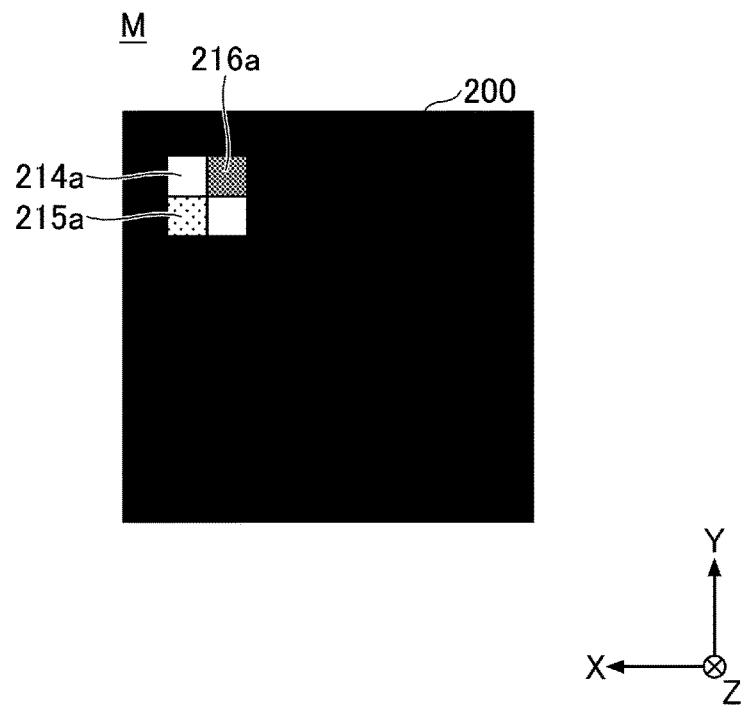
FIG. 54 is a diagram illustrating an example of emission light from one or more light-emitting units of the light source device in FIG. 45 in the state M.
Figure 55:
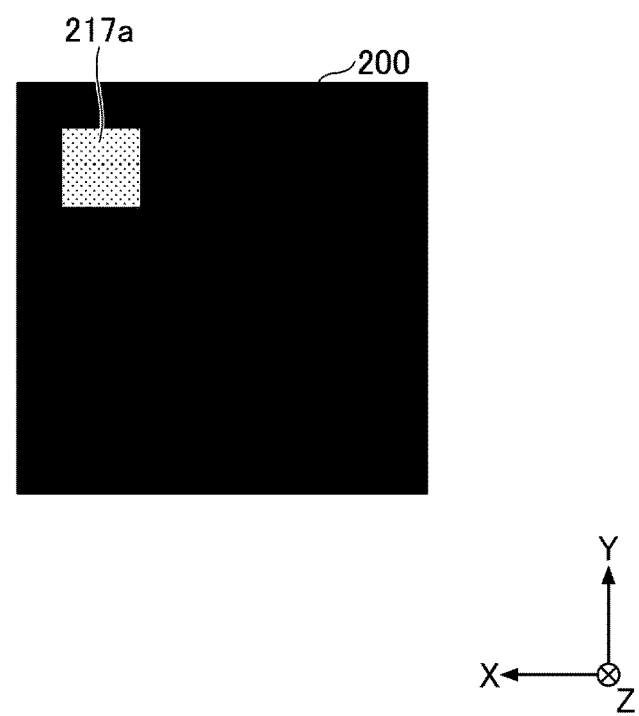
FIG. 55 is a diagram illustrating an example of mixed color light obtained by mixing the emission lights of FIGS. 51 to 54.

FIG. 51 is a diagram illustrating an example of emission light from one or more of the plurality of light-emitting units 1 when the optical member 2h is in the state J before movement. FIG. 52 is a diagram illustrating an example of emission light from one or more of the plurality of light-emitting units 1 in the state K after the first movement of the optical member 2h. FIG. 53 is a diagram illustrating an example of emission light from one or more of the plurality of light-emitting units 1 in the state L after the second movement of the optical member 2h. FIG. 54 is a diagram illustrating an example of emission light from one or more of the plurality of light-emitting units 1 in the state M after the third movement of the optical member 2h. FIG. 55 is a diagram illustrating an example of mixed color light obtained by mixing the emission lights of FIGS. 51 to 54.

In the state J, as illustrated in FIG. 46, the irradiated region 200 is irradiated with emission light 214 of the first chromaticity, emission light 215 of the second chromaticity, and emission light 216 of the third chromaticity.

In the state K, as illustrated in FIG. 47, the irradiated region 200 is irradiated with the emission light 214 of the first chromaticity, the emission light 215 of the second chromaticity, and the emission light 216 of the third chromaticity.

In the state L, as illustrated in FIG. 48, the irradiated region 200 is irradiated with the emission light 214 of the first chromaticity, the emission light 215 of the second chromaticity, and the emission light 216 of the third chromaticity.

In the state M, as illustrated in FIG. 49, the irradiated region 200 is irradiated with the emission light 214 of the first chromaticity, the emission light 215 of the second chromaticity, and the emission light 216 of the third chromaticity.

A mixed color light 217 illustrated in FIG. 50 is light obtained by time-averaging and mixing the lights of the first chromaticity transmitted through the first regions 21h, the light of the second chromaticity wavelength-converted by the second regions 22h, and the light of the third chromaticity wavelength-converted by the third regions 23h, within the exposure period Ts. The color of the mixed color light 217 can be adjusted by adjusting the ratio of the amount of the emission light 214, the amount of the emission light 215, and the amount of the emission light 216 in the exposure period Ts.

The light source device 100h can emit any one of light of the first chromaticity, light of the second chromaticity, light of the third chromaticity, and mixed color light of the first chromaticity, the second chromaticity, and the third chromaticity by controlling the relative movement between the plurality of light-emitting units 1 and the optical member 2h and the light emission of the plurality of light-emitting units 1 in the exposure period Ts. Further, the light source device 100h can discretionally change the color of the mixed color light to a color close to the first chromaticity, a color close to the second chromaticity, and a color close to the third chromaticity.

In addition, the light emission control unit 41 of the light source device 100h can control selection of the light-emitting unit 1 to emit light from among the plurality of light-emitting units 1 and control at least one of the drive current and the light emission period of each of the plurality of light-emitting units 1. Thus, as illustrated in FIGS. 51 to 55, the light source device 100h can partially irradiate the irradiated region 200 with a mixed color light 217a based on color-adjusted emission light 214a, 215a, and 216a. The light source device 100h can discretionally change the position that is partially irradiated in the irradiated region 200.

The light source device 100h can emit a combination of the light of three chromaticities, further increasing the flexibility relating to the color adjustment. In addition, because the light source device 100h uses the optical member 2h, the flexibility relating to the relative movement of the optical member is greater than that in the case in which the optical member moves only in the X direction, and thus the flexibility relating to the color adjustment can be increased. In particular, when performing color adjustment using three or more colors, the light source device 100h can reduce the difference in the relative movement distance for switching the chromaticities, making the color adjustment easier to perform.

Third Embodiment

Figure 56:
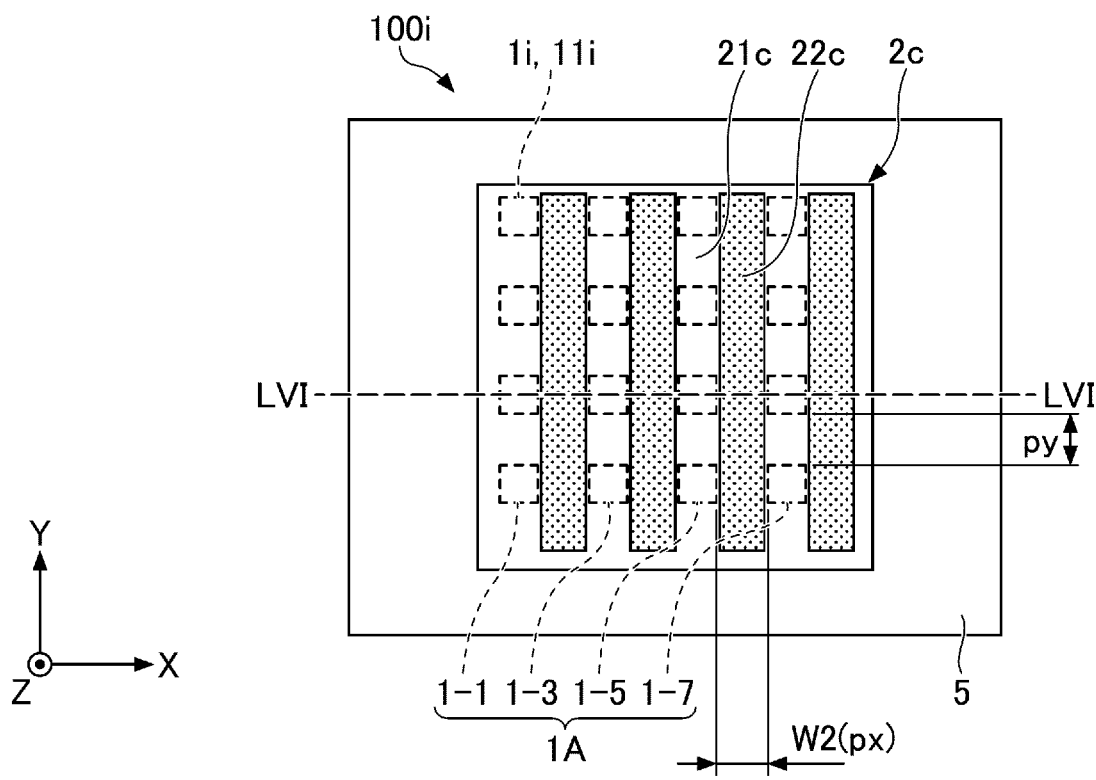
FIG. 56 is a plan view illustrating a configuration example of a light source device according to a third embodiment.
Figure 57:
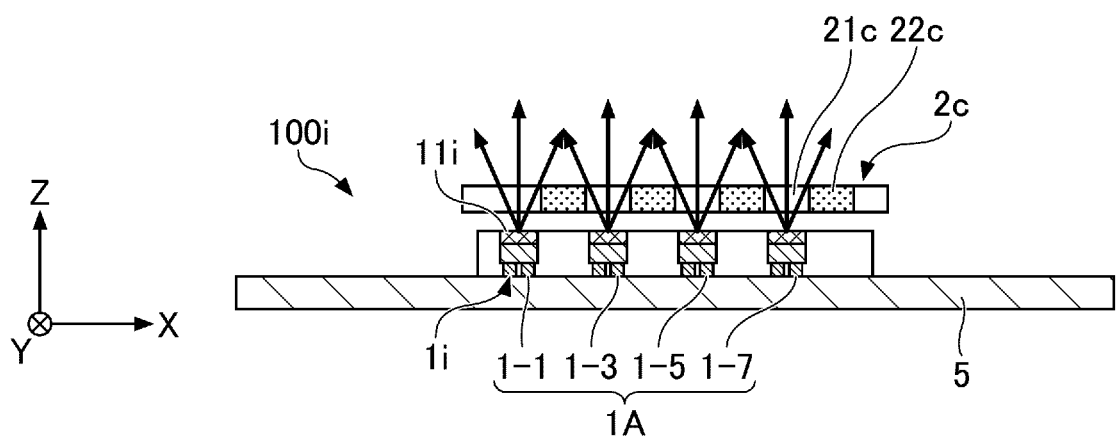
FIG. 57 is a cross-sectional view taken along line LVI-LVI in FIG. 56.
Figure 58:
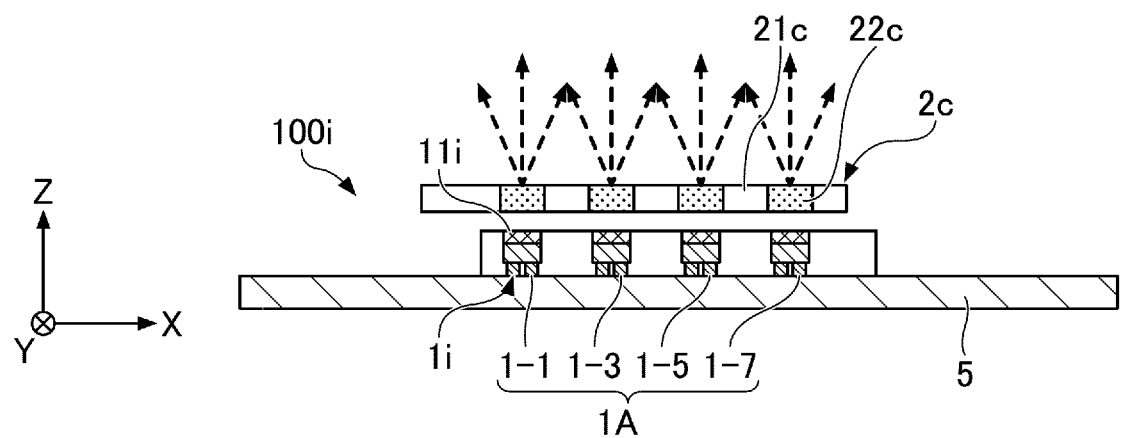
FIG. 58 is a cross-sectional view illustrating the light source device after the optical member is moved from the state illustrated in FIG. 57.

FIG. 56 is a plan view illustrating a configuration example of a light source device 100i according to the third embodiment. FIG. 57 is a cross-sectional view taken along line LVI-LVI in FIG. 56. FIG. 58 is a cross-sectional view illustrating the light source device 100i after an optical member 2c is moved from the state illustrated in FIG. 57.

As illustrated in FIGS. 56 and 57, the light source device 100i includes a plurality of light-emitting units 1i.

Each of the plurality of light-emitting units 1i includes a light-emitting surface 11i. The configuration of the light-emitting unit 1i is the same as that of the above-described light-emitting unit 1.

The plurality of light-emitting units 1i are arranged in the X direction with a first interval px between the light-emitting units 1i adjacent to one another in the X direction. The first interval px is substantially equal to the width W2 of the first regions 21c or the second regions 22c in the X direction. The term "substantially equal" means that a difference of a magnitude that is typically allowed as a tolerance is allowed. A difference of the magnitude that is typically allowed as a tolerance is, for example, a difference of ⅕ or less of the width W2. This also applies to the examples below where the term "substantially equal" is used. The first interval px is preferably in a range from 50 μm to 2000 μm and more preferably in a range from 200 μm to 1000 μm.

The plurality of light-emitting units 1i are arranged in the Y direction with a second interval py between the light-emitting units 1i adjacent to one another in the Y direction. The second interval py is substantially equal to the width of the first regions 21c or the second regions 22c in the Y direction. The second interval py is preferably in a range from 50 μm to 2000 μm and more preferably in a range from 200 μm to 1000 μm. Further, the first interval px and the second interval py preferably have a substantially equal length.

In a state P before the optical member 2c is moved, as illustrated in FIGS. 56 and 57, from among the plurality of light-emitting units 1, the plurality of light-emitting units 1i included in a first light-emitting unit row group 1A including a light-emitting unit row 1-1, a light-emitting unit row 1-3, a light-emitting unit row 1-5, and a light-emitting unit row 1-7, which are rows of the light-emitting units 1i arranged in the Y direction, respectively face the first regions 21c.

On the other hand, in a state Q which is a state after the optical member 2c is moved from the state illustrated in FIG. 57 in the −X direction by a distance substantially equal to the width W2, as illustrated in FIG. 58, from among the plurality of light-emitting units 1i, the plurality of light-emitting units 1i included in the first light-emitting unit row group 1A respectively face the second regions 22c.

In this manner, in the present embodiment, the first movement assembly 3 can switch between the state P and the state Q by moving the optical member 2c to the −X side by a distance substantially equal to the width W2. The state P is a state in which the plurality of light-emitting units 1i included in the first light-emitting unit row group 1A of the plurality of light-emitting units 1 are included in the plurality of first regions 21c in a plan view. The state Q is a state in which the plurality of light-emitting units 1i included in the first light-emitting unit row group 1A of the plurality of light-emitting units 1i are included in the plurality of second regions 22c in a plan view.

The first movement control unit 42 of the control unit 4 performs control to set the state P and the state Q within the exposure period Ts. The plurality of light-emitting units 1i included in the first light-emitting unit row group 1A are an example of predetermined light-emitting units.

Figure 59:
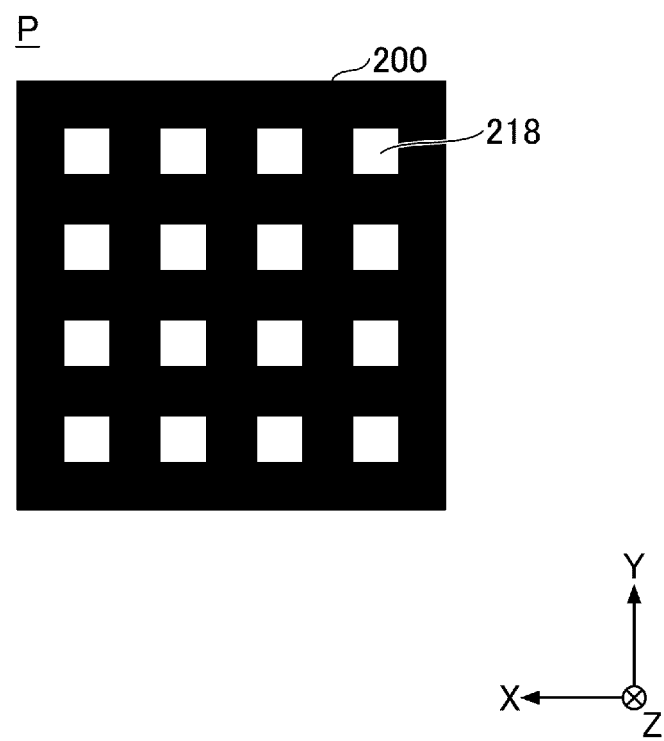
FIG. 59 is a diagram illustrating an example of emission light by the light source device in FIG. 56 in a state P.
Figure 60:
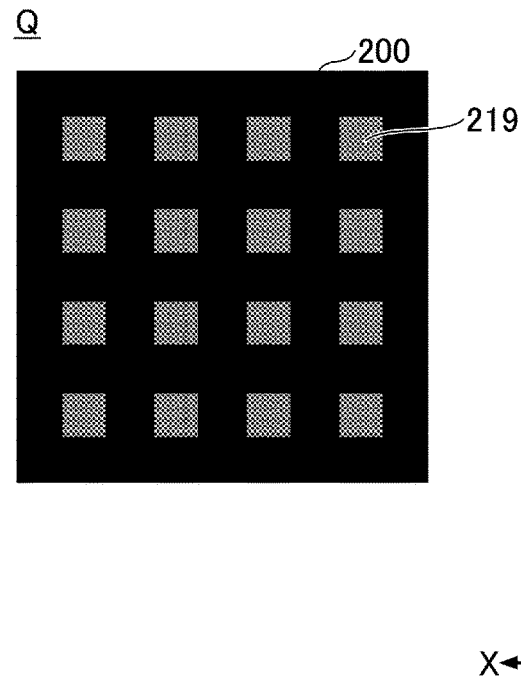
FIG. 60 is a diagram illustrating an example of emission light by the light source device in FIG. 56 in a state Q.
Figure 61:
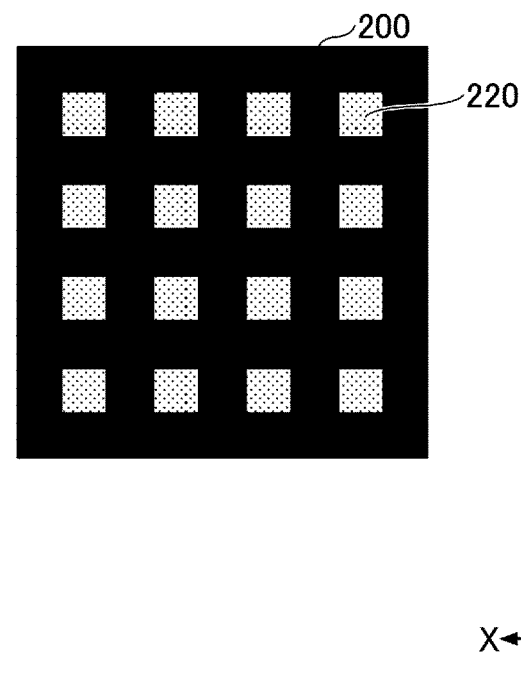
FIG. 61 is a diagram illustrating an example of mixed color light obtained by mixing the emission lights of FIGS. 59 and 60.

FIGS. 59 to 64 are diagrams for describing emission light emitted from the light source device 100i to an irradiated region 200. FIG. 59 is a diagram illustrating an example of emission light by the light source device 100*i* before the optical member 2*c* is moved. FIG. 60 is a diagram illustrating an example of emission light by the light source device 100*i* after the optical member 2*c* is moved. FIG. 61 is a diagram illustrating an example of mixed color light obtained by mixing the emission lights of FIGS. 59 and 60.

Figure 62:
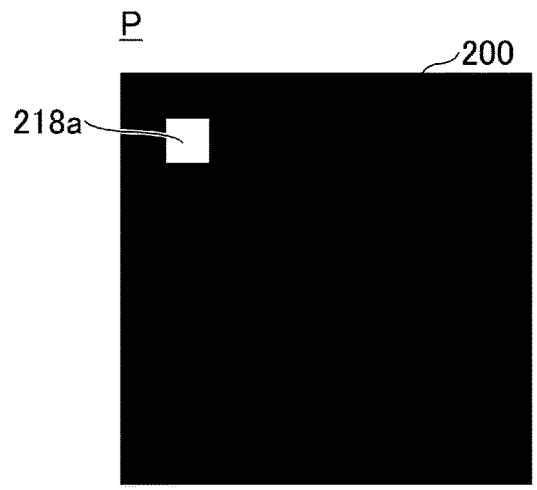
FIG. 62 is a diagram illustrating an example of emission light from one or more light-emitting units of the light source device in FIG. 56 in the state P.
Figure 63:
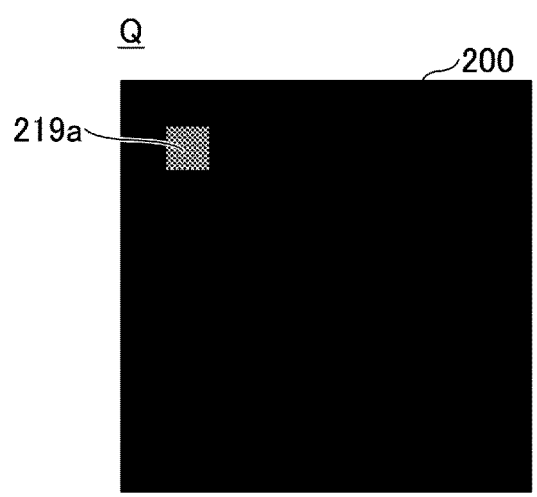
FIG. 63 is a diagram illustrating an example of emission light from one or more light-emitting units of the light source device in FIG. 56 in the state Q.
Figure 64:
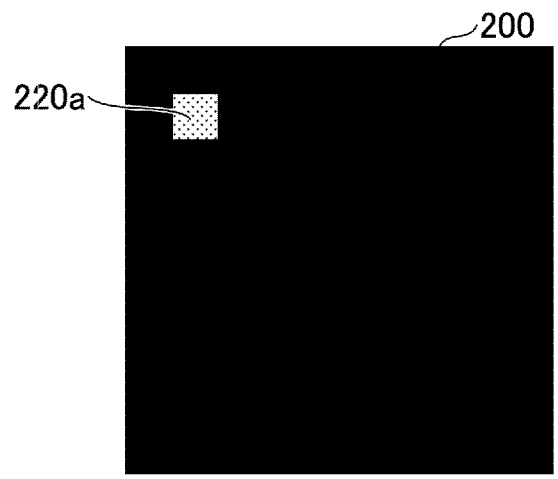
FIG. 64 is a diagram illustrating an example of mixed color light obtained by mixing the emission lights of FIGS. 62 and 63.

FIG. 62 is a diagram illustrating an example of emission light from one or more of the light-emitting units 1*i* in the light source device 100*i* before the optical member 2*c* is moved. FIG. 63 is a diagram illustrating an example of emission light from one or more of the light-emitting units 1*i* in the light source device 100*i* after the optical member 2*c* is moved. FIG. 64 is a diagram illustrating an example of mixed color light obtained by mixing the emission lights of FIGS. 62 and 63.

In the state P, as illustrated in FIG. 59, the irradiated region 200 is irradiated with emission light 218 of the first chromaticity. In the state Q, as illustrated in FIG. 60, the irradiated region 200 is irradiated with emission light 219 of the second chromaticity.

A mixed color light 220 illustrated in FIG. 61 is light obtained by time-averaging and mixing the light of the first chromaticity that has passed through the first regions 21*c* and the light of the second chromaticity that has been wavelength-converted by and transmitted through the second regions 22*c*, within the exposure period Ts. The color of the mixed color light 220 can be adjusted by adjusting the ratio between the amount of the emission light 218 and the amount of the emission light 219 in the exposure period Ts.

In addition, the light emission control unit 41 of the light source device 100*i* can control selection of the light-emitting unit 1*i* to emit light from among the plurality of light-emitting units 1*i* and control at least one of the drive current and the light emission period of each of the plurality of light-emitting units 1*i*. Thus, as illustrated in FIGS. 62 to 64, the light source device 100*i* can partially irradiate the irradiated region 200 with a mixed color light 220*a* based on color-adjusted emission light 218*a* and 219*a*. The light source device 100*i* can discretionally change the position that is partially irradiated in the irradiated region 200.

Effects of Light Source Device 100*i*

As described above, in the present embodiment, the plurality of light-emitting units 1*i* are arranged in the X direction (first direction) with the first interval px between the light-emitting units 1*i* adjacent to one another in the X direction. For example, the first interval px is substantially equal to the width W2 of the first regions 21*c* or the second regions 22*c* in the X direction. With this configuration, because the interval between the plurality of light-emitting units 1*i* can be increased according to the first interval px, the plurality of light-emitting units 1*i* can be easily mounted, and the light source device 100*i* can be easily manufactured.

In addition, in the present embodiment, the plurality of light-emitting units 1*i* are arranged in the X direction with the first interval px between the light-emitting units 1*i* adjacent to one another in the X direction and are arranged in the Y direction (second direction) with the second interval py between the light-emitting units 1*i* adjacent to one another in the Y direction. For example, the first interval px is substantially equal to the width W2 of the first regions 21*c* or the second regions 22*c* in the X direction, and the second interval py is substantially equal to the width W2 of the first regions 21*c* or the second regions 22*c* in the Y direction. With this configuration, because the interval between the plurality of light-emitting units 1*i* can be increased according to the first interval px and the second interval py, the plurality of light-emitting units 1*i* can be easily mounted, and the light source device 100*i* can be easily manufactured.

Modified Example of Third Embodiment

Figure 65:
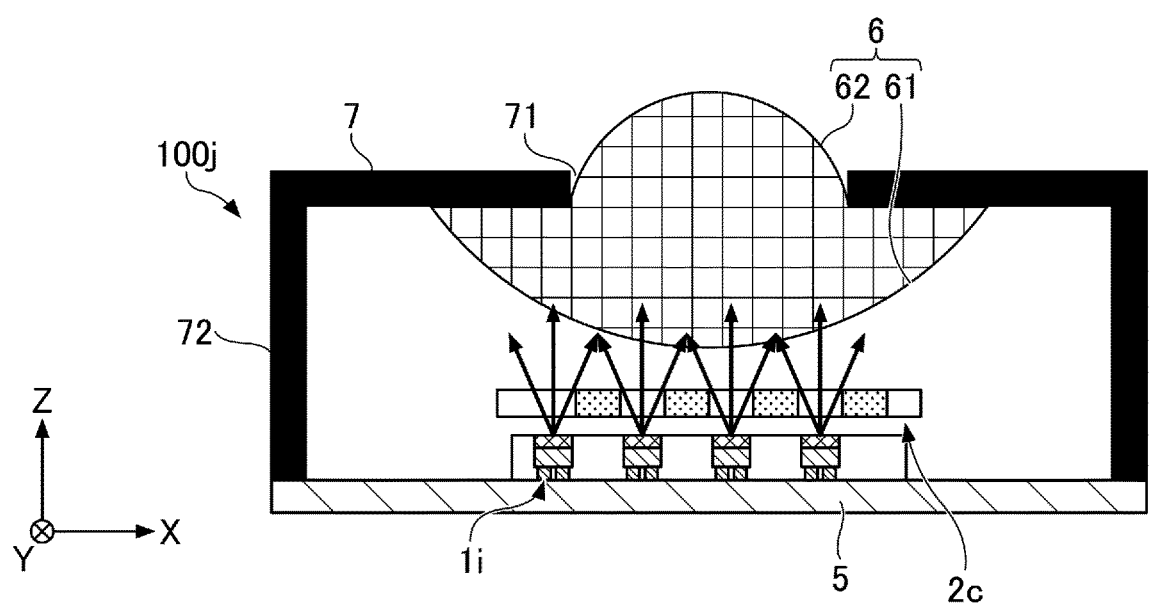
FIG. 65 is a cross-sectional view illustrating a configuration example of a light source device according to a first modified example of the third embodiment.

FIG. 65 is a cross-sectional view illustrating an example of a configuration of a light source device 100*j* according to a first modified example of the third embodiment. The light source device 100*j* includes the first lens 6. The light source device 100*j* is different from the light source device 100*d* only in that the light-emitting units 1*i* are provided, and the light source device 100*j* is similar to the light source device 100*d* in its effects.

Figure 66A:
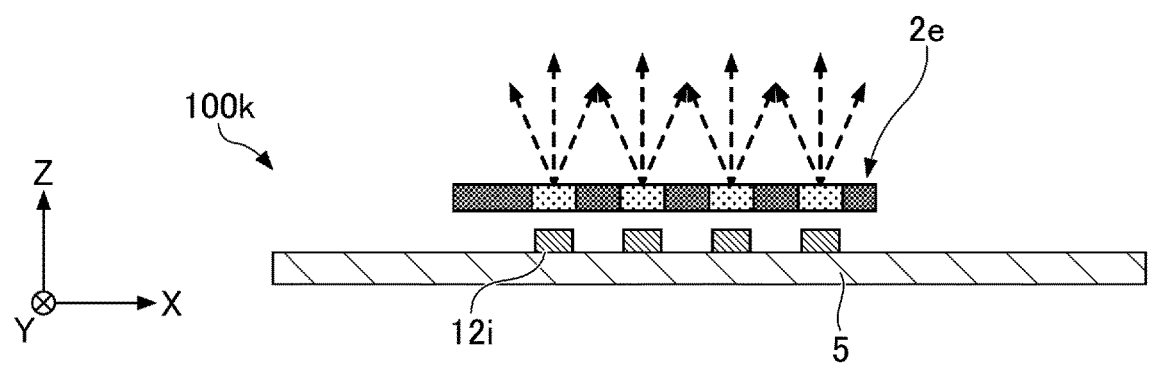
FIG. 66A is a cross-sectional view illustrating a configuration example of a light source device according to a second modified example of the third embodiment.

FIG. 66A is a cross-sectional view illustrating an example of a configuration of a light source device 100*k* according to a second modified example of the third embodiment. The light source device 100*k* includes a plurality of light-emitting elements 12*i*. The light source device 100*k* is different from the light source device 100*e* only in that the plurality of light-emitting elements 12*i* are provided, and the light source device 100*k* is similar to the light source device 100*e* in its effects.

Figure 66B:
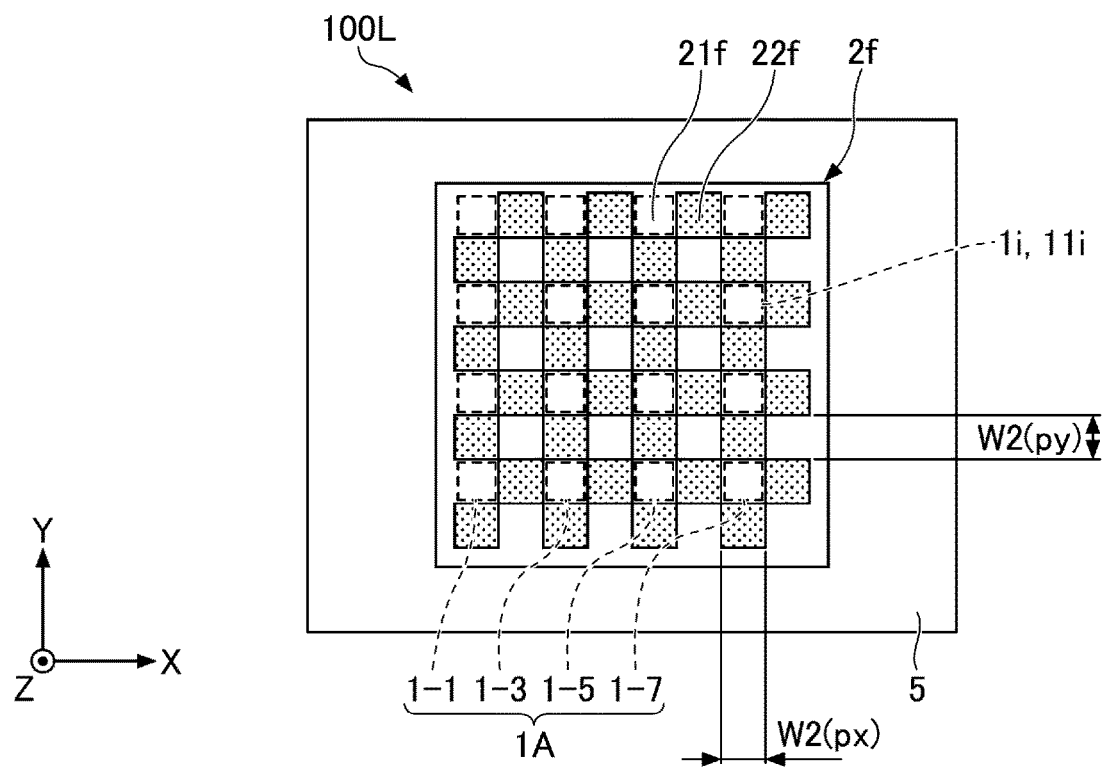
FIG. 66B is a plan view illustrating a configuration example of a light source device according to a third modified example of the third embodiment.

FIG. 66B is a plan view illustrating an example of a configuration of a light source device 100L according to a third modified example of the third embodiment. The light source device 100L includes the optical member 2*f* and the plurality of light-emitting units 1*i*. The optical member 2*f* includes the plurality of first regions 21*f* and the plurality of second regions 22*f*.

The plurality of first regions 21*f* and the plurality of second regions 22*f* are alternately arranged in the X direction and the Y direction so as to face the light-emitting surfaces 11*i*, and the plurality of light-emitting units 1*i* are arranged in the X direction and the Y direction. In the exposure period Ts, the first movement control unit 42 can perform control to set a state in which the plurality of light-emitting units 1 included in the first light-emitting unit row group 1A of the plurality of light-emitting units 1*i* are included in the plurality of first regions 21*f* in a plan view and a state in which the plurality of light-emitting units 1*i* included in the first light-emitting unit row group 1A of the plurality of light-emitting units 1*i* are included in the plurality of second regions 22*f* in a plan view.

In addition, the plurality of light-emitting units 1*i* are arranged in the X direction with the first interval px between the light-emitting units 1*i* adjacent to one another in the X direction and are arranged in the Y direction with the second interval py between the light-emitting units 1*i* adjacent to one another in the Y direction. For example, the first interval px is substantially equal to the width W2 of the first regions 21*f* or the second regions 22*f* in the X direction, and the second interval py is substantially equal to the width W2 of the first regions 21*f* or the second regions 22*f* in the Y direction. With this configuration, because the interval between the plurality of light-emitting units 1*i* can be increased according to the first interval px and the second interval py, the plurality of light-emitting units 1*i* can be easily mounted, and the light source device 100L can be easily manufactured. In the light source device 100L, the plurality of first regions 21*f* or the plurality of second regions 22*f* are alternately arranged in the X direction and the Y direction so as to face the light-emitting surfaces 11*i*. Thus, the relative movement of the optical member 2*f* by the first movement assembly 3 may be in either the X direction or the Y direction, and the relative movement distance can be made shorter than the width W1.

Fourth Embodiment

Figure 67:
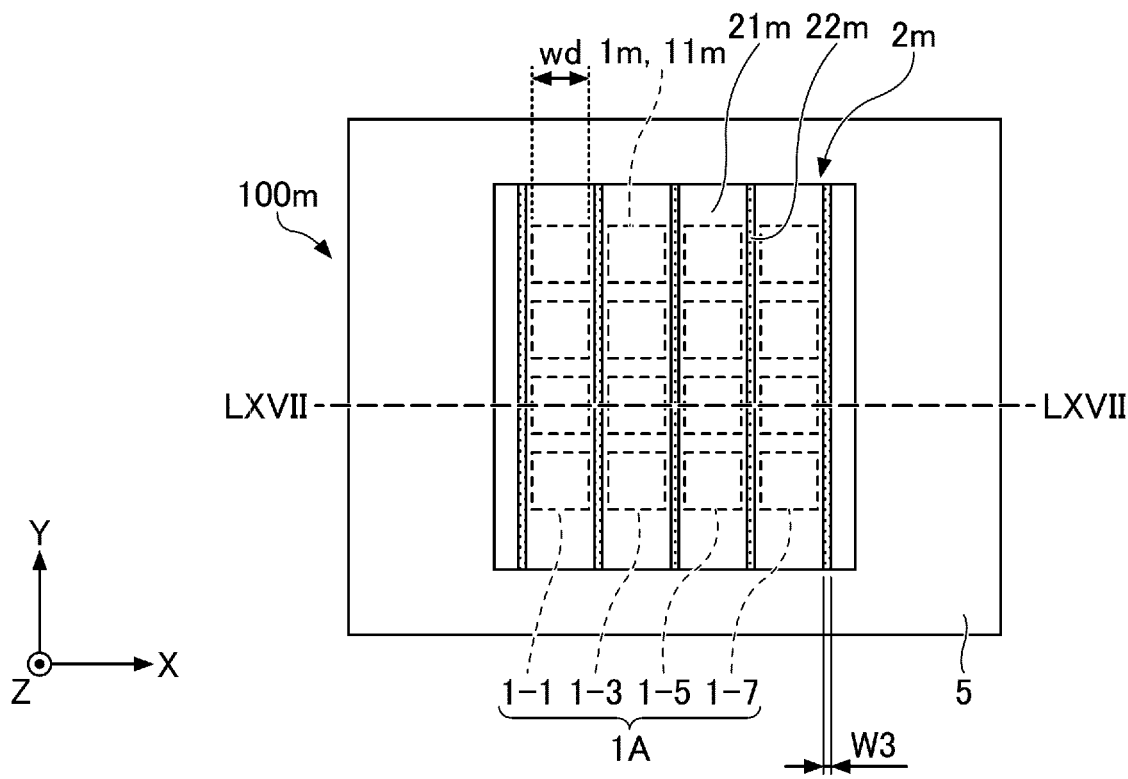
FIG. 67 is a plan view illustrating a configuration example of a light source device according to a fourth embodiment.
Figure 68:
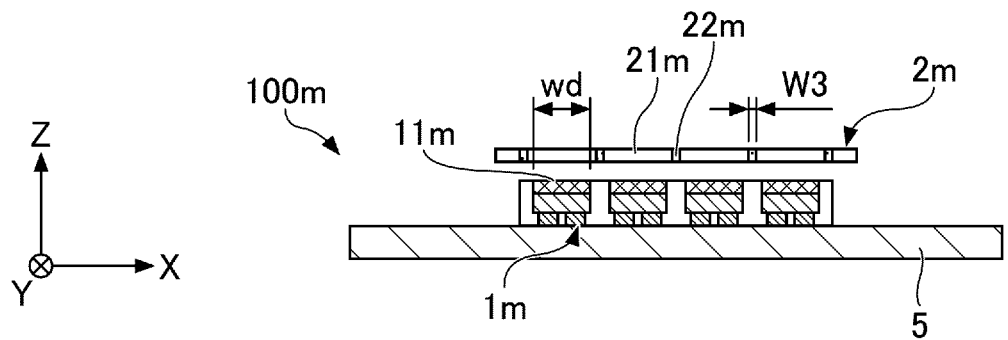
FIG. 68 is a schematic cross-sectional view taken along line LXVII-LXVII in FIG. 67.

FIG. 67 is a plan view illustrating a configuration example of a light source device 100m according to the fourth embodiment. FIG. 68 is a schematic cross-sectional view taken along line LXVII-LXVII in FIG. 67. The light source device 100m includes a plurality of light-emitting units 1m and an optical member 2m.

Each of the plurality of light-emitting units 1m includes a light-emitting surface 11m. The configuration of the light-emitting unit 1m is the same as that of the above-described light-emitting unit 1. A width wd of the light-emitting surface 11m in the X direction is greater than a width W3 of the second region 22m in the X direction.

The optical member 2m includes a first region 21m and a second region 22m. The four first regions 21m face a light-emitting unit row 1-1, a light-emitting unit row 1-3, a light-emitting unit row 1-5, and a light-emitting unit row 1-7, which are rows of the light-emitting units 1m arranged in the Y direction of the plurality of light-emitting units 1m. The five second regions 22m are disposed on either side of the light-emitting unit row 1-1, the light-emitting unit row 1-3, the light-emitting unit row 1-5, and the light-emitting unit row 1-7. The configuration of the first region 21m is similar to that of the first region 21 described above, and the configuration of the second region 22m is similar to that of the second region 22 described above. The optical member 2m can be moved in the X direction by the first movement assembly 3.

Figure 69:
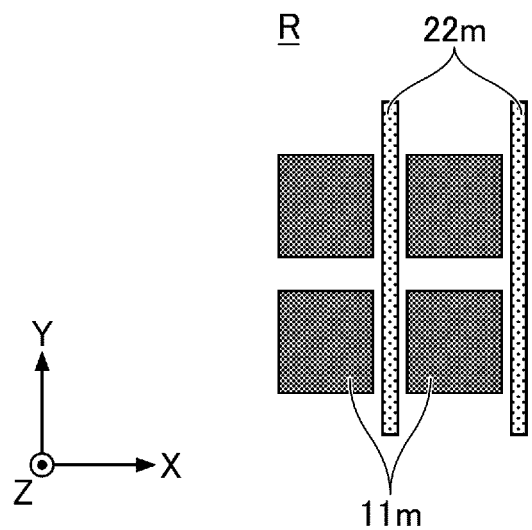
FIG. 69 is a plan view illustrating a part of the light source device of FIG. 67 in a state R.
Figure 70:
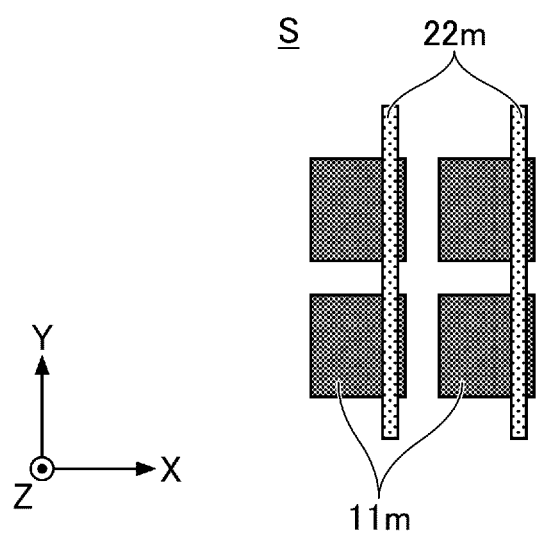
FIG. 70 is a plan view illustrating a part of the light source device of FIG. 67 in a state S.
Figure 71:
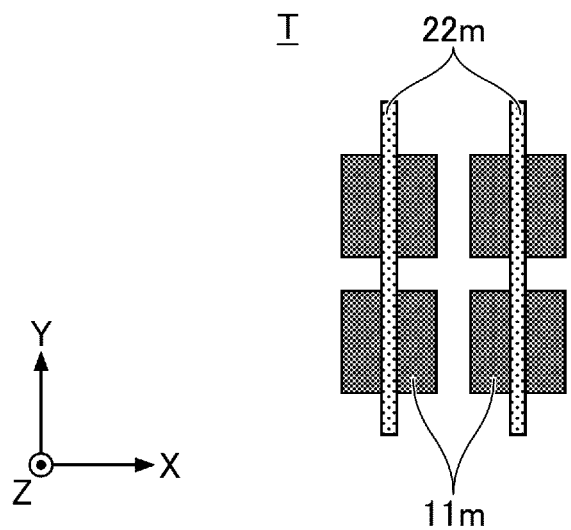
FIG. 71 is a plan view illustrating a part of the light source device of FIG. 67 in a state T.
Figure 72:
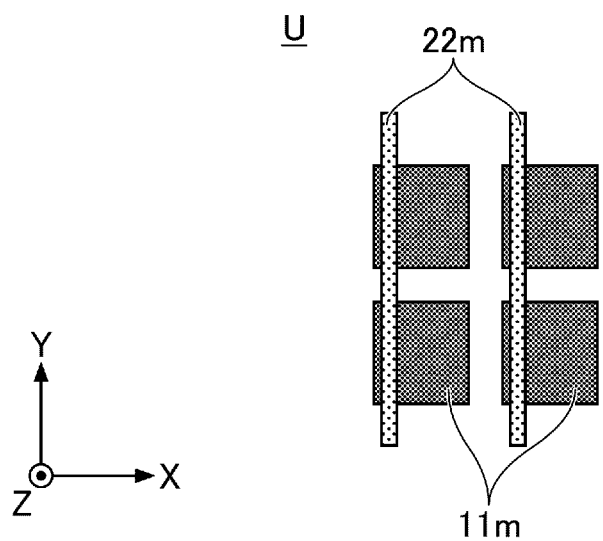
FIG. 72 is a plan view illustrating a part of the light source device of FIG. 67 in a state U.
Figure 73:
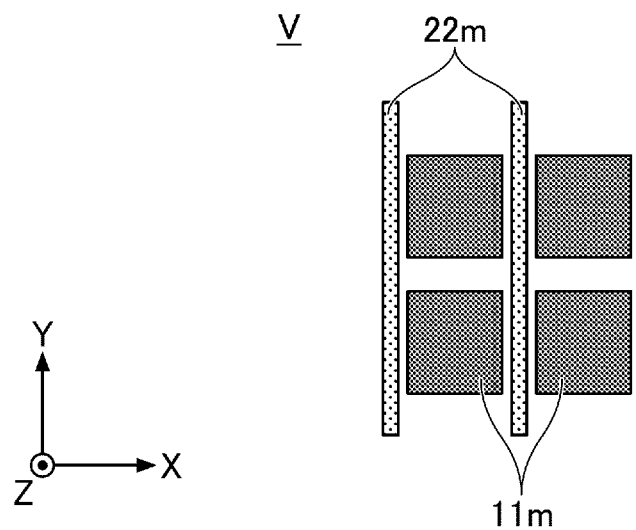
FIG. 73 is a plan view illustrating a part of the light source device of FIG. 67 in a state V.

FIGS. 69 to 73 are diagrams for describing the movement of the optical member 2m in the light source device 100m by the first movement assembly 3. FIG. 69 is a plan view illustrating a part of the light source device of FIG. 67 in a state R. FIG. 70 is a plan view illustrating a part of the light source device of FIG. 67 in a state S. FIG. 71 is a plan view illustrating a part of the light source device of FIG. 67 in a state T. FIG. 72 is a plan view illustrating a part of the light source device of FIG. 67 in a state U. FIG. 73 is a plan view illustrating a part of the light source device of FIG. 67 in a state V.

FIGS. 69 to 73 illustrate the positional relationship between the light-emitting surfaces 11m and the second regions 22m due to the movement of the optical member 2m. FIGS. 69 to 73 illustrate the second regions 22m moving from the +X side to the −X side in the exposure period Ts as seen from the +Z side of the light-emitting surfaces 11m.

Figure 74:
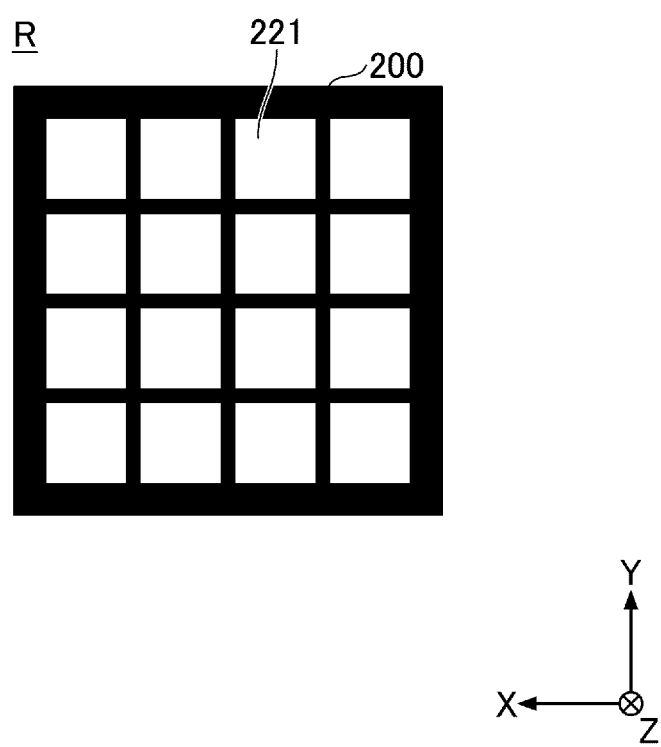
FIG. 74 is a diagram illustrating an example of emission light by the light source device in FIG. 67 in a state R.
Figure 75:
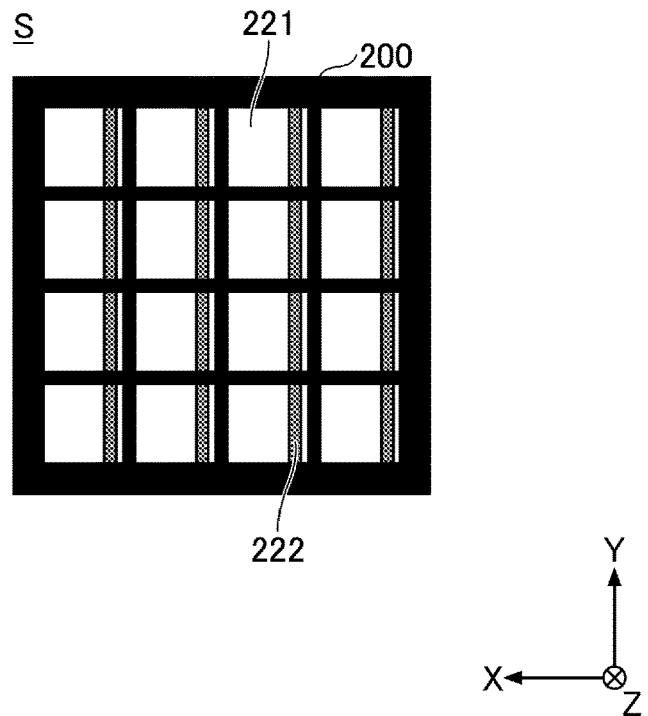
FIG. 75 is a diagram illustrating an example of emission light by the light source device in FIG. 67 in a state S.
Figure 76:
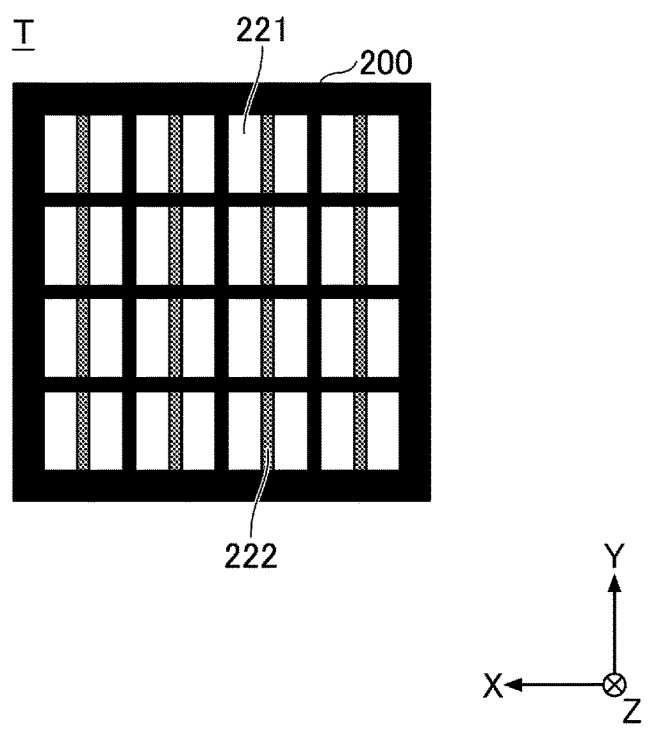
FIG. 76 is a diagram illustrating an example of emission light by the light source device in FIG. 67 in a state T.
Figure 77:
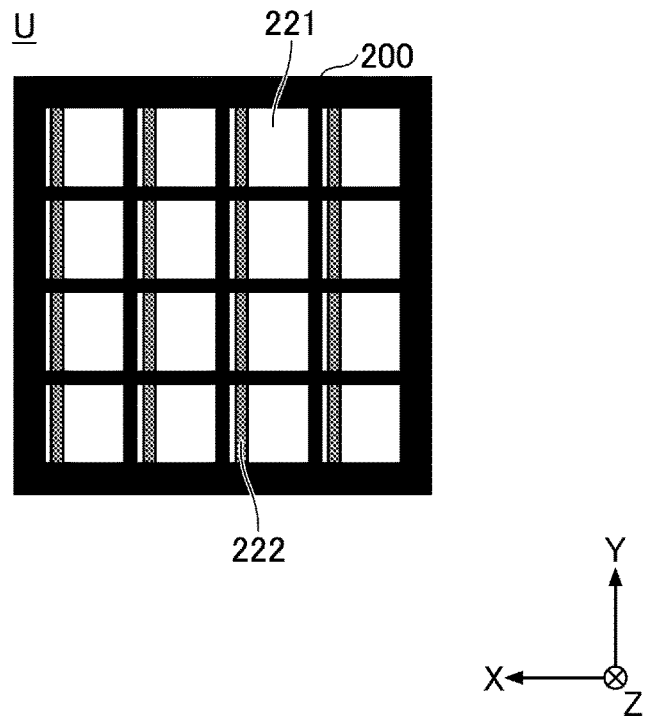
FIG. 77 is a diagram illustrating an example of emission light by the light source device in FIG. 67 in a state U.
Figure 78:
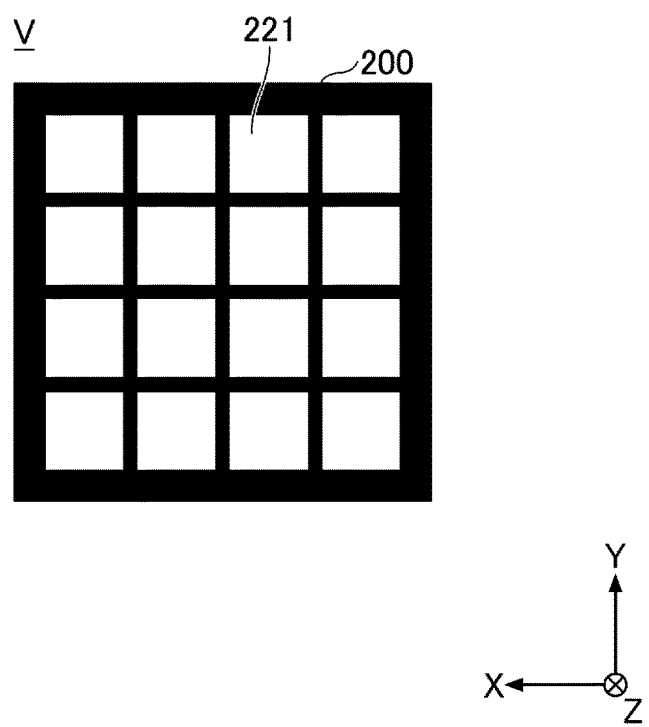
FIG. 78 is a diagram illustrating an example of emission light by the light source device in FIG. 67 in a state V.

FIGS. 74 to 85 are diagrams for describing emission light emitted from the light source device 100m to the irradiated region 200. FIG. 74 is a diagram illustrating an example of emission light by the light source device 100m in the state R. FIG. 75 is a diagram illustrating an example of emission light by the light source device 100m in the state S. FIG. 76 is a diagram illustrating an example of emission light by the light source device 100m in the state T. FIG. 77 is a diagram illustrating an example of emission light by the light source device 100m in the state U. FIG. 78 is a diagram illustrating an example of emission light by the light source device 100m in the state V. FIG. 79 is a diagram illustrating an example of mixed color light obtained by mixing the emission lights of FIGS. 74 to 78.

Figure 81:
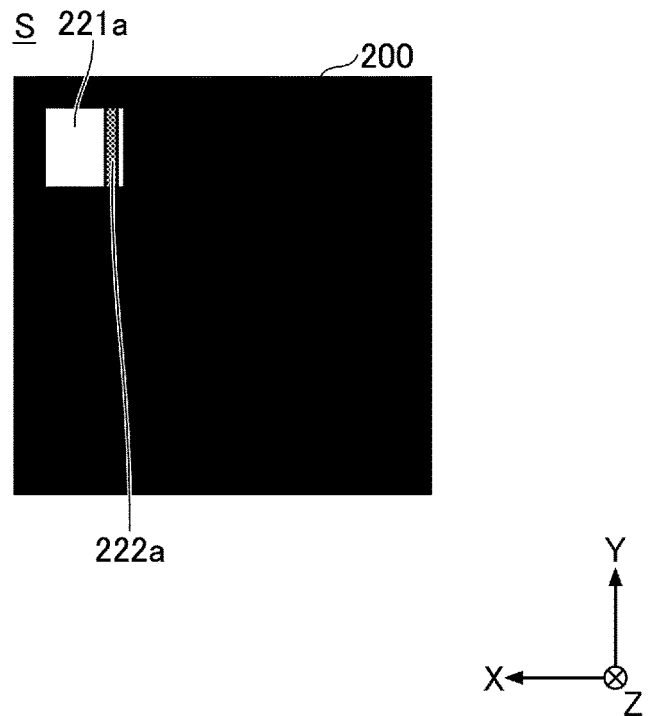
FIG. 81 is a diagram illustrating an example of emission light from one or more light-emitting units of the light source device in FIG. 67 in the state S.
Figure 82:
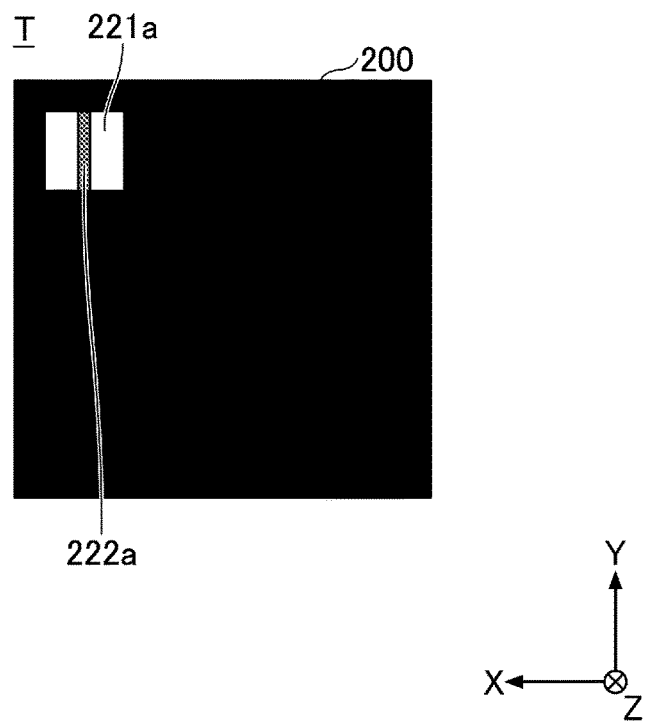
FIG. 82 is a diagram illustrating an example of emission light from one or more light-emitting units of the light source device in FIG. 67 in the state T.
Figure 85:
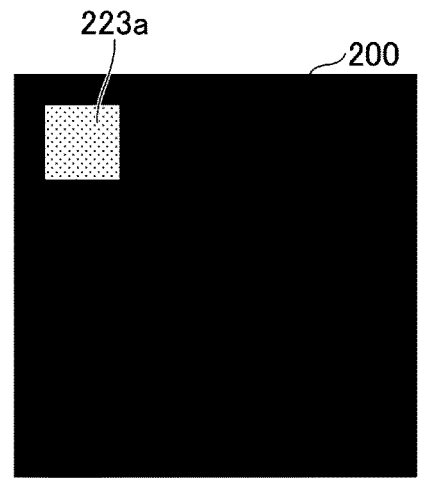
FIG. 85 is a diagram illustrating an example of mixed color light obtained by mixing the emission lights of FIGS. 80 to 84.

FIG. 80 is a diagram illustrating an example of emission light from one or more of the light-emitting units 1m of the light source device 100m in the state R. FIG. 81 is a diagram illustrating an example of emission light from one or more of the light-emitting units 1m of the light source device 100m in the state S. FIG. 82 is a diagram illustrating an example of emission light from one or more of the light-emitting units 1m of the light source device 100m in the state T. FIG. 83 is a diagram illustrating an example of emission light from one or more of the light-emitting units 1m of the light source device 100m in the state U. FIG. 84 is a diagram illustrating an example of emission light from one or more of the light-emitting units 1m of the light source device 100m in the state V. FIG. 85 is a diagram illustrating an example of mixed color light obtained by mixing the emission lights of FIGS. 80 to 84.

In the state R, as illustrated in FIG. 74, the irradiated region 200 is irradiated with emission light 221 of the first chromaticity. In the state R, because the second regions 22m are located between the light-emitting surfaces 11m, the irradiated region 200 is not irradiated with the emission light 221 of the second chromaticity.

In the state S, as illustrated in FIG. 75, the irradiated region 200 is irradiated with the emission light 221 of the first chromaticity and an emission light 222 of the second chromaticity. In the state T, as illustrated in FIG. 76, the irradiated region 200 is irradiated with the emission light 221 of the first chromaticity and the emission light 222 of the second chromaticity. In the state U, as illustrated in FIG. 77, the irradiated region 200 is irradiated with the emission light 221 of the first chromaticity and the emission light 222 of the second chromaticity.

From the state S to the state U, as the second regions 22m move from the +X side toward the −X side, the emission light 222 of the second chromaticity is included in the emission light 221 of the first chromaticity, and the position of the emission light 222 of the second chromaticity changes according to the transition of the state.

In the state V, as illustrated in FIG. 78, the irradiated region 200 is irradiated with emission light 221 of the first chromaticity. In the state V, because the second regions 22m are located between the light-emitting surfaces 11m after movement to the −X side, the irradiated region 200 is not irradiated with the emission light 221 of the second chromaticity.

A mixed color light 223 illustrated in FIG. 79 is light obtained by time-averaging and mixing the lights of the first chromaticity transmitted through the first regions 21m and the light of the second chromaticity wavelength-converted by the second regions 22m, within the exposure period Ts. The color of the mixed color light 223 can be adjusted by adjusting the ratio between the amount of the emission light 221 and the amount of the emission light 222 in the exposure period Ts.

In addition, the light emission control unit 41 of the light source device 100m can control selection of the light-emitting unit 1m to emit light from among the plurality of light-emitting units 1m and control the light emission period of each of the plurality of light-emitting units 1m. Thus, as illustrated in FIGS. 80 to 85, the light source device 100m can partially irradiate the irradiated region 200 with a mixed color light 223a based on emission light 221a and emission light 222a. The light source device 100m can discretionally change the position that is partially irradiated in the irradiated region 200.

Effects of Light Source Device 100m

As described above, in the present embodiment, the width wd of the light-emitting surface 11m in the X direction is greater than the width W3 of the second region 22m in the X direction. In the light source device 100m, the first movement mechanism 3 moves the optical member 2m in the X direction at a predetermined speed while maintaining the light-emitting units 1m to emit light during the exposure period Ts.

In the exposure period Ts, the light of the first chromaticity and the light of the second chromaticity are time-averaged and mixed. As a result, the light source device 100m can irradiate the irradiated region 200 with light color-adjusted to a predetermined color. Compared with the light source device 100i described in the third embodiment, the light source device 100m can reduce the interval between the light-emitting units 1m and increase the light-emitting surfaces 11m.

Also, the light source device 100m can also adjust the color of the mixed color light 223 by selecting the width W3 of the second regions 22m or the movement speed of the optical member 2m, or by adjusting the light emission period of the light-emitting units 1m in the state R before the optical member 2m is moved or in the state V after the optical member is moved. Thus, flexibility relating to color adjustment can be increased. In the present embodiment, a configuration in which the width wd of the light-emitting surfaces 11m is greater than the width W3 of the second regions 22m is used as an example, but the width wd of the light-emitting surfaces 11m may be greater than the width of the first regions 21m.

Modified Example of Fourth Embodiment

Figure 86:
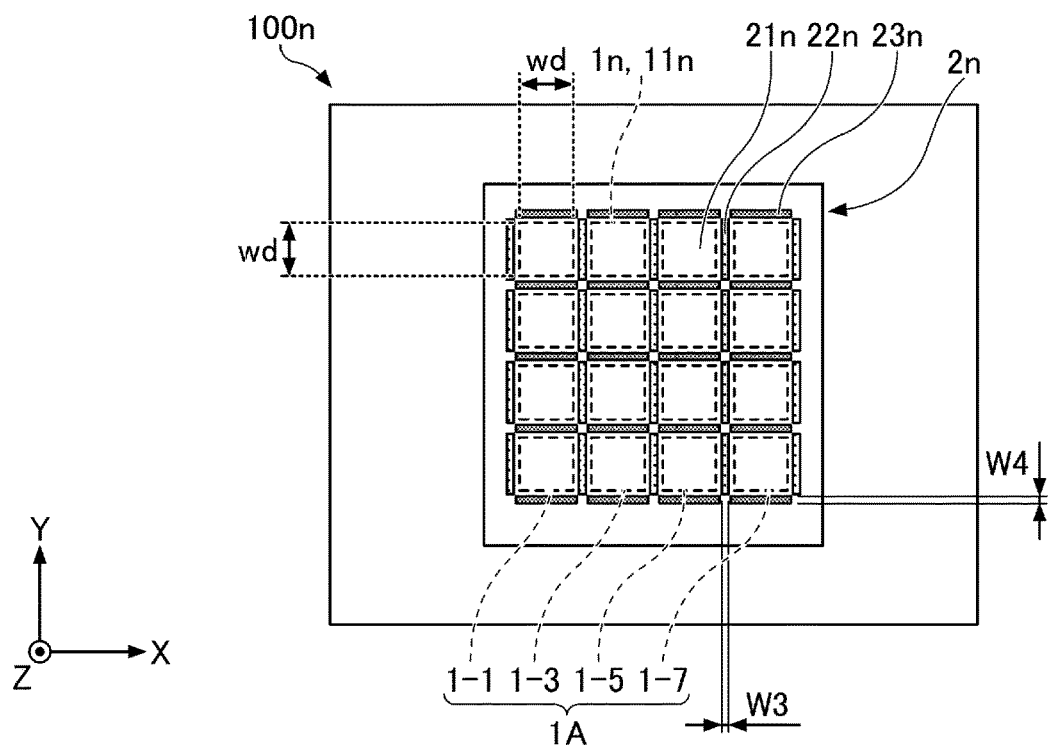
FIG. 86 is a plan view illustrating a configuration example of a light source device according to a modified example of the fourth embodiment.

FIG. 86 is a plan view illustrating an example of a configuration of a light source device 100n according to a modified example of the fourth embodiment. The light source device 100n includes a plurality of light-emitting units 1n and an optical member 2n.

Each of the plurality of light-emitting units 1n includes a light-emitting surface 11n. The configuration of the light-emitting unit 1n is the same as or similar to that of the above-described light-emitting unit 1.

The optical member 2n includes a plurality of first regions 21n from which light of the first chromaticity can be extracted, a plurality of second regions 22n from which light of the second chromaticity can be extracted, and a plurality of third regions 23n from which light of a third chromaticity can be extracted. The plurality of second regions 22n each have a substantially rectangular shape and are arranged with the short sides aligned in the X direction and the long sides aligned in the Y direction. The plurality of third regions 23n each have a substantially rectangular shape and are arranged with the long sides aligned in the X direction and the short sides aligned in the Y direction. One first region 21n faces one light-emitting surface 11n, is interposed between two second regions 22n in the X direction, and is interposed between two third regions 23n in the Y direction. In other words, one first region 21n has a substantially square shape surrounded by two second regions 22n and two third regions 23n.

The width wd of the light-emitting surface 11n in the X direction is greater than the width W3 of the second region 22n in the X direction, and the width wd of the light-emitting surface 11n in the Y direction is greater than a width W4 of the third region 23n in the Y direction. The configuration of the first region 21n is the same as or similar to that of the first region 21 described above, the configuration of the second region 22n is the same as or similar to that of the second region 22 described above, and the configuration of the third region 23n is the same as or similar to that of the third region 23g described above.

The optical member 2m can be moved in both the X direction and the Y direction by the first movement assembly 3 and the like. By moving the optical member 2m in the X direction, the light source device 100n can irradiate the irradiated region 200 with mixed light of the first chromaticity and the second chromaticity, and by moving the optical member 2m in the Y direction, the light source device 100n can irradiate the irradiated region 200 with mixed light including the first chromaticity and the third chromaticity.

Compared with the light source device 100i described in the third embodiment, the light source device 100n can reduce the interval between the light-emitting units 1n and increase the light-emitting surfaces 11n. In addition, color can be mixed using three types of chromaticity, namely the first chromaticity, the second chromaticity, and the third chromaticity, it is possible to further improve the flexibility relating to color adjustment.

The width wd of the light-emitting surface 11n in the X direction may be greater than the width of the first region 21n or the second region 22n in the X direction, and the width wd of the light-emitting surface 11n in the Y direction may be greater than the width W of the first region 21n or the third region 23n in the Y direction.

Fifth Embodiment

Figure 87:
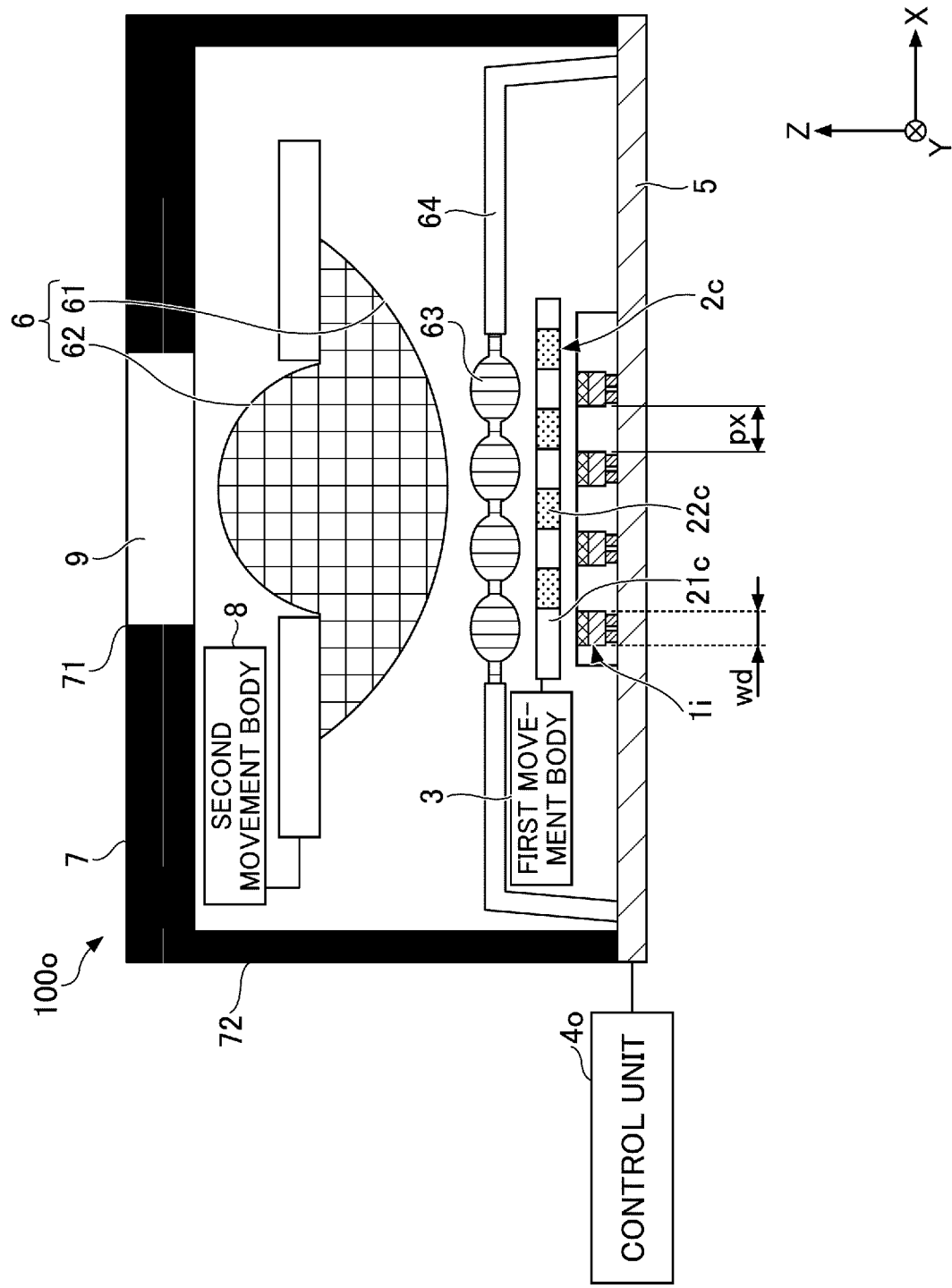
FIG. 87 is a cross-sectional view illustrating a configuration example of a light source device according to a fifth embodiment.

FIG. 87 is a cross-sectional view illustrating a configuration example of a light source device 100o according to the fifth embodiment. The light source device 100o includes the plurality of light-emitting units 1i, the optical member 2c, the first lens 6, the first movement assembly 3, a second movement assembly 8, and a control unit 4o.

Each of the plurality of light-emitting units 1i includes the light-emitting surface 11i. The plurality of light-emitting units 1i are arranged in the X direction with the first interval px between the light-emitting surfaces 11i adjacent to one another in the X direction.

In the present embodiment, the light source device 100o may further include a second lens 63 and a second lens holding portion 64. The second lens 63 focuses the light passing through the optical member 2c toward the first lens 6. The second lens holding portion 64 supports the second lens 63.

The second movement assembly 8 causes a relative movement between the plurality of light-emitting units 1i and the first lens 6 in the X direction so that the light-emitting surfaces 11i and the first lens 6 face one another. The configuration of the second movement assembly 8 is the same as or similar to that of the above-described first movement assembly 3 except for that the object to be moved is different.

A transparent portion 9 is disposed in the opening 71 of the housing 7. The transparent portion 9 overlaps the plurality of light-emitting units 1i and the optical member 2 in a plan view. The transparent portion 9 is a substantially circular plate-like member in a plan view and includes a resin material or a glass material that is light transmissive to at least the light emitted by the light-emitting units 1i. The transparent portion 9 is disposed on the +Z side of the first lens 6 and is supported in a state of being fitted into the opening 71 of the housing 7.

The transparent portion 9 transmits light that has been emitted from the first lens 6. After being emitted from the first lens 6, the light transmitted through the transparent portion 9 corresponds to light emitted by the light source device 100o. The transparent portion 9 may be adhered to the housing 7 by an adhesive member or the like.

Figure 88:
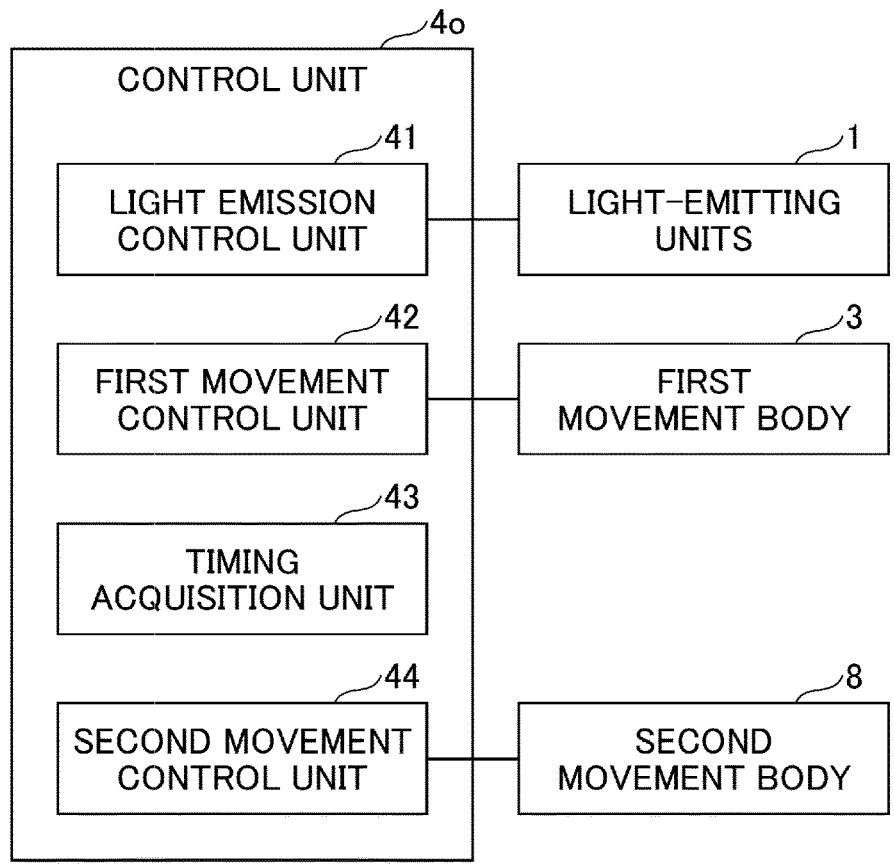
FIG. 88 is a block diagram illustrating an example of the functional configuration of a control unit in the light source device in FIG. 87.

FIG. 88 is a block diagram illustrating an example of the functional configuration of the control unit 4o included in the light source device 100o. The control unit 4o includes a second movement control unit 44 that controls the operation of the second movement assembly 8. The second movement control unit 44 performs control of the relative movement between the plurality of light-emitting units 1$i$ and the first lens 6 in the X direction within the exposure period Ts.

The distance of the relative movement between the plurality of light-emitting units 1$i$ and the first lens 6 in the X direction is equal to or greater than the shorter one from among the first interval px or the width wd of the light-emitting surfaces 11$i$ in the X direction.

Because light is not emitted from a region where the light-emitting unit 1$i$ is not provided (in other words, a region corresponding to the first interval px), in the irradiated region 200, a dark portion which is a low illuminance region is produced between the emission lights of the light-emitting units 1$i$ adjacent to one another. By causing the second movement assembly 8 to the relative movement between the first lens 6 and the plurality of light-emitting units 1$i$ within the exposure period Ts, the light source device 100$o$ can obtain a combined light in which the illuminance of the region corresponding to the first interval px is compensated in the irradiated region 200. That is, it can be said that the light source device 100$o$ can artificially increase the number of light-emitting units 1$i$ in the light emission within the exposure period Ts. Accordingly, because it is possible to reduce the low illuminance region in the emission light according to the first interval px, it is possible to reduce illuminance unevenness due to the light source device 100$o$. In addition, it is possible to provide the light source device 100$o$ that can control the region to be partially irradiated with the color-adjusted light in the irradiated region 200. Further, because the number of divisions of the irradiated region 200 can be increased, natural partial emission light can be obtained.

Further, the light source device 100$o$ can be modified to the following configuration. That is, the second movement assembly 8 can cause the relative movement between the plurality of light-emitting units 1$i$ and the first lens 6 in the X direction and the Y direction so that the light-emitting surfaces 11$i$ and the first lens 6 face one another other. The plurality of light-emitting units 1$i$ are arranged in the X direction with the first interval px between the light-emitting surfaces 11$i$ adjacent to one another in the X direction and are arranged in the Y direction with the second interval py between the light-emitting units 1$i$ adjacent to one another in the Y direction. The second movement control unit 44 performs control of the relative movement between the plurality of light-emitting units 1$i$ and the first lens 6 in the X direction and the Y direction within the exposure period Ts.

The distance of the relative movement between the plurality of light-emitting units 1$i$ and the first lens 6 in the X direction is equal to or greater than the shorter one from among the first interval px or the width wd of the light-emitting surfaces 11$i$ in the X direction. The distance of the relative movement between the plurality of light-emitting units 1$i$ and the first lens 6 in the Y direction is equal to or greater than the shorter one from among the second interval py or the width wd of the light-emitting surfaces 11$i$ in the Y direction.

With this configuration, the number of light-emitting units 1$i$ in the light emission within the exposure period Ts can be further artificially increased in the Y direction in addition to the X direction, and it is possible to provide the light source device 100$o$ that can control the region to be partially irradiated with the color-adjusted light in the irradiated region 200. Also, because the number of divisions of the irradiated region 200 can be increased in the Y direction in addition to the X direction, natural partial emission light can be further obtained.

Other Preferred Embodiments

Figure 89:
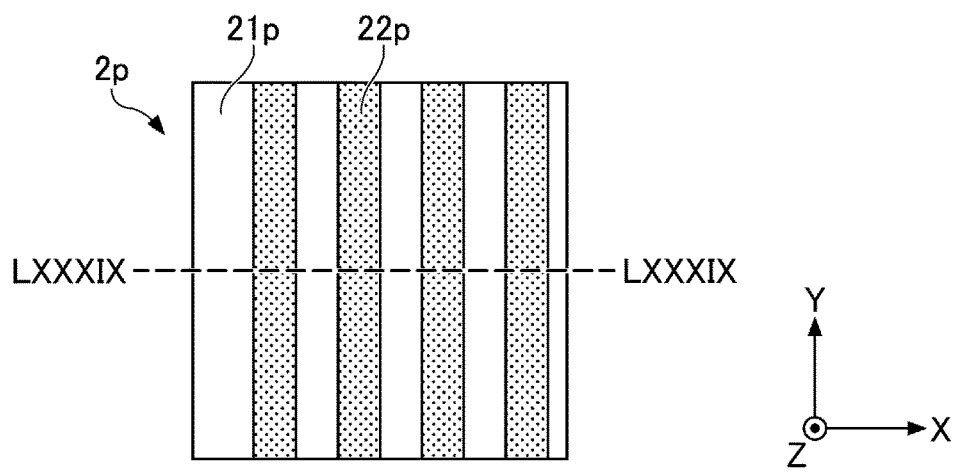
FIG. 89 is a plan view illustrating a first modified example of an optical member according to an embodiment.
Figure 90:
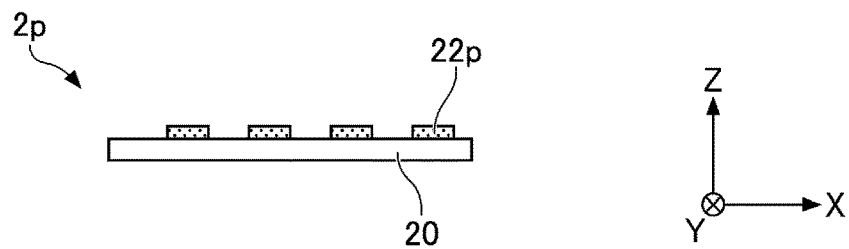
FIG. 90 is a cross-sectional view taken along line LXXXIX-LXXXIX in FIG. 89.

FIG. 89 is a plan view illustrating a first modified example of an optical member according to the embodiment. FIG. 90 is a cross-sectional view taken along line LXXXIX-LXXXIX in FIG. 89.

As illustrated in FIGS. 89 and 90, an optical member 2$p$ includes a light-transmissive substrate 20, a plurality of first regions 21$p$ from which light of the first chromaticity can be extracted and a plurality of second regions 22$p$ from which light of the second chromaticity can be extracted.

The light-transmissive substrate 20 is a plate-like member including a resin material such as polycarbonate, a glass material, or the like. The second regions 22$p$ are configured by paints, pigments, color filters, or the like formed on the +Z side surface of the light-transmissive substrate 20. The first regions 21$p$ are regions other than the regions where the second regions 22$p$ are formed in the light-transmissive substrate 20 in a plan view. The second regions 22$p$ may be formed on the −Z side surface of the light-transmissive substrate 20.

Figure 91:
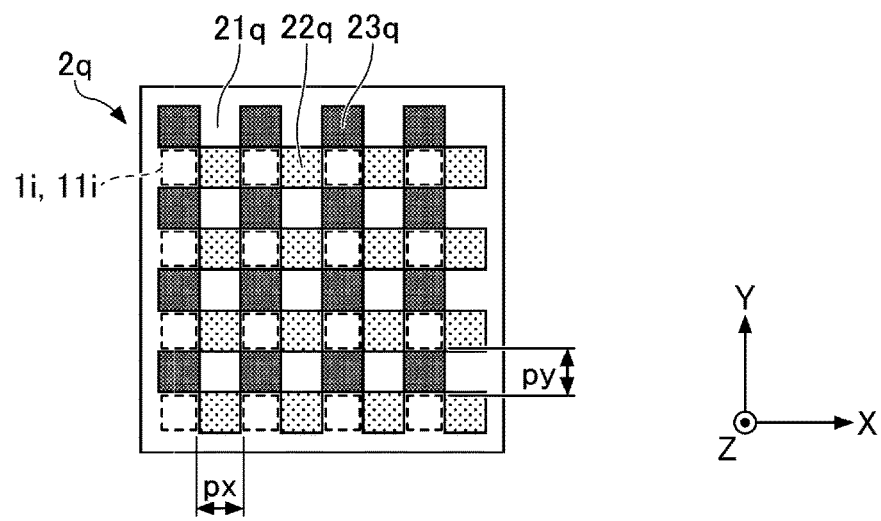
FIG. 91 is a plan view illustrating a second modified example of the optical member according to an embodiment.

FIG. 91 is a plan view illustrating a second modified example of the optical member according to the embodiment.

An optical member 2$q$ includes a plurality of first regions 21$q$ from which light of the first chromaticity can be extracted, a plurality of second regions 22$q$ from which light of the second chromaticity can be extracted, and a plurality of third regions 23$q$ from which light of a third chromaticity can be extracted. The first regions 21$q$, the second regions 22$q$, and the third regions 23$q$ have a substantially square shape in a plan view, and one first region 21$q$ is disposed so as to be interposed between two second regions 22$q$ in the X direction and interposed between two third regions 23$q$ in the Y direction.

The first regions 21$q$ are, for example, regions through which light from the plurality of light-emitting units 1$i$ passes. The second regions 22$q$ and the third regions 23$q$ include different wavelength conversion members and convert light from the plurality of light-emitting units 1$i$ into light of different chromaticities. For example, the first chromaticity is white, the second chromaticity is orange-based color, and the third chromaticity is red-based color.

In FIG. 91, the plurality of light-emitting units 1$i$ are provided on the −Z side of the optical member 2$q$. The first interval px is an interval between the light-emitting units 1$i$ adjacent to one another in the X direction, and the second interval py is an interval between the light-emitting units 1$i$ adjacent to one another in the Y direction. The light-emitting surface 11$i$ of the light-emitting unit 1$i$ is preferably substantially equal to or smaller than the first region 21$q$, the second region 22$q$, and the third region 23$q$. The optical member 2$q$ can be moved in both the X direction and the Y direction by the first movement assembly 3.

In FIG. 91, the plurality of light-emitting units 1$i$ overlap the first regions 21$q$ in a plan view, and this state is referred to as a state AA.

Figure 92:
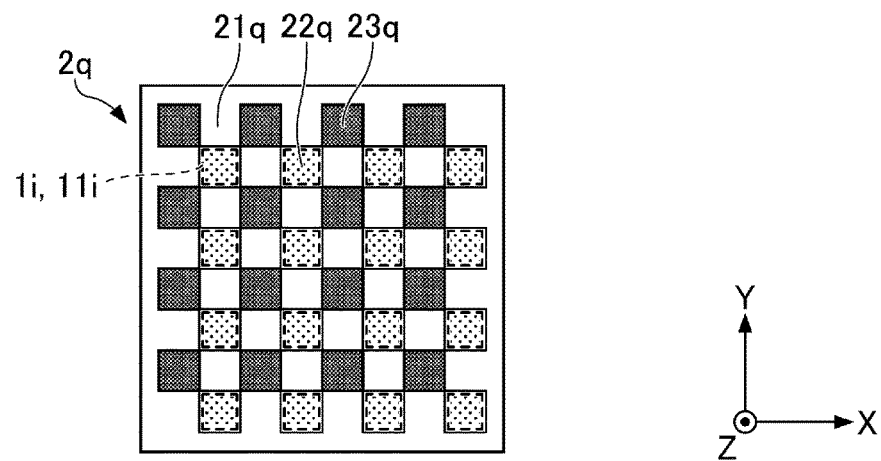
FIG. 92 is a plan view illustrating the optical member in FIG. 91 in a state AB.

FIG. 92 is a plan view illustrating the optical member 2$q$ in a state AB in which the optical member 2$q$ is moved from the state AA in the −X direction relative to the light-emitting surfaces 11$i$.

Figure 93:
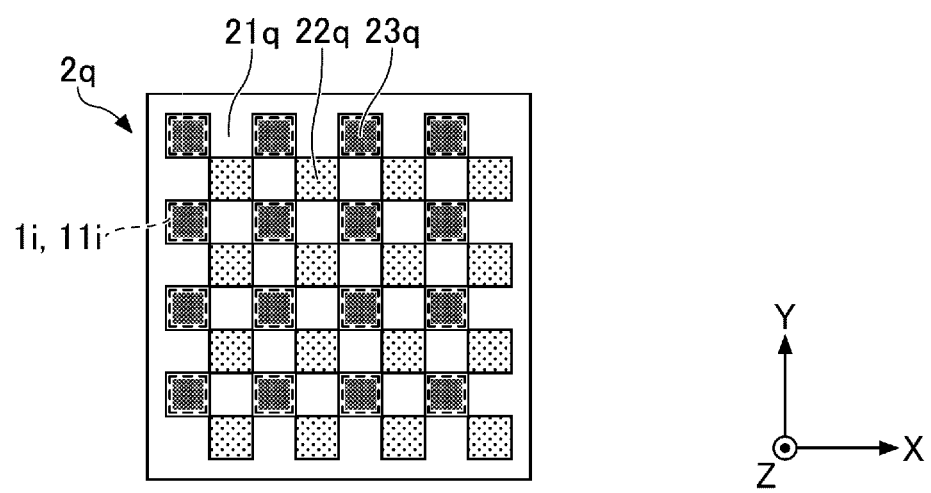
FIG. 93 is a plan view illustrating the optical member in FIG. 91 in a state AA.

FIG. 93 is a plan view illustrating the optical member 2*q* in a state AC in which the optical member 2*q* is moved from the state AA in the +Y direction relative to the light-emitting surfaces 11*i*.

As described above, by the relative movement between the optical member 2*q* and the light-emitting surfaces 11 in the X direction and the Y direction, the color of the light emitted from the light source device 100 can be changed.

Because the optical member 2*q* is used, the flexibility relating to the relative movement of the optical member is greater than that in the case in which the optical member moves only in the X direction, and thus the flexibility relating to the color adjustment can be increased. For example, when performing color adjustment using three or more colors, the difference in the relative movement distance for switching the chromaticities can be reduced, making the color adjustment easier to perform.

Although the preferred embodiments and the like have been described in detail above, the disclosure is not limited to the above-described embodiments and the like, various modifications and substitutions can be made to the above-described embodiments and the like without departing from the scope described in the claims.

The number, quantity, etc. used in the description of the embodiments all are examples to specifically describe the technology of the present disclosure, and the present disclosure is not limited to the numbers used as examples. In addition, the connection relationship between the constituent elements is described for specifically describing the technique of the present disclosure, and the connection relationship for realizing the function of the present disclosure is not limited thereto.

The light source device of the present disclosure can emit a color-adjusted light, and thus can be suitably used for lighting, the flash of a camera, headlights on a vehicle, and the like. However, the light source device of the present disclosure is not limited to these applications.

The aspects of the present disclosure are as follows for example.

[Aspect 1]

A light source device, comprising:
  a plurality of light-emitting units each including a light-emitting surface;
  an optical member including one or a plurality of first regions from which light of a first chromaticity can be extracted and one or a plurality of second regions from which light of a second chromaticity different from the first chromaticity can be extracted, the optical member allowing light emitted by the light-emitting units to be transmitted or passed through;
  a first movement assembly configured to cause a relative movement between the plurality of light-emitting units and the optical member so that the light-emitting surface and the optical member face one another; and
  a control unit including a light emission control unit configured to control light emission of each of the plurality of light-emitting units and a first movement control unit configured to control operation of the first movement assembly, wherein
  the light emission control unit performs control so that each of the plurality of light-emitting units emits the light in a predetermined period, and
  the first movement control unit performs control of the relative movement between the plurality of light-emitting units and the optical member in the predetermined period.

[Aspect 2]

The light source device according to Aspect 1, wherein
  the light emission control unit controls an amount of light emitted by each of the plurality of light-emitting units by selecting the light-emitting unit to emit light from among the plurality of light-emitting units, and by controlling at least one of a drive current, a drive voltage, and a light emission period of each of the plurality of light-emitting units.

[Aspect 3]

The light source device according to Aspect 1 or 2, wherein
  the optical member includes one of the plurality of first regions and one of the plurality of second regions,
  the one of the plurality of first regions faces one of the plurality of light-emitting surfaces and
  the one of the plurality of second regions faces one of the plurality of light-emitting surfaces, and
  the first movement control unit performs control to set, in the predetermined period, a state in which one or more of the plurality of light-emitting units are included in the one of the first regions in a plan view and a state in which one or more of the plurality of light-emitting units are included in the one of the second regions in a plan view.

[Aspect 4]

The light source device according to any one of Aspects 1 to 3, wherein
  the optical member includes the plurality of first regions and the plurality of second regions,
  the plurality of first regions and the plurality of second regions are alternately arranged in a first direction so as to face the plurality of light-emitting surfaces,
  the plurality of light-emitting units are arranged at least in the first direction, and
  the first movement control unit performs control to set, in the predetermined period, a state in which a predetermined light-emitting unit of the plurality of light-emitting units is included in the plurality of the first regions in a plan view and a state in which the predetermined light-emitting unit is included in the plurality of the second regions in a plan view.

[Aspect 5]

The light source device according to Aspect 4, wherein
  the plurality of light-emitting units are arranged in the first direction with a first interval between the light-emitting units adjacent in the first direction.

[Aspect 6]

The light source device according to Aspect 5, wherein
  the first interval is substantially equal to a width of the first region or the second region in the first direction.

[Aspect 7]

The light source device according to Aspect 5 or 6, wherein
  a width of the light-emitting surface in the first direction is greater than a width of the first region or the second region in the first direction.

[Aspect 8]

The light source device according to any one of Aspects 1 to 7, further comprising:
  a lens through which light transmitted or passed through the optical member is emitted, wherein
  the first movement assembly moves the optical member relative to the plurality of light-emitting units and the lens so that the plurality of light-emitting surfaces and the optical member face one another.

[Aspect 9]
The light source device according to Aspect 8, wherein
the optical member includes the plurality of first regions and the plurality of second regions,
the plurality of first regions and the plurality of second regions are alternately arranged in the first direction so as to face the plurality of light-emitting surfaces,
the light source device further comprises a second movement assembly configured to cause a relative movement between the plurality of light-emitting units and the lens in the first direction so that the plurality of light-emitting surfaces and the lens face one another,
the control unit further includes a second movement control unit configured to control operation of the second movement assembly,
the plurality of light-emitting units are arranged in the first direction with a first interval between the light-emitting surfaces adjacent in the first direction,
the second movement control unit performs control of the relative movement between the plurality of light-emitting units and the lens in the first direction in the predetermined period, and
a distance of the relative movement between the plurality of light-emitting units and the lens in the first direction is equal to or greater than a shorter length from among the first interval and a width of the light-emitting surface in the first direction.

[Aspect 10]
The light source device according to any one of Aspects 1 to 3, wherein
the optical member includes the plurality of first regions and the plurality of second regions,
the plurality of first regions and the plurality of second regions are alternately arranged in a first direction and a second direction intersecting the first direction so as to face the plurality of light-emitting surfaces,
the plurality of light-emitting units are arranged in the first direction and the second direction, and
the first movement control unit performs control of the relative movement between, in the predetermined period, a state in which a predetermined light-emitting unit of the plurality of light-emitting units is included in one or more of the plurality of first regions in a plan view and a state in which the predetermined light-emitting unit is included in one or more of the plurality of second regions in a plan view.

[Aspect 11]
The light source device according to Aspect 10, wherein
the plurality of light-emitting units are arranged in the first direction with a first interval between the light-emitting units adjacent to one another in the first direction and are arranged in the second direction with a second interval between the light-emitting units adjacent to one another in the second direction.

[Aspect 12]
The light source device according to Aspect 11, wherein
the first interval is substantially equal to a width of the first region or the second region in the first direction, and
the second interval is substantially equal to a width of the first region or the second region in the second direction.

[Aspect 13]
The light source device according to Aspect 10 or 11, wherein
the optical member further includes one or a plurality of third regions from which light of a third chromaticity can be extracted,
a width of the light-emitting surface in the first direction is greater than a width of the first region or the second region in the first direction, and
a width of the light-emitting surface in the second direction is greater than a width of the first region or the third region in the second direction.

[Aspect 14]
The light source device according to any one of Aspects 10 to 13, further comprising:
a lens through which the light transmitted or passed through the optical member is emitted, wherein
the first movement assembly moves the optical member relative to the plurality of light-emitting units and the lens so that the light-emitting surfaces and the optical member face one another.

[Aspect 15]
The light source device according to Aspect 14, further comprising:
a second movement assembly configured to cause a relative movement between the plurality of light-emitting units and the lens in the first direction and the second direction so that the plurality of light-emitting surfaces and the lens face one another, wherein
the control unit further includes a second movement control unit configured to control operation of the second movement assembly,
the plurality of light-emitting units are arranged in the first direction with a first interval between the light-emitting surfaces adjacent in the first direction and are arranged in the second direction with a second interval between the light-emitting units adjacent in the second direction,
the second movement control unit performs control of the relative movement between the plurality of light-emitting units and the lens in the first direction and the second direction in the predetermined period,
a distance of the relative movement of the plurality of light-emitting units and the lens in the first direction is equal to or greater than a shorter length from among the first interval and a width of the light-emitting surface in the first direction, and
a distance of the relative movement of the plurality of light-emitting units and the lens in the second direction is equal to or greater than a shorter length from among the second interval and a width of the light-emitting surface in the second direction.

[Aspect 16]
The light source device according to any one of Aspects 1 to 15, wherein
the light source device is a flash light source used in an imaging device, and
the predetermined period is equal to an imaging cycle or an exposure period for the imaging device.

This application claims priority based on Japanese Patent Publication No. 2021-202741 filed with the Japan Patent Office on Dec. 14, 2021 and Japanese Patent Publication No. 2022-097577 filed with the Japan Patent Office on Jun. 16, 2022, which are incorporated herein by reference.

What is claimed is:
1. A light source device comprising:
a plurality of light-emitting units, each comprising:
a light-emitting element, and
a light-transmissive member coupled to the light-emitting element, the light-transmissive member containing a wavelength conversion substance and having a light-emitting surface on a side opposite the light-emitting element;

an optical member configured to allow light emitted from the light-emitting units to be transmitted or passed therethrough, the optical member comprising:
  one or a plurality of first regions from which light of a first chromaticity is extracted upon operation of the light-emitting units, and
  one or a plurality of second regions from which light of a second chromaticity different from the first chromaticity is extracted upon operation of the light-emitting units;
a first movement assembly configured to cause a relative movement between the plurality of light-emitting units and the optical member so that the light-emitting surface and the optical member face one another; and
a control unit comprising one or more electrical circuits or one or more central processing units, the control unit configured to:
  control light emission of each of the plurality of light-emitting units so that each of the plurality of light-emitting units emits the light in a predetermined period,
  adjust a ratio within the predetermined period between an amount of light having the first chromaticity transmitted through the one or plurality of first regions and an amount of light having the second chromaticity transmitted through the one or plurality of second regions, and
  control operation of the first movement assembly so as to control the relative movement between the plurality of light-emitting units and the optical member in the predetermined period.

2. The light source device according to claim 1, wherein:
the control unit is configured to control an amount of light emitted by each of the plurality of light-emitting units by selecting a light-emitting unit to emit light from among the plurality of light-emitting units, and by controlling at least one of a drive current, a drive voltage, or a light emission period of each of the plurality of light-emitting units.

3. The light source device according to claim 1, wherein:
a first of the plurality of first regions faces a first of the plurality of light-emitting surfaces and a first of the plurality of second regions faces a first of the plurality of light-emitting surfaces, and
the control unit is configured to set, in the predetermined period, a state in which one or more of the plurality of light-emitting units are included in the first of the first regions in a plan view and a state in which one or more of the plurality of light-emitting units are included in the first of the second regions in a plan view.

4. The light source device according to claim 1, wherein:
the optical member comprises the plurality of first regions and the plurality of second regions, which are alternately arranged in a first direction so as to face the plurality of light-emitting surfaces,
the plurality of light-emitting units are arranged at least in the first direction, and
the control unit is configured to set, in the predetermined period, a state in which a predetermined light-emitting unit of the plurality of light-emitting units is included within the plurality of the first regions in a plan view and a state in which the predetermined light-emitting unit is included within the plurality of the second regions in a plan view.

5. The light source device according to claim 4, wherein:
the plurality of light-emitting units are arranged in the first direction with a first interval between the light-emitting units adjacent in the first direction.

6. The light source device according to claim 5, wherein:
the first interval is substantially equal to a width of the first region and/or a width of the second region in the first direction.

7. The light source device according to claim 5, wherein:
a width of the light-emitting surface in the first direction is greater than a width of the first region and/or a width of the second region in the first direction.

8. The light source device according to claim 1, further comprising:
a lens through which light transmitted or passed through the optical member is emitted, wherein:
the first movement assembly is configured to move the optical member relative to the plurality of light-emitting units and the lens so that the plurality of light-emitting surfaces and the optical member face one another.

9. The light source device according to claim 8, wherein:
the optical member comprises the plurality of first regions and the plurality of second regions, which are alternately arranged in the first direction so as to face the plurality of light-emitting surfaces,
the light source device further comprises a second movement assembly configured to cause a relative movement between the plurality of light-emitting units and the lens in the first direction so that the plurality of light-emitting surfaces and the lens face one another,
the control unit is further configured to control operation of the second movement assembly,
the plurality of light-emitting units are arranged in the first direction with a first interval between the light-emitting surfaces adjacent in the first direction,
the control unit is configured to control the relative movement between the plurality of light-emitting units and the lens in the first direction in the predetermined period, and
a distance of the relative movement between the plurality of light-emitting units and the lens in the first direction is equal to or greater than a shorter length from among the first interval and a width of the light-emitting surface in the first direction.

10. The light source device according to claim 1, wherein:
the optical member comprises the plurality of first regions and the plurality of second regions, which are alternately arranged in a first direction and a second direction intersecting the first direction so as to face the plurality of light-emitting surfaces,
the plurality of light-emitting units are arranged in the first direction and the second direction, and
the control unit is configured to control, in the predetermined period, the relative movement between a state in which a predetermined light-emitting unit of the plurality of light-emitting units is included within one or more of the plurality of first regions in a plan view and a state in which the predetermined light-emitting unit is included within one or more of the plurality of second regions in a plan view.

11. The light source device according to claim 10, wherein:
the plurality of light-emitting units are arranged in the first direction with a first interval between the light-emitting units adjacent to one another in the first direction and are arranged in the second direction with a second interval between the light-emitting units adjacent to one another in the second direction.

12. The light source device according to claim 11, wherein:
the first interval is substantially equal to a width of the first region and/or a width of the second region in the first direction, and
the second interval is substantially equal to a width of the first region and/or a width of the second region in the second direction.

13. The light source device according to claim 10, wherein:
the optical member further comprises one or a plurality of third regions from which light of a third chromaticity is extracted upon operation of the light-emitting units,
a width of the light-emitting surface in the first direction is greater than a width of the first region and/or a width of the second region in the first direction, and
a width of the light-emitting surface in the second direction is greater than a width of the first region and/or a width of the third region in the second direction.

14. The light source device according to claim 10, further comprising:
a lens through which the light transmitted or passed through the optical member is emitted, wherein:
the first movement assembly is configured to move the optical member relative to the plurality of light-emitting units and the lens so that the light-emitting surfaces and the optical member face one another.

15. The light source device according to claim 14, further comprising:
a second movement assembly configured to cause a relative movement between the plurality of light-emitting units and the lens in the first direction and the second direction so that the plurality of light-emitting surfaces and the lens face one another, wherein:
the control unit is further configured to control operation of the second movement assembly,
the plurality of light-emitting units are arranged in the first direction with a first interval between the light-emitting surfaces adjacent in the first direction and are arranged in the second direction with a second interval between the light-emitting units adjacent in the second direction,
the electrical circuits configured to control the relative movement between the plurality of light-emitting units and the lens in the first direction and the second direction in the predetermined period,
a distance of the relative movement of the plurality of light-emitting units and the lens in the first direction is equal to or greater than a shorter length from among the first interval and a width of the light-emitting surface in the first direction, and
a distance of the relative movement of the plurality of light-emitting units and the lens in the second direction is equal to or greater than a shorter length from among the second interval and a width of the light-emitting surface in the second direction.

16. The light source device according to claim 1, wherein:
the light source device is a flash light source used in an imaging device, and
the predetermined period is equal to an imaging cycle or an exposure period for the imaging device.

17. A light source device comprising:
a plurality of light-emitting units, each including a light-emitting surface;
an optical member configured to allow light emitted from the light-emitting units to be transmitted or passed therethrough, the optical member comprising:
a plurality of first regions from which light of a first chromaticity is extracted upon operation of the light-emitting units, and
a plurality of second regions from which light of a second chromaticity different from the first chromaticity is extracted upon operation of the light-emitting units, wherein the plurality of first regions and the plurality of second regions are alternately arranged in a first direction and a second direction intersecting the first direction so as to face the plurality of light-emitting surfaces and the plurality of light-emitting units are arranged in the first direction and the second direction;
a first movement assembly configured to cause a relative movement between the plurality of light-emitting units and the optical member so that the light-emitting surface and the optical member face one another; and
a control unit comprising one or more electrical circuits or one or more central processing units, the control unit configured to:
control light emission of each of the plurality of light-emitting units so that each of the plurality of light-emitting units emits the light in a predetermined period,
control operation of the first movement assembly so as to control the relative movement between the plurality of light-emitting units and the optical member in the predetermined period, and
control, in the predetermined period, the relative movement between a state in which a predetermined light-emitting unit of the plurality of light-emitting units is included within one or more of the plurality of first regions in a plan view and a state in which the predetermined light-emitting unit is included within one or more of the plurality of second regions in a plan view.

18. The light source device according to claim 17, wherein:
the plurality of light-emitting units are arranged in the first direction with a first interval between the light-emitting units adjacent to one another in the first direction and are arranged in the second direction with a second interval between the light-emitting units adjacent to one another in the second direction.

19. The light source device according to claim 18, wherein:
the first interval is substantially equal to a width of the first region and/or a width of the second region in the first direction, and
the second interval is substantially equal to a width of the first region and/or a width of the second region in the second direction.

20. The light source device according to claim 17, wherein:
the optical member further comprises one or a plurality of third regions from which light of a third chromaticity is extracted upon operation of the light-emitting units,
a width of the light-emitting surface in the first direction is greater than a width of the first region and/or a width of the second region in the first direction, and
a width of the light-emitting surface in the second direction is greater than a width of the first region and/or a width of the third region in the second direction.

21. The light source device according to claim 17, further comprising:
a lens through which the light transmitted or passed through the optical member is emitted, wherein:
the first movement assembly is configured to move the optical member relative to the plurality of light-emitting units and the lens so that the light-emitting surfaces and the optical member face one another.

22. The light source device according to claim 21, further comprising:
a second movement assembly configured to cause a relative movement between the plurality of light-emitting units and the lens in the first direction and the second direction so that the plurality of light-emitting surfaces and the lens face one another, wherein:
the control unit is further configured to control operation of the second movement assembly,
the plurality of light-emitting units are arranged in the first direction with a first interval between the light-emitting surfaces adjacent in the first direction and are arranged in the second direction with a second interval between the light-emitting units adjacent in the second direction,
the electrical circuits configured to control the relative movement between the plurality of light-emitting units and the lens in the first direction and the second direction in the predetermined period,
a distance of the relative movement of the plurality of light-emitting units and the lens in the first direction is equal to or greater than a shorter length from among the first interval and a width of the light-emitting surface in the first direction, and
a distance of the relative movement of the plurality of light-emitting units and the lens in the second direction is equal to or greater than a shorter length from among the second interval and a width of the light-emitting surface in the second direction.

23. A light source device comprising:
a plurality of light-emitting units, each including a light-emitting surface;
an optical member configured to allow light emitted from the light-emitting units to be transmitted or passed therethrough, the optical member comprising:
one or a plurality of first regions from which light of a first chromaticity is extracted upon operation of the light-emitting units, and
one or a plurality of second regions from which light of a second chromaticity different from the first chromaticity is extracted upon operation of the light-emitting units;
a first movement assembly configured to cause a relative movement between the plurality of light-emitting units and the optical member so that the light-emitting surface and the optical member face one another; and
a control unit comprising one or more electrical circuits or one or more central processing units, the control unit configured to:
control light emission of each of the plurality of light-emitting units so that each of the plurality of light-emitting units emits the light in a predetermined period, and
control operation of the first movement assembly so as to control the relative movement between the plurality of light-emitting units and the optical member in the predetermined period;
wherein the light source device is a flash light source used in an imaging device, and the predetermined period is equal to an imaging cycle or an exposure period for the imaging device.

* * * * *